United States Patent [19]

Maucher

[11] Patent Number: 5,450,934
[45] Date of Patent: Sep. 19, 1995

[54] FRICTION CLUTCH

[75] Inventor: Paul Maucher, Sasbach, Germany

[73] Assignee: LuK Lamellen und Kupplungsbau GmbH, Bühl, Germany

[21] Appl. No.: 284,737

[22] Filed: Aug. 1, 1994

Related U.S. Application Data

[63] Continuation of Ser. No. 982,178, Nov. 25, 1992, abandoned.

[30] Foreign Application Priority Data

| Nov. 26, 1991 | [DE] | Germany | 41 38 806 |
| Mar. 5, 1992 | [JP] | Japan | 42 06 904 |
| Mar. 10, 1992 | [JP] | Japan | 42 07 528 |
| Apr. 18, 1992 | [JP] | Japan | 42 12 940 |

[51] Int. Cl.⁶ ........................... F16D 13/75
[52] U.S. Cl. .................. 192/70.25; 192/111 A; 188/71.8
[58] Field of Search ............ 192/70.25, 111 A, 111 B, 192/111 R; 188/71.8, 196 V, 201

[56] References Cited

U.S. PATENT DOCUMENTS

| 3,921,777 | 11/1975 | Rist | 192/107 C |
| 3,964,586 | 6/1976 | Barrett et al. | 192/107 C |
| 4,057,131 | 11/1977 | Flotow | 192/70.13 |
| 4,113,078 | 9/1978 | Maycock | 192/107 C |
| 4,191,285 | 3/1980 | Thelander, Sr. | 192/111 A |
| 4,260,048 | 4/1981 | Beccaris | 192/107 C |
| 4,720,002 | 1/1988 | Kitano et al. | 192/70.25 |
| 4,754,860 | 7/1988 | Fukutake et al. | 192/70.25 |
| 4,809,834 | 3/1989 | Channing | 192/70.27 |
| 4,924,991 | 5/1990 | Takeuchi | 192/111 A |
| 5,029,687 | 7/1991 | Asada et al. | 192/111 A |
| 5,069,322 | 12/1991 | Mizukami et al. | 192/70.25 |
| 5,263,564 | 11/1993 | Floton | 192/111 B |

FOREIGN PATENT DOCUMENTS

| 0385752 | 9/1990 | European Pat. Off. |
| 0464997 | 1/1992 | European Pat. Off. |
| 8607940 | 6/1986 | France |
| 8607941 | 6/1986 | France |
| 8614728 | 10/1986 | France |
| 8615487 | 11/1986 | France |
| 2599444 | 12/1987 | France |
| 2599446 | 12/1987 | France |
| 2605692 | 4/1988 | France |
| 2606477 | 5/1988 | France |
| 4206904 | of 0000 | Germany |
| 4207528 | of 0000 | Germany |
| 898531 | 11/1953 | Germany |
| 1267916 | 5/1968 | Germany |
| 1450201 | 8/1969 | Germany |
| 2460963 | 7/1976 | Germany |
| 2164297 | 9/1976 | Germany |
| 2916755 | 11/1979 | Germany |
| 2920932 | 2/1983 | Germany |
| 2441141 | 9/1983 | Germany |
| 3309427 | 10/1983 | Germany |
| 3518781 | 11/1986 | Germany |
| 3721711 | 1/1988 | Germany |
| 3721712 | 1/1988 | Germany |

(List continued on next page.)

OTHER PUBLICATIONS

SAE Technical Paper Series 900391, Title "Improvement of Engine Sound Quality Through a New Flywheel System Flexiby Mounted to the Crankshaft".

Primary Examiner—Andrea L. Pitts
Attorney, Agent, or Firm—Darby & Darby

[57] ABSTRACT

A friction clutch for use in motor vehicles wherein the pressure plate is automatically shifted toward the counterpressure plate for the friction linings of the clutch disc in dependency on the extent of wear upon the counterpressure plate, pressure plate and particularly the friction linings. The pressure plate is non-rotatably but axially movably coupled to the housing of the friction clutch and is biased toward the friction linings by resilient means including a diaphragm spring or a set of coil springs. The adjusting unit which changes the position of the pressure plate as a function of the extent of wear mainly upon the friction linings can employ cooperating wedges including a set of wedges on the housing and a set of wedges on the resilient means.

17 Claims, 24 Drawing Sheets

FOREIGN PATENT DOCUMENTS

| | | |
|---|---|---|
| 3631863 | 3/1988 | Germany . |
| 3742354 | 6/1988 | Germany . |
| 4011850 | 10/1990 | Germany . |
| 4117571 | 12/1991 | Germany . |
| 4117579 | 12/1991 | Germany . |
| 4117582 | 12/1991 | Germany . |
| 4092382 | 1/1992 | Germany . |
| 51-126452 | 4/1976 | Japan . |
| 158912 | 2/1983 | Japan . |
| 1-163218 | 11/1989 | Japan . |
| 2-124326 | 10/1990 | Japan . |
| 3-123 | 1/1991 | Japan . |
| 3-19131 | 2/1991 | Japan . |
| 3-25026 | 3/1991 | Japan . |
| 3-53628 | 5/1991 | Japan . |
| 1567019 | 5/1980 | United Kingdom . |

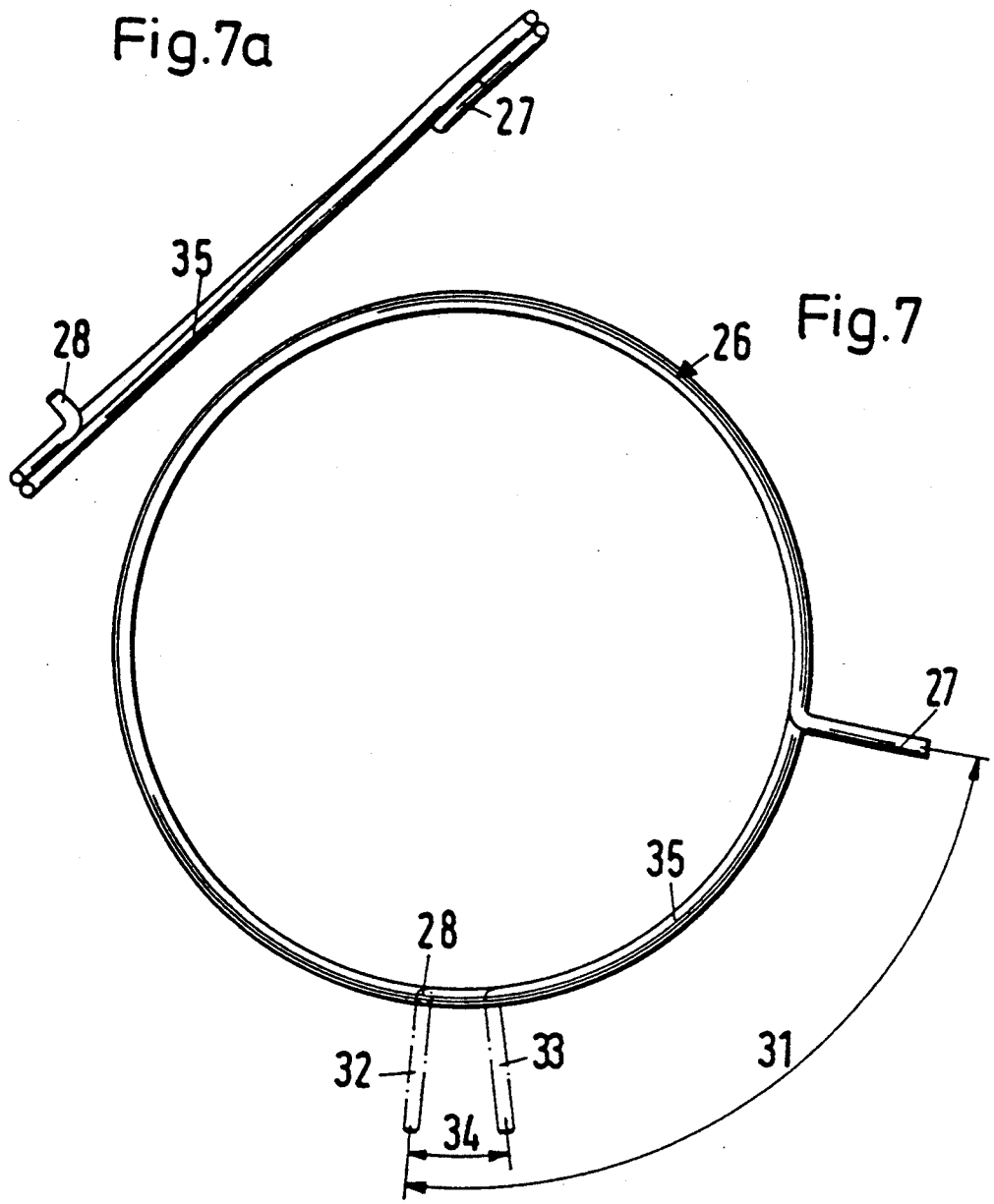

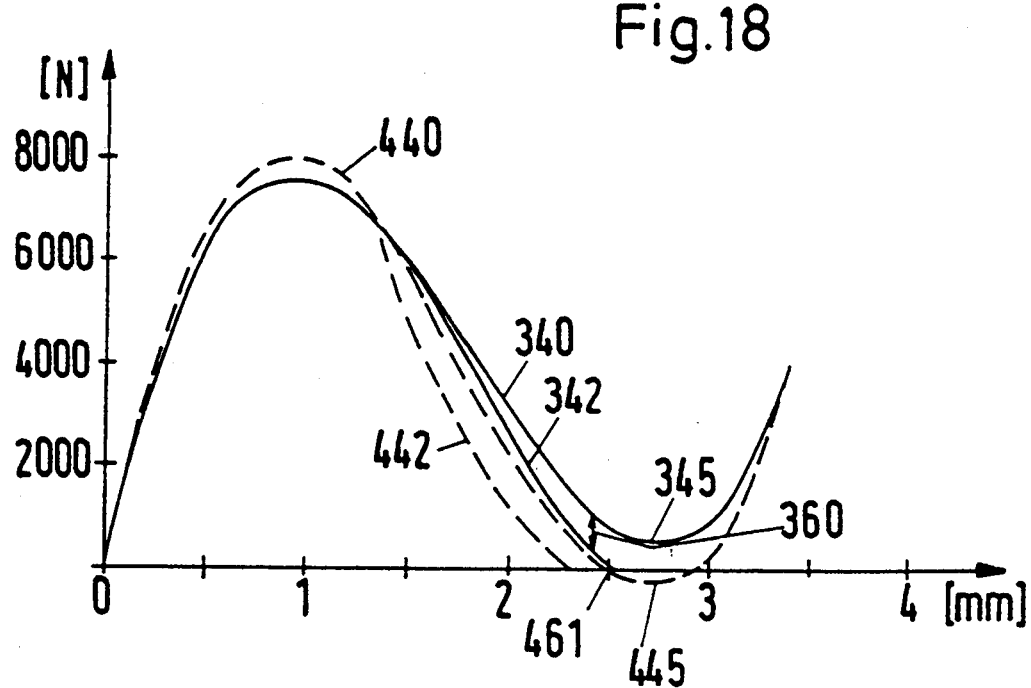
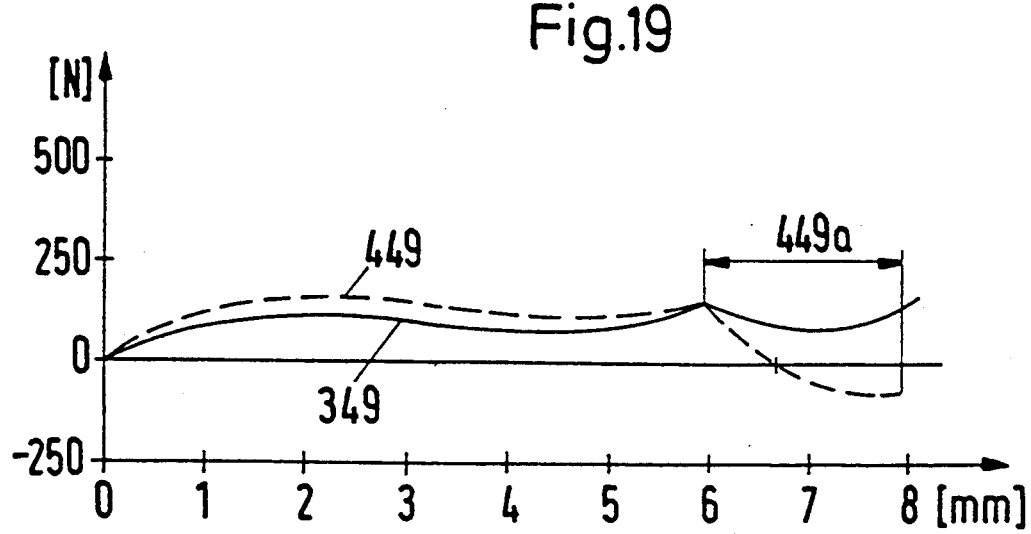

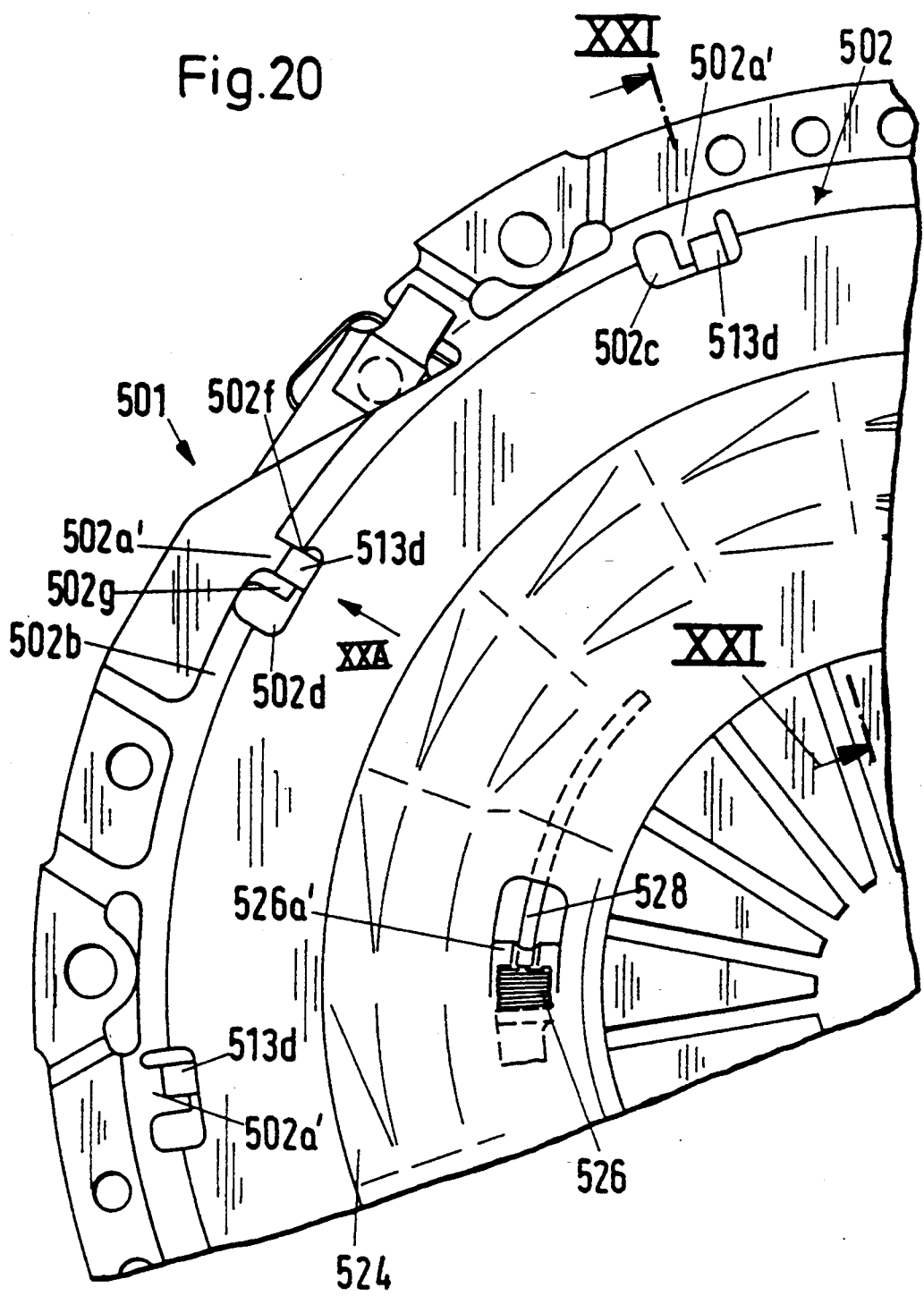

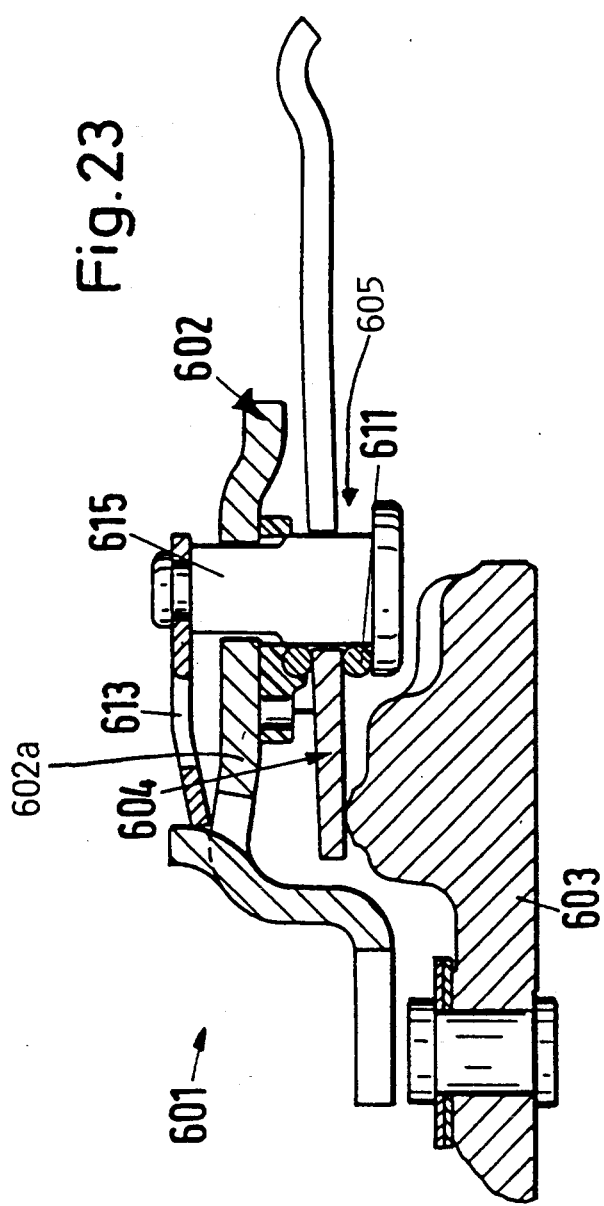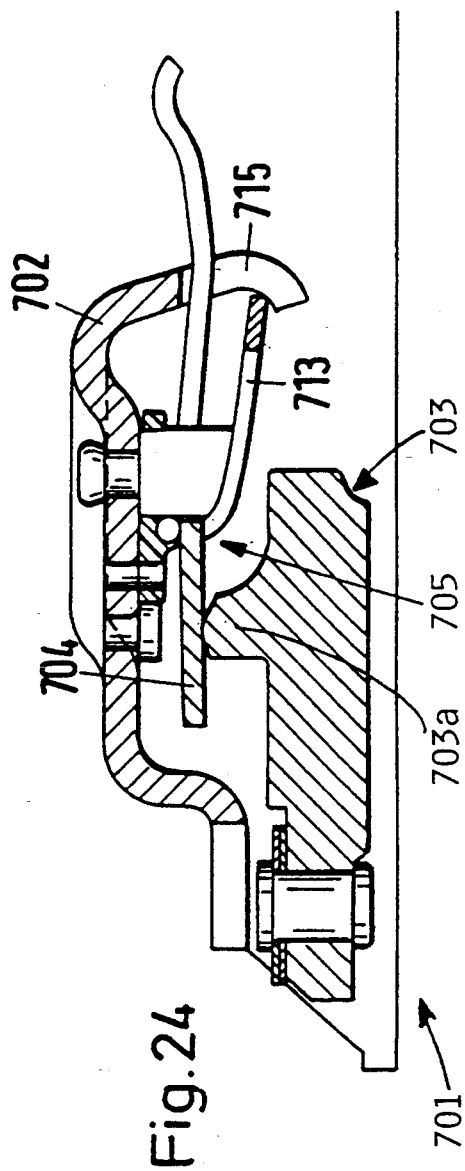

FRICTION CLUTCH

This is a continuation of application Ser. No. 07/982,178, filed Nov. 25, 1992, abandoned.

BACKGROUND OF THE INVENTION

The invention relates to improvements in friction clutches, especially for use in motor vehicles. More particularly, the invention relates to improvements in friction clutches of the type wherein a pressure plate is non-rotatably but axially movably connected to a housing or cover and is biased by one or more prestressed resilient devices (e.g., in the form of diaphragm springs) to urge a clutch plate or clutch disc against a rotary counterpressure plate (e.g., a flywheel) which is driven by the output element of an internal combustion engine in a motor vehicle. The clutch disc can serve to transmit torque to the input element of a variable-speed transmission in the power train between the engine and the wheels of a motor vehicle.

Friction clutches of the above outlined character are disclosed, for example, in published German patent application Serial No. 24 60 963, in German Pat. No. 24 41 141, in German Pat. No. 898 531 and in German Auslegeschrift No. 1 267 916.

OBJECTS OF THE INVENTION

An object of the invention is to prolong the useful life of friction clutches, particularly of friction clutches for use in motor vehicles.

Another object of the invention is to provide a friction clutch whose mode of operation is less affected by wear upon its parts than in heretofore known friction clutches.

A further object of the invention is to provide a friction clutch which can be disengaged in response to the application of a relatively small force.

An additional object of the invention is to provide a friction clutch which is constructed and assembled in such a way that the magnitude of the disengaging force need not change, or changes negligibly, irrespective of the extent of wear upon certain component parts of the friction clutch.

Still another object of the invention is to provide a simple, compact and inexpensive friction clutch which embodies the aforediscussed features.

A further object of the invention is to provide a novel and improved method of compensating for wear upon the clutch plate or clutch disc in a friction clutch of the above outlined character.

Another object of the invention is to provide a novel and improved method of compensating for wear upon the clutch disc and/or certain other component parts of a friction clutch for use in motor vehicles and the like.

An additional object of the invention is to provide the above outlined friction clutch with a novel and improved system which can automatically compensate for wear upon the friction linings forming part of the clutch disc.

Still another object of the invention is to provide a fiction clutch which exhibits the above outlined advantages and which can be assembled at a reasonable cost in automatic machines.

A further object of the invention is to provide a novel and improved aggregate which employs the above outlined friction clutch as well as one or more additional components, such as the part or parts which transmit torque to the input element and/or receive torque from the output element or elements of the friction clutch.

Another object of the invention is to provide a motor vehicle which embodies the above outlined friction clutch.

An additional object of the invention is to provide a preassembled modular engageable and disengageable aggregate which embodies the above outlined friction clutch.

Still another object of the invention is to provide a driving unit which can be used in a motor vehicle and embodies the above outlined friction clutch.

A further object of the invention is to provide a novel and improved diaphragm spring for use in the above outlined friction clutch.

Another object of the invention is to provide a novel and improved clutch plate or clutch disc for use in the above outlined friction clutch.

An additional object of the invention is to provide a novel and improved method of installing a diaphragm spring in the housing or cover of the above outlined friction clutch.

Still another object of the invention is to provide the above outlined friction clutch with novel and improved means for tiltably mounting the diaphragm spring for the pressure plate in the housing of the friction clutch.

A further object of the invention is to provide a novel and improved connection between the input element of the above outlined friction clutch and the output element of an internal combustion engine.

Another object of the invention is to provide novel and improved means for biasing the pressure plate in a friction clutch for use in motor vehicles.

An additional object of the invention is to provide friction clutch whose operation is not affected by wear (even extensive wear) upon friction linings, pressure plate and/or other parts which are subject to wear when the friction clutch is in use.

Still another object of the invention is to provide a preassembled friction clutch which can be utilized in existing motor vehicles and/or for other purposes as a superior substitute for existing friction clutches.

A further object of the invention is to provide the above outlined friction clutch with novel and improved means for opposing the bias of the diaphragm spring for the pressure plate.

Another object of the invention is to provide a novel and improved combination of friction clutch and engine for use in a motor vehicle.

SUMMARY OF THE INVENTION

One feature of the present invention resides in the provision of an engageable and disengageable torque transmitting friction clutch which can be utilized with advantage in vehicles, particularly motor vehicles. The improved friction clutch comprises a housing or cover which is rotatable about a predetermined axis, a pressure plate, means (e.g., a group of leaf springs) for non-rotatably connecting the pressure plate to the housing with limited freedom of movement in the direction of the predetermined axis, a rotary counterpressure plate (e.g., a flywheel which is driven by the output element of an engine in a motor vehicle) adjacent the pressure plate, a torque transmitting clutch disc between the two plates, and at least one resilient device reacting against the housing to bias the pressure plate toward the counterpressure plate in order to clamp the clutch disc against the counterpressure plate and to thus rotate the clutch disc about the predetermined axis. The clutch disc has friction linings which are engageable by and disengageable from at least one of the two plates and are subject to wear as a result of repeated engagement with and disengagement from the at least one plate, and the friction clutch further comprises an adjusting unit including means for compensating for wear upon the friction linings to thereby maintain the bias of the at least one resilient device upon the pressure plate at a substantially constant value, means for engaging and disengaging the friction clutch including actuating means movable along a predetermined path to engage and disengage the friction clutch, and means for varying the torque transmitted by the friction clutch and/or by the clutch disc including means for gradually reducing the transmitted torque at least during a portion of movement of the actuating means along the predetermined path to disengage the friction clutch.

The pressure plate comprises a portion which is engaged and biased by the at least one resilient device, and the disengagement of the friction clutch can involve axial movement of the pressure plate away from the counterpressure plate against the bias of the at least one resilient device. The friction clutch can further comprise means for gradually reducing the torque which is transmittable by the friction clutch at least during a portion of axial movement of the pressure plate.

The friction clutch can also comprise means for securing the housing to the counterpressure plate to thus establish a power train between the actuating means and the securing means. The torque varying means can be disposed in the power train.

The pressure plate has a friction surface which is engageable with the friction linings to establish a power train between the actuating means and the clutch disc, and the torque varying means can be disposed in such power train.

The friction linings can include a first and a second set of friction linings, and the torque varying means can be disposed axially between the two sets of friction linings.

The torque varying means can include means for axially yieldably locating at least one of the two plates and the friction linings relative to the others of the two plates and the friction linings, and the torque varying means can be acted upon by a variable force which decreases to a minimal value in response to disengagement of the friction clutch and gradually increases to a maximum value at least during a portion of movement of the actuating means along the predetermined path to engage the friction clutch.

The means for varying the torque which is transmittable by the friction clutch can include means for reducing the transmitted torque during approximately 40–70 percent of movement of the actuating means along the predetermined path in a direction to disengage the friction clutch and for gradually increasing the torque which is transmittable by the friction clutch during approximately 40–70 percent of movement of the actuating means along the predetermined path in a direction to engage the friction clutch.

The at least one resilient device (such as a diaphragm spring) can have a degressive force-to-displacement ratio at least during a portion of movement of the actuating means along the predetermined path in a direction to disengage the friction clutch.

As mentioned above, the at least one resilient device can comprise a diaphragm spring which bears against the pressure plate. The friction clutch preferably further comprises a seat which tiltably mounts the diaphragm spring in the housing. The diaphragm spring can comprise an annular portion and the actuating means can comprise prongs or tongues which extend from the annular portion of the diaphragm spring. Such prongs can be of one piece with the annular portion of the diaphragm spring. The seat can comprise two portions (e.g., in the form of wire rings) which are disposed at opposite sides of the diaphragm spring. The latter can have a substantially sinusoidal force-to-displacement characteristic curve including a maximum, a minimum, a degressive portion between the minimum and the maximum, an operating point at the degressive portion in engaged condition of the friction clutch, and a ratio of forces from approximately 1:0.4 to 1:0.7 between the maximum and the minimum.

If the friction clutch is used in a motor vehicle, the means for engaging and disengaging the friction clutch can further comprise means for moving the actuating means and such moving means can include or constitute a pedal which is similar or analogous to the gas pedal of the motor vehicle.

Another feature of the invention resides in the provision of a motor vehicle having a gas pedal, an engageable and disengageable friction clutch, means for engaging and disengaging the friction clutch including actuating means movable along a predetermined path to disengage the clutch, and means for moving the actuating means including a second pedal which is similar or analogous to the gas pedal of the motor vehicle.

An additional feature of the invention resides in the provision of a preassembled engageable and disengageable clutch assembly or aggregate which comprises a housing, a pressure plate, a counterpressure plate which is rotatable about a predetermined axis, means for nonrotatably connecting the pressure plate to the counterpressure plate with limited freedom of movement in the direction of the predetermined axis, a torque transmitting clutch disc between the two plates, at least one resilient device which reacts against the housing to bias the pressure plate toward the counterpressure plate and to thereby clamp the clutch disc between the two plates, friction linings which form part of the clutch disc and are engageable by and disengageable from at least one of the two plates so that they are subject to wear as a result of repeated engagement with and disengagement from the at least one plate, an adjusting unit including means for compensating at least for wear upon the friction linings to thereby maintain the bias of the at least one resilient device upon the pressure plate at a substantially constant value, means for engaging and disengaging the clutch aggregate or assembly including actuating means movable along a predetermined path to disengage the clutch aggregate or assembly, and means for gradually reducing the torque which is transmitted by the clutch disc during a portion of movement of the actuating means to disengage the clutch assembly or aggregate. The torque reducing means can include at least one resilient element which is in series with the at least one resilient device.

Still another feature of the invention resides in the provision of a clutch aggregate or assembly which comprises a twin-mass flywheel including a first rotary mass connectable to an output shaft of a combustion engine and a second mass rotatable relative to the first mass, an oscillation damper having means for opposing rotation of the two masses relative to each other, and a torque transmitting friction clutch including a counterpressure plate forming part of the second mass, a pressure plate, means for non-rotatably connecting the pressure plate to the counterpressure plate with limited freedom of axial movement, a torque transmitting clutch disc between the two plates, at least one resilient device acting upon the pressure plate to bias the clutch disc against the counterpressure plate, friction linings forming part of the clutch disc and being engageable with and disengageable from at least one of the two plates and being subject to wear as a result of repeated engagement with and disengagement from the at least one plate, an adjusting unit including means for compensating at least for wear upon the friction linings to thereby maintain the bias of the at least one resilient device upon the pressure plate at a substantially constant value, means for engaging and disengaging the friction clutch including actuating means movable along a predetermined path to disengage the friction clutch, and means for gradually reducing the torque which can be transmitted by the friction clutch and/or by its clutch disc during a portion of movement of the actuating means in a direction to disengage the friction clutch.

The friction clutch of the just outlined clutch aggregate or assembly can further comprise a housing and means for securing the housing to the second mass so that the housing is separable from the second mass only in response to at least partial destruction or deformation of one of the two parts including the housing and the second mass.

The clutch disc of the aforementioned clutch aggregate or assembly can be provided with at least one substantially annular friction surface and the damper can be located radially outwardly of the friction surface.

A further feature of the invention resides in the provision of a clutch aggregate or assembly for use with a combustion engine, particularly in a motor vehicle. Such clutch aggregate or assembly comprises a torque transmitting friction clutch including a pressure plate, a counterpressure plate (such as a flywheel) which is rotatable about a predetermined axis, means for non-rotatably connecting the pressure plate to the counterpressure plate with limited freedom of axial movement, a torque transmitting clutch disc between the two plates, at least one resilient device acting upon the pressure plate to bias the clutch disc against the counterpressure plate, friction linings forming part of the clutch disc and being engageable with and disengageable from at least one of the two plates and being subject to wear as a result of repeated engagement with and disengagement from the at least one plate, an adjusting unit including means for compensating at least for wear upon the friction linings to thereby maintain the bias of the at least one resilient device upon the pressure plate at a substantially constant value during the useful life of the friction clutch, means for engaging and disengaging the friction clutch including actuating means movable along a predetermined path to disengage the friction clutch, means for gradually reducing the torque which can be transmitted by the friction clutch and/or by the clutch disc during a portion of movement of the actuating means in a direction to disengage the friction clutch, and axially elastic means for coupling the friction clutch with an output shaft of the combustion engine. The coupling means has a stiffness or rigidity which is selected in such a way that any axial, turning, wobbling (tilting) and/or flexing vibrations which are induced by the output shaft of the engine and would normally be transmitted to the friction clutch are damped and/or otherwise suppressed by the coupling means to an extent which ensures proper operation of the friction clutch, and especially proper operation of the adjusting unit.

The stiffness of the coupling means can be selected in such a way that the force to be applied to the actuating means for disengagement of the friction clutch is taken up by the coupling means without appreciable axial shifting of the clutch aggregate or assembly.

The adjusting unit of the just discussed aggregate or assembly can comprise resilient means in series with the at least one resilient device. Such aggregate or assembly can further comprise means for damping rotational and/or axial and/or radial vibrations of the counterpressure plate and such damping means is connectable between the output shaft of the engine and the counterpressure plate.

An additional feature of the invention resides in the provision of a driving unit, particularly for use in motor vehicles, which comprises an at least partially automatic (i.e., fully automatic or semiautomatic) transmission, an engine, and a torque transmitting friction clutch disposed between the engine and the transmission and being controlled at least in dependency on the operation of the transmission. The friction clutch of such driving unit comprises a pressure plate, a counterpressure plate (such as a flywheel) rotatable about a predetermined axis and connectable to the output shaft of the engine, means for non-rotatably connecting the pressure plate to the counterpressure plate with limited freedom of movement in the direction of the predetermined axis, a torque transmitting clutch disc between the two plates, at least one resilient device acting upon the pressure plate to bias the clutch disc against the counterpressure plate, friction linings forming part of the clutch disc and being engageable with and disengageable from at least one of the two plates and being subject to wear as a result of repeated engagement with and disengagement from the at least one plate, an adjusting unit including means for compensating at least for wear upon the friction linings to thereby maintain the bias of the at least one resilient device upon the pressure plate at a substantially constant value, means for engaging and disengaging the friction clutch including actuating means movable along a predetermined path to engage and disengage the friction clutch, and torque varying means including means for gradually reducing the torque which can be transmitted by the friction clutch and/or by the clutch disc during a portion of movement of the actuating means along the predetermined path in a direction to disengage the friction clutch.

The at least one resilient device (e.g., a diaphragm spring) can have a degressive force-to-displacement ratio, at least during a portion of movement of the actuating means along the predetermined path in a direction to disengage the friction clutch.

The means for varying the torque which can be transmitted by the friction clutch can include means for reducing the transmittable torque during approximately 40-70 percent of movement of the actuating means along the predetermined path in a direction to disengage the friction clutch and for gradually increasing the torque which can be transmitted by the friction clutch during approximately 40-70 percent of movement of the actuating means along the path in a direction to engage the friction clutch.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 7 is a plan view of a torsion spring which is utilized in the adjusting unit of the friction clutch shown in FIGS. 1 and 2;

FIG. 7a is an end elevational view of the torsion spring;

FIG. 18 is a diagram with curves denoting the characteristics of a diaphragm spring corresponding to that used in the friction clutch of FIGS. 1 and 2;

FIG. 19 is a diagram wherein the curves indicate variations of disengaging force when a friction clutch employs diaphragm springs exhibiting characteristics corresponding to those denoted by the curves in the diagram of FIG. 18;

FIG. 20 is a fragmentary elevational view as seen from the upper side of FIG. 21 and illustrates a fourth friction clutch;

FIG. 23 is a fragmentary axial sectional view of a fifth friction clutch;

FIG. 24 is a fragmentary axial sectional view of a sixth friction clutch;

DESCRIPTION OF PREFERRED EMBODIMENTS

Figure 1:
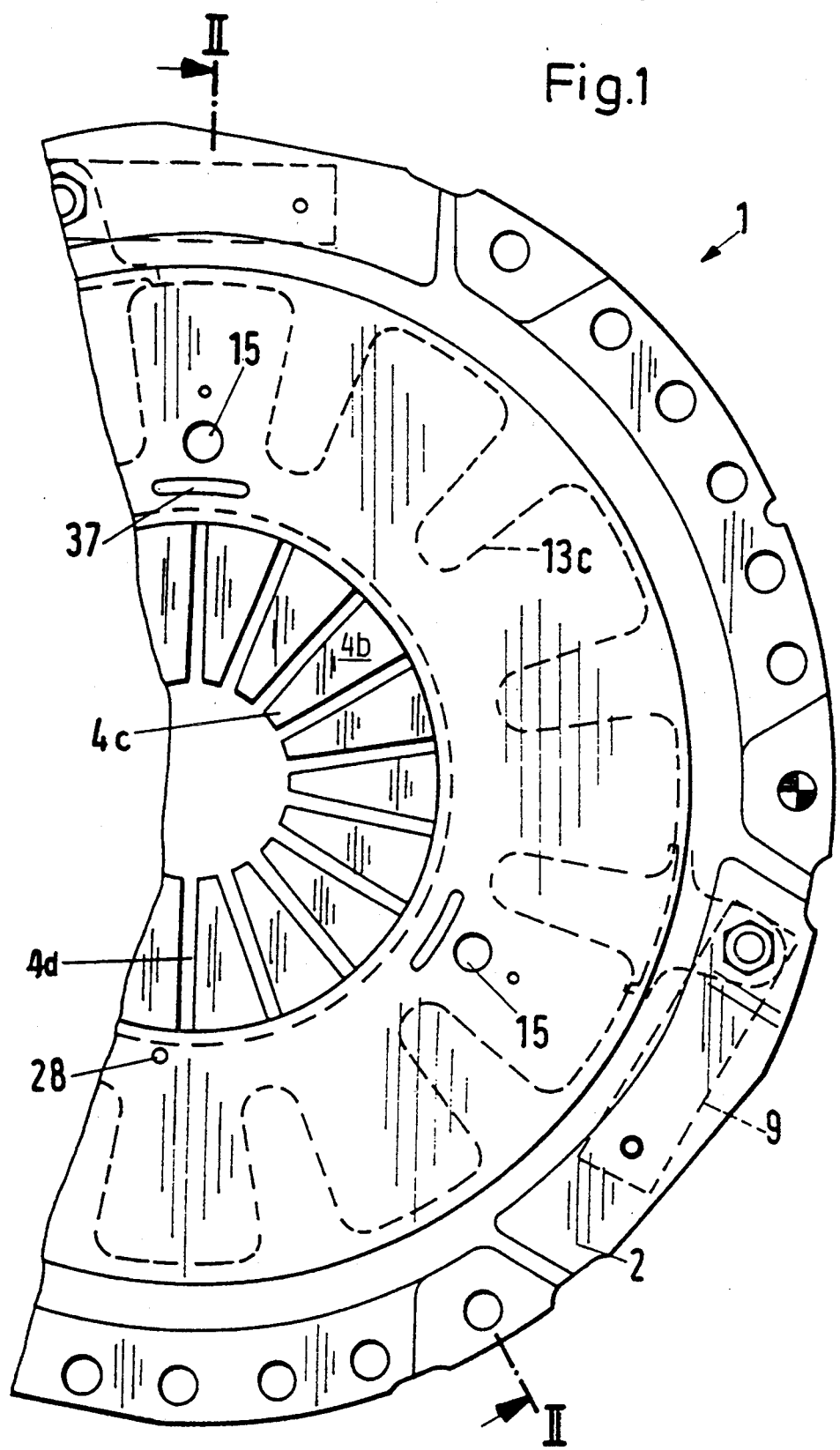
FIG. 1 is a fragmentary elevational view as seen from the right-hand side of FIG. 2 and shows a friction clutch which embodies one form of the present invention.
Figure 2:
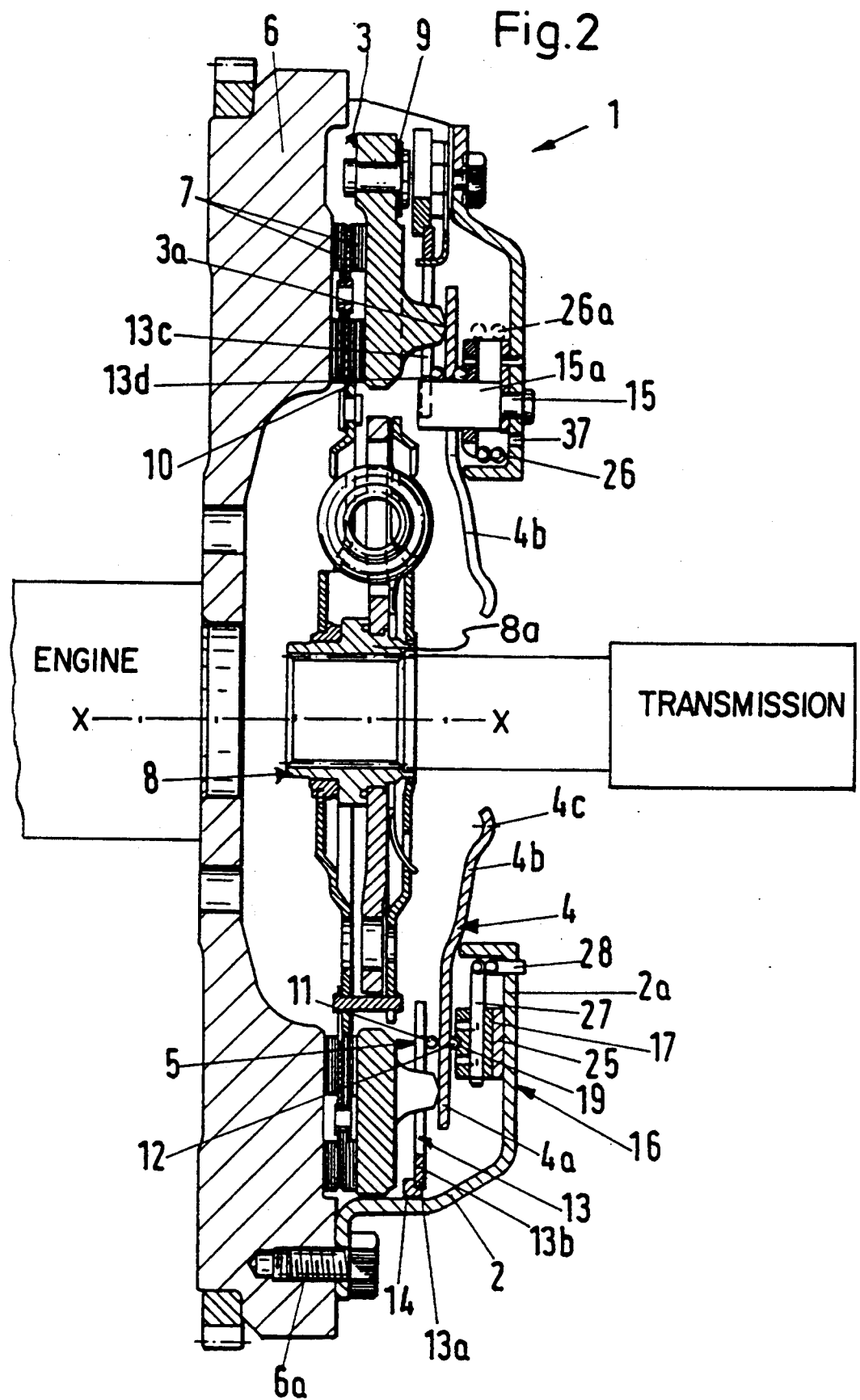
FIG. 2 is a sectional view substantially as seen in the direction of arrows from the line II—II in FIG. 1.

Referring first to FIGS. 1 and 2, there is shown a torque transmitting friction clutch 1 which comprises a housing or cover 2 and a pressure plate 3 which is nonrotatably but axially movably (within limits) connected to the cover 2. A resilient device in the form of a diaphragm spring 4 is installed, in stressed condition, between the bottom wall or end wall 2a of the cover 2 and the pressure plate 3 so as to bias the pressure plate in a direction to the left, as viewed in FIG. 2, namely against the adjacent set of friction linings 7 forming part of a torque transmitting clutch plate or clutch disc 8. The diaphragm spring 4 is tiltable relative to the cover 2 at a location which is determined by an annular seat assembly 5 (hereinafter called seat for short) carried by the bottom wall 2a. The normal stressed condition of the diaphragm spring 4 is such that it urges the pressure plate 3 against the adjacent set of friction linings 7 of the clutch disc 8 whereby a second set of friction linings forming part of the clutch disc bears against the adjacent friction surface of a rotary counterpressure plate 6 here shown as a flywheel and hereinafter called flywheel for short. The illustrated clutch disc 8 comprises a centrally located hub 8a which can be installed on the input shaft (not shown) of a variable-speed transmission in a motor vehicle and carries two sets of friction linings 7 with resilient segments 10 between the two sets of linings. The clutch 1 is engaged and the flywheel 6 transmits torque to the input shaft of the transmission when the two sets of friction linings 7 of the clutch disc 8 are clamped between the neighboring friction surfaces of the pressure plate 3 and flywheel 6.

The means for connecting the pressure plate 3 with the cover 2 comprises several circumferentially extending leaf springs 9 (see particularly FIG. 1) which hold the pressure plate 3 against rotation but permit it to move, within limits, axially of the cover 2. The purpose of the resilient segments 10 between the two sets of friction linings 7 forming part of the clutch disc 8 is to establish a progressive buildup (variation) of torque during engagement of the friction clutch 1. Such resilient segments permit limited axial shifting of the two sets of friction linings 7 toward each other to thus establish a progressive increase of axial forces which act upon the friction linings. However, it is equally within the purview of the invention to employ a clutch disc which replaces the illustrated clutch disc 8 and comprises one or two sets of friction linings 7 having no freedom of axial movement relative to each other. Such friction linings can be glued or otherwise affixed to opposite sides of a suitable plate-like carrier surrounding the hub of the modified clutch disc.

The illustrated diaphragm spring 4 comprises a circumferentially complete annular main or primary or basic portion 4a which is adjacent one or more axially extending protuberances or portions 3a of the pressure plate 3 and serves to generate the major part of forces which are necessary to bias the pressure plate 3 against the adjacent friction linings 7 so as to urge the other set of friction linings against the friction surface of the flywheel 6. The main or primary portion 4a of the diaphragm spring 4 carries radially inwardly extending yieldable prongs 4b having radially innermost portions or tips 4c engageable by a bearing, a pedal or other component which forms part of means for disengaging the friction clutch 1. The main or primary portion 4a of the diaphragm spring 4 includes a radially outer part which engages the portion or portions 3a of the pressure plate 3, and a radially inner part which is disposed between two portions 11 and 12 of the seat 5. Such radially inner portion of the main or primary portion 4a is tiltable between the portions 11 and 12 in order to move the radially outer portion of the diaphragm spring 4 toward or away from the flywheel 6, i.e., to engage or disengage the clutch 1.

The illustrated portions 11 and 12 of the seat 5 are wire rings which flank the radially inner part of the main or primary portion 4a of the diaphragm spring 4 at a location radially inwardly of the portion or portions 3a of the pressure plate 3. A resilient distance or displacement monitoring sensor 13, here shown as a diaphragm spring, is provided to bias the inner ring or portion 11 of the seat 5 toward the bottom wall 2a of the cover 2. The illustrated resilient sensor 13 in the form of a diaphragm spring can be replaced by other biasing means without departing from the spirit of the invention. The annular radially outer portion 13b of the sensor 13 is circumferentially complete and comprises an outermost part or portion 13a which reacts against an abutment 14 at the inner side of the cover 2. The sensor 13 further comprises radially inwardly extending elastic tongues 13c which bear upon the adjacent side of the ring 11.

The abutment 14 for the radially outermost part 13b of the annular portion 13a of the sensor 13 can comprise a circumferentially complete annulus which is welded or otherwise secured to the inner side of the cover 2. Alternatively, the abutment 14 can comprise two or more arcuate sections which are affixed to the inner side of the cover 2 to be engaged by the adjacent part 13b of the sensor 13. The individual segments or portions of the abutment 14 can be bonded, riveted or otherwise affixed to the cover 2. It is also possible to provide an abutment 14 consisting of one or more projections which are of one piece with the cover 2 and are configurated to extend into the path of leftward movement (reference being had to FIG. 2) of the radially outermost part 13a of the sensor 13. Such abutment can consist of radially inwardly deformed portions of the cover 2 or it can include one or more lugs or prongs which are bent from the adjacent portion of the cover to thus establish holes in the cover adjacent the radially outermost part 13a of the sensor 13. The making of such inwardly extending portions, lugs or prongs can take place subsequent to installation of the sensor 13 in the interior of the cover 2. The sensor 13 can be stressed as a result of the making of abutment 14, or the sensor is already maintained in stressed condition at the time the abutment 14 is either installed or formed as an integral part of the cover 2.

It is also possible to provide a more pronounced connection between the sensor 13 and the abutment 14. For example, it is possible to provide a bayonet mount which can establish a positive but separable connection between the sensor 13 and the abutment 14. The configuration of the bayonet mount can be such that the sensor 13 can be installed in the cover 2 to have its radially outermost part 13a located to the left of the abutment 14, as viewed in FIG. 2. The radially outermost part 13a is then shifted axially toward the bottom wall 2a of the cover 2 to stress the sensor 13 and to cause such radially outermost part 13a to advance over the adjacent portion or portions of the abutment 14. The next step involves turning of the sensor 13 relative to the abutment 14 and/or vice versa so as to releasably lock the radially outermost part 13a of the sensor in the position which is shown in FIG. 2, namely at the right-hand side of the abutment 14. In such friction clutches, the radially outermost part 13a of the sensor 13 can comprise a plurality of prongs or arms extending radially outwardly beyond the circumferentially complete annular portion 13b of the sensor. The abutment 14 then comprises a plurality of recesses or tooth spaces, which permit the prongs of the sensor 13 to pass therethrough before the sensor is turned so that its prongs are moved out of alignment with the tooth spaces of the abutment 14.

The means for centering the diaphragm spring 4 and/or the sensor 13 in the cover 2 and for simultaneously preventing rotation of such springs relative to the pressure plate 3 comprises axially parallel rivets 15. Such rivets can further serve as a means for centering the rings 11 and 12 of the seat 5 in the cover 2. Each rivet 15 comprises an elongated shank 15a which extends in parallelism with the axis (X—X) of rotation of the clutch plate 8 and is anchored in the bottom wall 2a of the cover 2. The shanks 15a extend through slots 4d between the neighboring prongs 4b of the diaphragm spring 4. The tongues 13c of the sensor 13 comprise portions 13d which straddle the adjacent portions of the shanks 15a so that the rivets 15 hold the sensor 13 against rotation in the cover 2.

The resilient sensor 13 is designed to furnish a substantially constant force during a predetermined stage of its axial deformation. The purpose of the sensor 13 is to bias the ring 11 toward the bottom wall 2a of the cover 2 as well as to take up the clutch disengaging force when such force is being applied to the tips 4c of prongs 4b forming part of the diaphragm spring 4. Depression of the tips 4c in a direction to the left, as viewed in FIG. 2, results in tilting of the diaphragm spring 4 between the rings 11 and 12 of the seat 5 whereby the main or primary portion 4a of the spring 4 is moved away from the flywheel 6 so that the pressure plate 3 can be retracted by the leaf springs 9 and releases the adjacent set of friction linings 7. In other words, the clutch disc 8 ceases to rotate with the flywheel 6. The arrangement is such that a state of equilibrium, or a state at least closely approximating equilibrium, exists between (a) that force which is generated upon the ring 11 during the application of disengaging force to the tips 4c of the prongs 4b and (b) the counterforce which is furnished by the sensor 13 and acts upon the ring 11. The term "disengaging force" is intended to denote that maximum force which must be applied to the tips 4c of the prongs 4b in order to disengage the friction clutch 1. Such disengaging force can also be applied to the prongs 4b by disengaging levers or by a pedal, not shown.

In accordance with a feature of the invention, the ring 12 between the diaphragm spring 4 and the bottom wall 2a of the cover 2 is biased by an adjusting or regulating unit 16 which is installed in the cover. The adjusting unit 16 ensures that, when the rings 11 and 12 of the seat 5 are shifted axially in a direction toward the pressure plate 3 and flywheel 6, no undesirable clearance will develop between the ring 12 and the cover 2. Otherwise stated, there will be no clearance between the ring 12 and the diaphragm spring 4. Such positioning of the ring 12 relative to the diaphragm spring 4 is desirable and advantageous because this ensures that there is no undesirable lost motion during actuation of the friction clutch 1 which, in turn, ensures optimum efficiency and superior operation of the friction clutch. Axial shifting of the rings 11 and 12 of the seat 5 toward the pressure plate 3 and flywheel 6 will take place as a result of wear upon the friction surfaces of the pressure plate 3 and flywheel 6 as well as (and particularly) due to wear upon the friction linings 7. The exact mode of automatic operation of the adjusting unit 16 will be described in full detail with reference to the diagrams which are shown in FIGS. 8, 9, 10 and 11.

Figure 3:
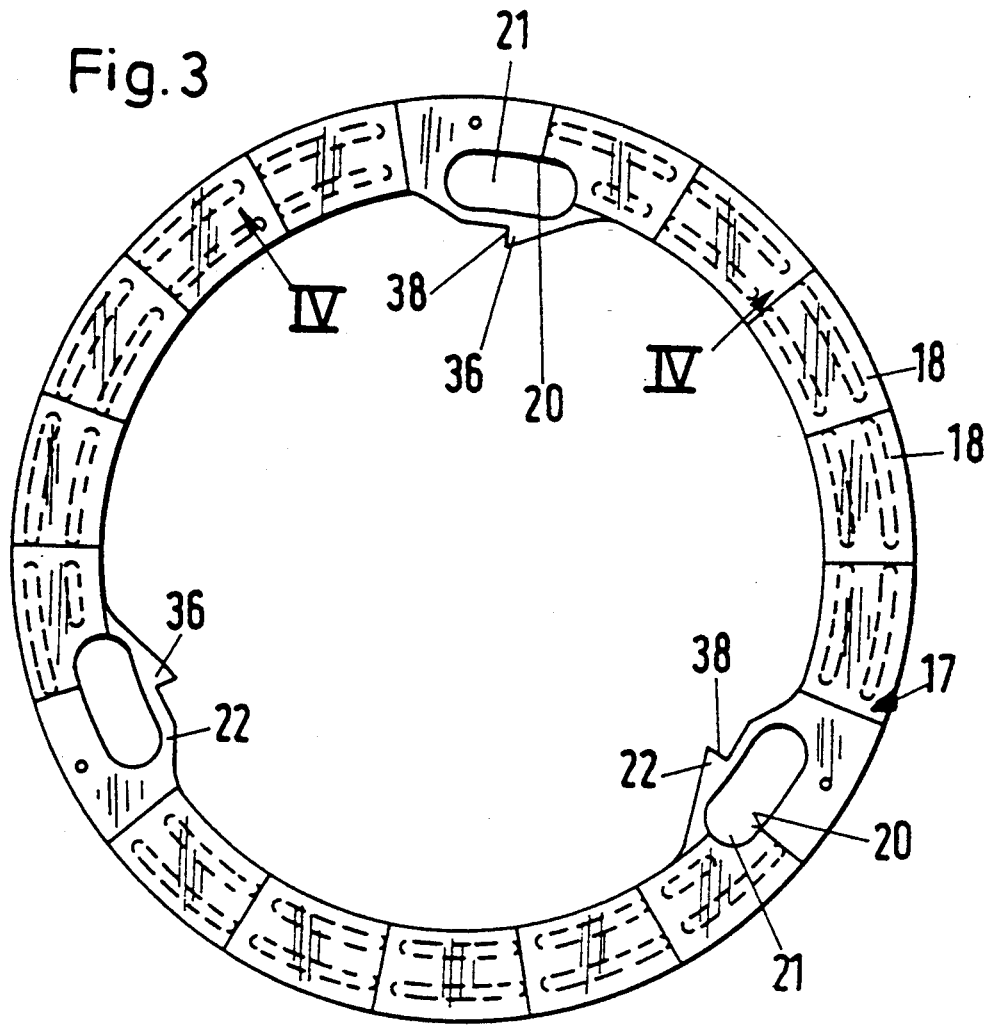
FIG. 3 is a plan view of a first annular adjusting or wear compensating member which is utilized in an adjusting unit of the friction clutch shown in FIGS. 1 and 2.
Figure 4:
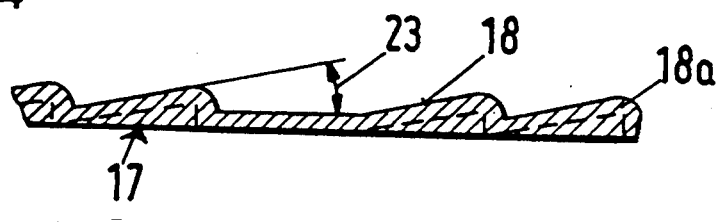
FIG. 4 is a fragmentary sectional view substantially as seen in the direction of arrows from the line IV—IV in FIG. 3.

The adjusting unit 16 comprises a spring-biased ring-shaped adjusting or wear compensating member 17 which is shown in FIGS. 3 and 4. This adjusting member 17 is installed between the diaphragm spring 4 and the bottom wall 2a of the cover 2 and comprises a set of inclines or ramps 18. All of the ramps 18 are inclined in the same direction circumferentially of the member 17. When the member 17 is installed in the cover 2, its ramps 18 face the bottom wall 2a. That side of the member 17 which faces away from the bottom wall 2a is flat or substantially flat and is provided with a circumferentially extending groove 19 (FIG. 2) which receives a portion of the ring 12. In this manner, the ring 12 (which is centered by the shanks 15a of the rivets 15) centers the member 17 in the cover 2. The configuration of the groove 19 and/or of the adjacent portion of the member 17 can be such that the ring 12 is not only held against uncontrolled radial movements but is also held against axial movement relative to the member 17. For example, the configuration of the surface bounding the groove 19 can be such that the ring 12 can be received therein by snap action. Alternatively, the plane surface of the member 17 which faces away from the bottom wall 2a can be provided with spaced-apart projections or other configurations which enable the member 17 to clampingly or otherwise engage (e.g., by snap action) the adjacent portions of the ring 12 and to thus ensure that this ring is held against any uncontrolled radial and/or axial movements relative to the member 17.

If the temperature of the friction clutch 1 in the region of the adjusting unit 16 fluctuates within a wide range, it is advisable to provide for some compensatory movement between the ring 12 and the member 17 of the adjusting unit 16. For example, this can be achieved by making the ring 12 a split ring so that it can expand or contract in the circumferential direction of the member 17. It is also possible to assemble the ring 12 of two, three or more discrete arcuate sections, i.e., to provide two or more interruptions in such ring in order to even more fully compensate for eventual pronounced fluctuations of the temperature of the adjusting unit 16. This enables the ring 12 to conform its diameter to the varying diameter of the groove 19.

The member 17 which is shown in FIGS. 3 and 4 is made of a plastic material, for example, of a heat-resistant thermoplastic substance which can be reinforced by glass fibers or the like. This renders it possible to mass-produce the member 17 in an injection molding or other suitable machine. However, it is equally within the purview of the invention to make the member 17 of a metallic sheet material or of a sintered metal. Still further, it is within the scope of the invention to make the ring 12 of one piece with the member 17. This is possible regardless of whether the member 17 is made of a metallic or plastic material. Analogously, the ring 11 can be made of one piece with the sensor 13; all that is necessary is to provide the tongues 13c of the sensor 13 with suitable projections in the form of beads or the like which together constitute a composite or one-piece ring 11.

The rivets 15, and more particularly the shanks 15a of such rivets, preferably further constitute a means for centering the member 17 of the adjusting unit 16 in the cover 2 of the friction clutch 1. The rivets 15 are preferably equidistant from each other in the circumferential direction of the cover 2. The shanks 15a extend through suitable openings 21 which are provided in the member 17 and are bounded by surfaces 20 which are engaged by the shanks 15a to thus center the member 17 in the cover 2. The illustrated openings 21 are elongated slots having a substantially constant width (as measured in the radial direction) and extend circumferentially of the member 17. These openings 21 are closely adjacent the radially inner portion of the member 17. As can be seen in FIG. 3, the member 17 further comprises lobes 22 which are disposed radially inwardly of the respective openings 21.

The member 17 which is shown in FIG. 3 comprises three openings 21 and a total of five ramps 18 between each pair of neighboring openings. The slopes (note the angle 23 in FIG. 4) of the ramps 18 are selected in such a way that the ramps enable the member 17 to compensate for wear upon the pressure plate 3, flywheel 6 and friction linings 7 during the entire useful life of the friction clutch 1. The same applies for the length of the openings 21 in the circumferential direction of the member 17. Such length is selected with a view to permit an angular adjustment of the member 17 relative to the bottom wall 2a of the cover 2 which is necessary for compensation for the aforediscussed wear upon the pressure plate 3, flywheel 6 and friction linings 7. The length of the openings 21 can be selected in such a way that the member 17 is free to perform an angular movement in the range of between 8° and 60°, preferably within a range of between 10° and 30°. In the embodiment which is illustrated in FIG. 3, the angular adjustability of the member 17 relative to the cover 2 is approximately 12°. Furthermore, the angle 23 (which is shown in FIG. 4 and denotes the slope of the ramps 18) is also in the range of 12°. This angle 23 is selected in such a way that, when the ramps 18 of the member 17 and the complementary inclines or ramps 24 of a second annular displacing member 25 (shown in FIGS. 5 and 6 and hereinafter called annulus) are in frictional engagement with each other, the member 17 and the annulus 25 cannot slip because the friction between the abutting surfaces of the ramps 18 and 24 is too pronounced. Depending on the nature of the material of the member 17 and annulus 25 and on the finish of the abutting surfaces of the ramps 18 and 24, the angle 23 can be in the range of between 5° and 20°.

The member 17 is stressed in the circumferential direction by a ring-shaped torsion spring 26 which is shown in FIGS. 1, 2, 7 and 7a. The bias of the spring 26 is selected in such a way that the member 17 is stressed in a direction which is necessary for adjustment in order to compensate for wear upon the pressure plate 3, flywheel 6 and friction linings 7. In other words, the spring 26 tends to bias the member 17 in a direction such that, as the ramps 18 slide along the complementary ramps 24 of the annulus 25, this results in axial displacement of the member 17 in a direction toward the pressure plate 3, i.e., axially of and away from the bottom wall 2a of the cover 2. It is clear that the illustrated torsion spring 26 constitutes but one form of means for biasing the member 17 in a direction to slide along the annulus 25 and to thereby advance axially toward the pressure plate 3. This torsion spring comprises a relatively small number of convolutions 35 (for example, not more than two convolutions) and two legs 27 and 28. The leg 27 extends radially outwardly (see particularly FIGS. 7 and 7a), and the leg 28 extends in part radially and in part axially (see FIG. 7a). The leg 27 is non-rotatably anchored in or is otherwise connected with the member 17, and the leg 28 is non-rotatably anchored in or is otherwise secured to the cover 2. The spring 26 is installed in stressed condition.

Figure 6:
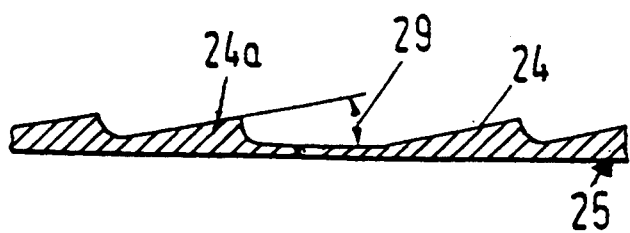
FIG. 6 is a fragmentary sectional view substantially as seen in the direction of arrows from the line VI—VI in FIG. 5.
Figure 5:
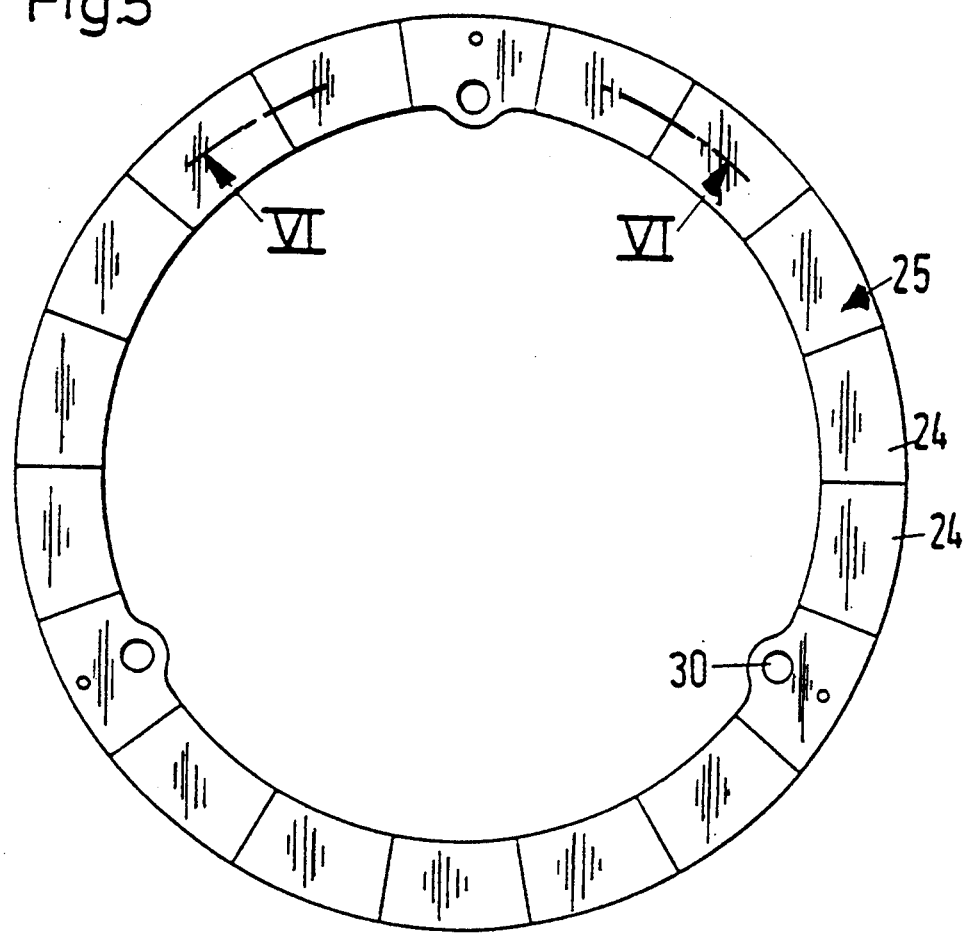
FIG. 5 is a plan view of a second annular adjusting or wear compensating member which is utilized in the adjusting unit of the friction clutch shown in FIGS. 1 and 2.

A presently preferred form of the displacing annulus 25 is shown in FIGS. 5 and 6. This annulus comprises the aforediscussed ramps 24 which are complementary to the ramps 18 of the member 17. The surfaces along which the ramps 18 abut the ramps 24 can be congruent surfaces. The angle 29 which is shown in FIG. 6 preferably matches the angle 23 which is shown in FIG. 4. As can be readily seen by comparing FIGS. 3 and 5, the distribution of ramps 24 on the annulus 25 is the same as, or at least similar to, that of the ramps 18 on the member 17. The annulus 25 is non-rotatably secured to the housing 2. To this end, the annulus 25 is provided with a plurality of holes 30 which can receive portions of the rivets 15 so that such rivets also serve as a means for non-rotatably coupling the annulus 25 to the bottom wall 2a of the cover 2. This can be seen in the upper portion of FIG. 2.

FIG. 2 further shows, by broken lines, that the means for biasing the member 17 in the circumferential direction of the cover 2 can comprise an additional torsion spring 26a which can be configurated in the same way as the torsion spring 26. Thus, one leg of the torsion spring 26a can be anchored in the member 17 and its other leg can be anchored in the cover 2. The torsion spring 26a is also installed in stressed condition so that it always tends to turn the member 17 relative to the cover 2.

An advantage of the utilization of two torsion springs 26, 26a is that their bias can increase under the action of centrifugal force when the friction clutch 1 is in use and its cover 2 rotates with the pressure plate 3 and flywheel 6. The flywheel 6 can receive torque from the output element of an engine in a motor vehicle. For example, the increased bias of the spring 26 in response to the action of centrifugal force can be compensated for by the torsion spring 26a. To this end, the springs 26 and 26a are convoluted in such a way that, at least when acted upon by centrifugal force, they generate and apply to the member 17 forces which act in opposite directions as seen in the circumferential direction of the member 17. The diameters of convolutions of the torsion spring 26a are larger than the diameters of convolutions 35 of the torsion spring 26. Reference may be had to FIG. 2. This enables the designer of the clutch to select the centrifugal forces acting upon the torsion springs 26 and 26a in such a way that the forces acting upon the member 17 in the circumferential direction are at least substantially balanced. Adequate balancing can be achieved by appropriate selection of the diameters of convolutions of the springs 26, 26a, by appropriate selection of the diameters of wires of which these springs are made and/or by appropriate selection of the number of their convolutions. FIG. 2 shows that the torsion spring 26 is located radially inwardly and the torsion spring 26a is located radially outwardly of the member 17. However, it is equally possible to install each of these springs radially inwardly or radially outwardly of the member 17.

FIG. 7 shows the torsion spring 26 in a plan view. When this spring is not under stress, its legs 27, 28 make an angle 31 which can be in the range of 40°-120°. The leg 27 will be moved (relative to the leg 28) to the position 32 when the friction linings 7 are new (i.e., prior to being subjected to any wear). The leg 27 assumes the position 33 of FIG. 7 when the linings 7 have undergone a maximum permissible amount of wear. The angle 34 of adjustment (between the positions 32 and 33 shown in FIG. 7) is approximately 12°. The spring 26 of FIG. 7 is designed in such a way that, when in unstressed condition, only a single convolution 35 extends between the legs 27 and 28. The remaining portion of the spring 26 (namely outside of the angle 31) has two convolutions 35 (FIG. 7a) which overlie each other as seen in the axial direction of the spring 26.

The spring 26a is similar to the spring 26 but, in the embodiment of FIGS. 1 and 2, has a larger diameter and is stressed in a different direction as concerns its bias upon the member 17. The force which the spring 26 applies to the member 17 is greater than the force of the spring 26a.

When the wear upon the component parts of the friction clutch 1 is minimal, i.e., when the clutch is yet to be put to use, the angular positions of the member 17 and annulus 25 relative to each other are such that the axially extending peaks 18a of the ramps 18 forming part of the member 17 extend close to or actually abut the axially extending peaks 24a of the ramps 24 on the annulus 25. In other words, the combined thickness of the member 17 and annulus 25 then assumes a minimum value, i.e., these parts occupy a minimum amount of space in the axial direction of the cover 2 between the bottom wall 2a and the diaphragm spring 4.

In the friction clutch 1 of FIGS. 1 and 2, the annulus 25 constitutes a separately produced part which is installed at the inner side of the bottom wall 2a of the cover 2. However, it is also possible to make the annulus 25 an integral part of the cover 2; for example, the lobes 24 can be stamped out of the bottom wall 2a to extend toward the member 17 of the adjusting unit 16. Such mode of making the annulus 25 (namely its lobes 24) is particularly advantageous if the cover 2 is made of a single piece of metallic sheet material.

The shoulders 38 on the pallets 36 of lobes 22 of the member 17 can be utilized to ensure proper angular positioning of the member 17 in the cover 2 during assembly of the friction clutch 1. The shoulders 38 can be engaged by a suitable turning or retaining tool which reacts against the cover 2. The tool is put to use during assembly of the friction clutch 1 and is removed when the attachment of the cover 2 to the flywheel 6 (by threaded fasteners 6a one of which is shown in FIG. 2) is completed. The adjusting unit 16 becomes operative as soon as the aforementioned tool is removed, i.e., as soon as the member 17 is free to turn relative to the cover 2 (if and when necessary) to compensate for wear upon the parts 3, 6 and/or 7. As shown in FIG. 1, the bottom wall 2a of the cover 2 has circumferentially extending elongated slot-shaped windows 37 which enable the prongs or analogous extensions of the tool to engage the shoulders 38 on the pallets 36 of the lobes 22 of the member 17 during assembly of the friction clutch 1. The shoulders 38 can be replaced with other configurations (e.g., holes) in or on the member 17, as long as the tool can properly engage and hold the member 17 in requisite position during assembly of the friction clutch 1. The length of the windows 37 should at least suffice to ensure that the member 17 can be turned back through the maximum angle which is required to compensate for wear upon the pressure plate 3, flywheel 6 and/or friction linings 7. It is also possible to assemble the friction clutch 1 in a first step and to thereupon employ a tool which is to be used to turn the member 17 relative to the cover 2. The prongs of the tool are inserted through the windows 37 of the bottom wall 2a and engage the shoulders 38 on the pallets 36 of the lobes 22. The member 17 is then turned back in a direction to ensure that its ramps 18 cooperate with the ramps 24 of the annulus 25 in a sense to move the member 17 closer to the bottom wall 2a to a position from which the member 17 must turn in order to compensate for wear upon the parts 3, 6 and/or 7 in actual use of the friction clutch 1. The member 17 is then located at a minimum distance from the bottom wall 2a and is secured in such position, for example, with a clamp or a pin extending into registering openings of the cover 2 and member 17 to prevent angular displacement of the thus coupled parts 2, 17 relative to each other. The clamp or pin is removed when the attachment of the cover 2 to the flywheel 6 is completed, i.e., the unit 16 is then ready to perform its adjusting action if and when necessary, depending on the extent of wear upon the pressure plate 3, flywheel 6 and/or friction linings 7.

The dimensions of the windows 37 in the cover 2 are selected in such a way that the member 17 can be returned to its "retracted" position (at a minimal distance from the bottom wall 2a) if and when the cover 2 is to be detached from the flywheel 6. This involves disengagement of the clutch 1 (i.e., the application of axial force against the tips 4c of the prongs 4b in a direction toward the clutch disc 8) so that the diaphragm spring 4 no longer exerts an axially oriented force against the ring 11 of the seat 5 and the member 17 can be readily turned relative to the cover 2.

Figure 8:
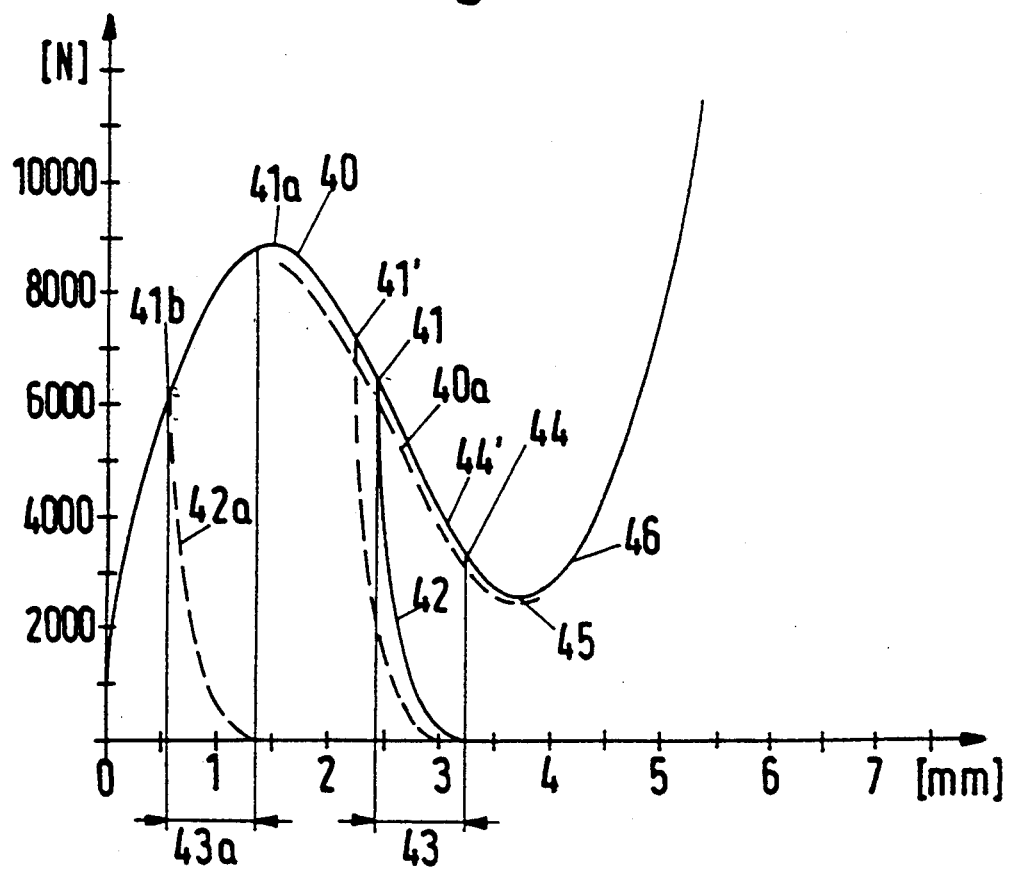
FIG. 8 is a diagram wherein the curves denote variations of the force generated by a diaphragm spring which is used to bias a pressure plate against a clutch disc in the friction clutch of FIGS. 1 and 2.
Figure 10:
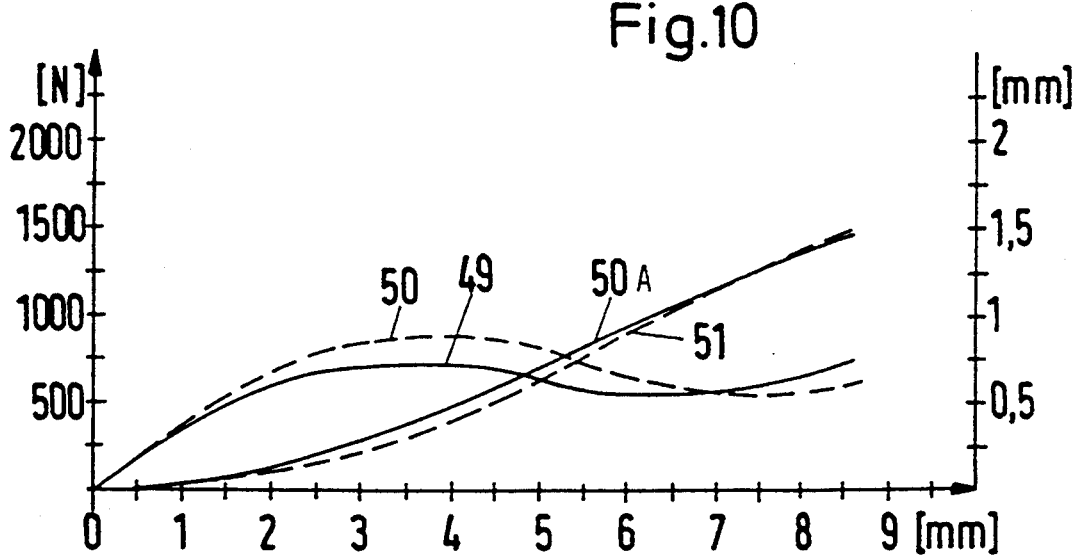
FIG. 10 is a diagram with curves denoting the forces to be applied in order to disengage the friction clutch of FIGS. 1 and 2.

Referring to the diagram of FIG. 8, the sinusoidal curve 40 denotes the axially oriented force which develops in response to changes of conicity of the diaphragm spring 4 as a result of deformation between two abutments spaced apart from each other a distance corresponding to that of the seat 5 from the projecting portion or portions 3a of the pressure plate 3. The distance between such abutments is measured along the abscissa, and the force which is generated by the diaphragm spring 4 is measured along the ordinate of the coordinate system of FIG. 8. The (operating) point 41 of the curve 40 denotes the force which is generated by the diaphragm spring 4 upon installation of the friction clutch 1 and while the clutch is engaged; at such time, the spring 4 exerts a maximum force upon the portion or portions 3a of the pressure plate 3 and the latter exerts a maximum force which is used to clamp the friction linings 7 of the clutch disc 8 between the friction surfaces of the pressure plate 3 and flywheel 6. The point 41 can be shifted along the curve 40 toward or away from the abscissa by changing the conicity of the diaphragm spring 4 in assembled condition of the friction clutch 1.

The curve 42 denotes in FIG. 8 the axial spreading force which is applied by the resilient segments 10 between the two sets of friction linings 7. Such spreading force of the segments 10 opposes the force which the diaphragm spring 4 applies to the pressure plate 3. It is desirable and advantageous that the force which develops as a result of resilient deformation of the segments 10 at least match the bias of the diaphragm spring 4; it is also possible to select the mounting of the diaphragm spring 4 and the resiliency and bias of the segments 10 in such a way that the force which is denoted by the curve 42 exceeds the force which is denoted by the curve 40. The stressing of the resilient segments 10 decreases in response to disengagement of the friction clutch 1, and the extent to which the stressing decreases is denoted by the distance 43. This results in a corresponding axial shifting or deformation of the diaphragm spring 4 whereby the segments 10 assist the disengagement of the friction clutch. In other words, the required maximum disengaging force is less than that which would be necessary at the point 41 of the curve 40 in FIG. 8 if the resilient segments 8 were omitted. The point 44 on the curve 40 denotes the magnitude of the force of diaphragm spring 4 at the instant of disengagement of the friction clutch 1, i.e., the friction linings 7 are no longer engaged by the friction surfaces of the pressure plate 3 and flywheel 6 when the point 44 is exceeded. Due to the degressive characteristic curve of the diaphragm spring 4, the disengaging force which is to be applied at such time is much less than that corresponding to the force denoted by the point 41 of the curve 40. The disengaging force which must be applied in the friction clutch 1 decreases all the way to the minimum or lowest point 45 of the sinusoidal curve 40. From there on, the required disengaging force rises again and the extent of axial movement of the tips 4c of prongs 4b along their predetermined path can be selected in such a way that the magnitude of this force does not exceed that at the point 44 (i.e., the maximum disengaging force) and preferably remains therebelow. In other words, the force should not rise above that denoted by the point 46.

Figure 9:
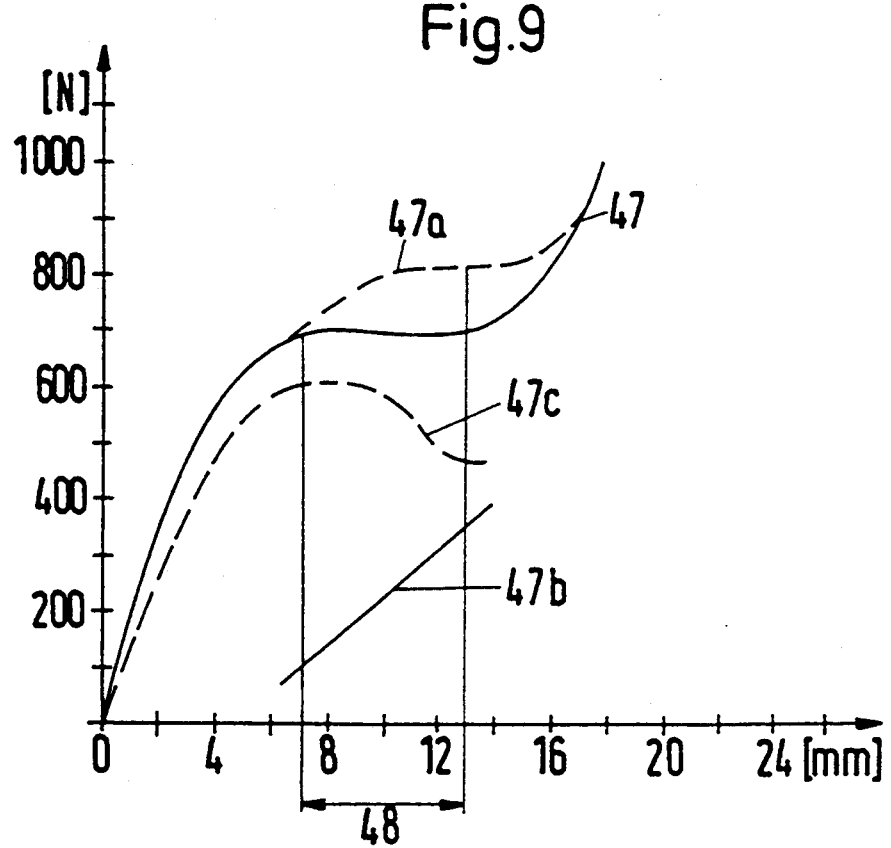
FIG. 9 is a diagram wherein the curves denote variations of certain characteristics of a resilient sensor in the friction clutch of FIGS. 1 and 2.

The magnitude of force which is generated by the sensor 13 is denoted by the curve 47 which is shown in FIG. 9. This curve actually denotes the force which is generated when the conicity of the sensor 13 is changed as a result of stressing. Such change in stressing of the sensor 13 takes place as a result of variations of the distance between two abutments whose radial spacing corresponds to that of the abutment 14 at the inner side of the cover 2 from the ring 11 of the seat 5. The distance 48 covered by the sensor 13 is that during which the axial force generated by the sensor remains substantially constant. The magnitude of this force is selected in such a way that it at least approximates the magnitude of the clutch disengaging force as denoted by the point 44 on the curve 40 of FIG. 8. The supporting force to be furnished by the sensor 13 is less than that at the point 44 of the curve 40 by a value corresponding to the lever arm of the diaphragm spring 4. In most instances, such transmission ratio is between 1:3 and 1:5 but can also be less than 1:3 or greater than 1:5 for certain applications of the improved friction clutch.

The just mentioned transmission ratio of the diaphragm spring 4 denotes the ratio of radial distance of the seat 5 from the portion or portions 3a of the pressure plate 3 to the radial distance of the seat 5 from the tips 4c of the prongs 4b forming part of the diaphragm spring 4 and being depressible, for example, by a disengaging bearing of the friction clutch.

The mounting of the sensor 13 in the friction clutch 1 is selected in such a way that the sensor can perform an axial movement in the region of the seat 5, namely in a direction toward the friction linings 7, to an extent corresponding at least to the axial adjustment of the pressure plate 3 toward the flywheel 6 as a result of wear upon the friction surfaces of the parts 3, 6 and as a result of wear upon the friction linings 7. This ensures that the axially oriented supporting force for the seat 5 remains constant regardless of the wear upon the parts 3, 6 and 7. In other words, the substantially linear portion 48 of the curve 47 in FIG. 9 should have a length not less than that corresponding to the aforediscussed extent of wear and preferably exceeding the latter. This ensures that the adjusting unit 16 can also compensate, at least in part, for eventual tolerances during assembly of the friction clutch 1.

In order to ensure the establishment of a practically unchanged (i.e., predetermined) release point 44 for the friction linings 7 when the friction clutch 1 is disengaged, it is possible to employ torque varying means 10 known as a so-called twin-segment biasing means which is to operate between the two sets of friction linings 7. Such biasing means can comprise pairs of discrete parallel resilient segments which are disposed back-to-back. The segments which are disposed back-to-back can be subjected to a certain initial stress in the axial direction of the clutch disc 8 so that the axial force which is generated by all such pairs of segments relative to each other at least matches the disengaging force denoted by the point 44 of the sinusoidal curve 40 when the clutch disc 8 is not clamped between the pressure plate 3 and the flywheel 6. It is preferred to ensure that the combined force of the pairs of resilient segments slightly exceed that force of the diaphragm spring 4 which is denoted by the point 44 on the curve 40 of FIG. 8. Prestressing of resilient segments between the friction linings 7 of the clutch disc 8 renders it possible to at least substantially compensate for so-called penetration or embedding losses which develop during the useful life of the friction clutch 1 as a result of penetration of the segments 10 into the adjacent friction linings 7. Such penetration of segments 10 into the adjacent linings 7 is to be expected in actual use of the friction clutch 1. It has been found that an axial stressing or give of the segments 10 in the range of 0.3 mm to 0.8 mm (preferably approximately 0.5 mm) is quite satisfactory. By properly limiting the extent of axial movability of the two sets of friction linings 7 relative to each other and by properly selecting the bias of the segments 10 between the two sets of friction linings, one can ensure that, at least during disengagement of the friction clutch 1, the pressure plate 3 covers a predetermined distance 43 in a direction away from the friction linings under the action of the resilient segments 10. In order to achieve such predetermined distance 43, it is possible to limit the extent of axial movement of the two sets of friction linings 7 in directions toward as well as away from each other, e.g., by the provision of suitable stops, i.e., in directions to stress the segments 10 as well as to enable these segments to dissipate energy. Suitable resilient means for use between the two sets of friction linings 7 are disclosed, for example, in commonly owned copending German patent application Serial No. P 42 06 880.0.

In order to guarantee an optimal operation of the friction clutch 1, i.e., to ensure that the adjusting unit 16 will be capable of automatically compensating for wear upon the parts 3, 6 and/or 7 of the friction clutch, it is desirable to ensure that the sum of forces which are applied by the diaphragm spring 4, sensor 13 and resilient segments 10, as well as the force which is applied to the diaphragm spring 4 solely by the sensor 13 when the pressure plate 3 is already disengaged from the adjacent friction linings 7, at least equals but preferably exceeds the variable disengaging force which is being applied to the tips 4c of prongs 4b during disengagement of the friction clutch 1. The variable disengaging force is denoted by the curve 49 in the diagram of FIG. 10.

The heretofore discussed mode of operation of the friction clutch 1 pertains primarily or exclusively to a predetermined mode of installing the diaphragm spring 4 and without taking into consideration the wear upon the friction linings 7. When a certain amount of wear has taken place (such wear is particularly pronounced upon the friction linings 7), the position of the pressure plate 3 changes in that the pressure plate migrates toward the flywheel 6 whereby the conicity of the diaphragm spring 4 (and hence the bias of this spring upon the portion or portions 3a of the pressure plate) changes accordingly while the friction clutch 1 remains in engaged condition. Such change of bias of the diaphragm spring 4 upon the pressure plate 3 entails that the point 41 of the curve 40 in the diagram of FIG. 8 migrates toward the point 41' and that the point 44 migrates toward the point 44'. This terminates the state of equilibrium between the diaphragm spring 4 and the sensor 13 at the ring 11 during disengagement of the friction clutch 1. Wear upon the friction linings 7 entails an increase in the magnitude of force which is applied by the diaphragm spring 4 to the sensor 13 and also causes a shifting of the progress of the disengaging force in a sense toward an increase of such force. The thus obtained progress of the disengaging force is denoted in FIG. 10 by the broken-line curve 50. Since the magnitude of the disengaging force increases, the axially oriented force of the sensor 13 upon the diaphragm spring 4 during disengagement of the friction clutch 1 is overcome so that the sensor 13 yields in the region of the seat 5 through an axial distance corresponding essentially to the extent of wear upon the friction linings 7. During such deformation stage of the sensor 13 (which can be said to constitute a means for monitoring the extent of wear upon the parts 3, 6 and/or 7), the diaphragm spring 4 bears against the portion or portions 3a of the pressure plate 3 whereby the conicity of the spring 4 changes together with the amount of energy which is stored therein. Thus, the energy which is stored by the diaphragm spring 4 also changes together with the force which the spring 4 exerts upon the ring 11, i.e., upon the sensor 13 and upon the pressure plate 3. As can be seen in FIG. 8, such change takes place in a sense to reduce the magnitude of the force which is applied by the diaphragm spring 4 and continues to take place until the magnitude of the axial force applied by the spring 4 to the sensor 13 at the ring 11 is at least substantially neutralized or balanced by the oppositely directed force which is exerted by the sensor 13. In other words, and referring again to the diagram of FIG. 8, the points 41' and 44' of the curve 40 then migrate toward the points 41 and 44, respectively. When the reestablishment of the state of equilibrium is completed, the pressure plate 3 is again ready to be disengaged from the adjacent friction linings 7. During the aforediscussed stage of adjustment in order to compensate for wear upon the friction linings 7, while the friction clutch 1 is being disengaged, the member 17 of the adjusting unit 16 is caused to turn about the axis X—X of the clutch disc 8 under the bias of the stressed torsion spring 26 which causes a displacement of the ring 12 to an extent corresponding to the extent of wear upon the friction linings 7; this, in turn, eliminates any play at the seat 5. When the adjusting step is completed, the magnitude of the disengaging force again corresponds to that denoted by the curve 49 in the diagram of FIG. 10. The curves 50A and 51 in the diagram of FIG. 10 denote the axial displacement of the pressure plate 3 when the magnitude of the disengaging force varies in accordance with the curves 49 and 50, respectively.

Figure 11:
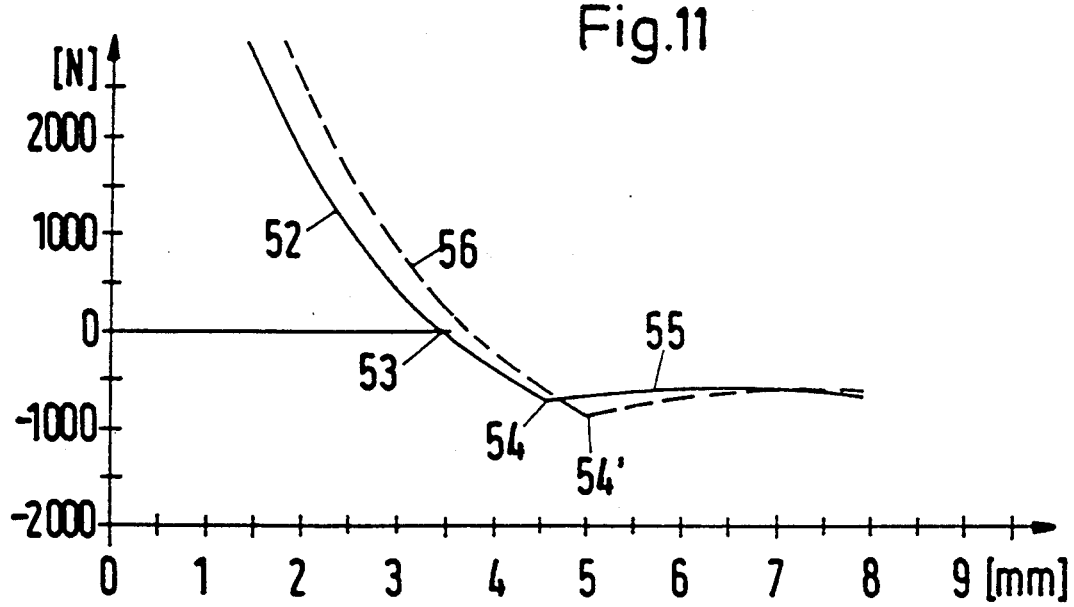
FIG. 11 is a diagram with curves denoting the reduction of forces acting upon the housing and upon the sensor of the friction clutch of FIGS. 1 and 2 during disengagement of the friction clutch.

The curves which are shown in the diagram of FIG. 11 denote the variations of forces acting upon the cover 2 and upon the sensor 13 during disengagement of the friction clutch 1. The extreme values are omitted. Starting with the engaged condition of FIG. 2, the cover 2 and the pressure plate 3 are first acted upon by a force whose magnitude corresponds to the operating or installation point 41 of the diaphragm spring 4 as denoted by the curve 40 of FIG. 8. As the disengagement of the friction clutch 1 progresses, the magnitude of the axial force exerted by the diaphragm spring 4 upon the cover 2 and the ring 12 decreases in accordance with the curve 52 of FIG. 11, namely to the point 53. When the point 53 is exceeded in the direction of disengagement of the friction clutch 1, a conventional frictional clutch (wherein the diaphragm spring is tiltable at a fixed location relative to the clutch cover, i.e., wherein the ring 11 is fixedly installed in the cover) would operate in such a way that the force exerted by the diaphragm spring 4 upon the cover 2 at the level of the seat 5 would change (reverse) its direction. However, the novel friction clutch 1 operates in such a way that the change in the axial direction of the force applied by the diaphragm spring 4 in the region of the seat 5 is taken up by the sensor 13. When the magnitude of the force which is being applied by the diaphragm spring 4 reaches the value denoted by the point 54 on the curve 52 of FIG. 11, the diaphragm spring 4 becomes disengaged from the portion or portions 3a of the pressure plate 3. The resilient segments 10 between the two sets of friction linings 7 generate an axially oriented force which assists the disengagement of the friction clutch 1 at least to the point 54 on the curve 52 of FIG. 11. The force which is generated by the resilient segments 10 decreases as the extent of displacement of tips 4c of prongs 4b toward the clutch disc 8 increases during disengagement of the friction clutch 1, i.e., in response to progressing axial displacement of the pressure plate 3 in a direction away from the flywheel 6. Thus, the curve 52 of FIG. 11 denotes a resultant of a disengaging force which is being applied to the tips 4c during disengagement of the friction clutch 1 on the one hand and of the axial force which is being applied by the resilient segments 10 of the clutch disc 8 upon the diaphragm spring 4 in the region of portion or portions 3a of the pressure plate 3. When the point 54 is exceeded in the direction of disengagement of the friction clutch 1, the axially oriented force which is being applied by the diaphragm spring 4 to the ring 11 is compensated for by the oppositely directed force which is being applied by the sensor 13. These two forces are balanced by the pressure plate 3 not later than when the axial pressure upon the friction linings 7 is terminated. As the disengaging operation progresses, the axially oriented force which is being applied by the sensor 13 at the seat 5 preferably exceeds, at least slightly, the prevailing disengaging force. The portion 55 of the curve 52 in the diaphragm of FIG. 11 indicates that, as the extent of movement to disengage the friction clutch 1 increases, the disengaging force (and the force applied by diaphragm spring 4 to the ring 11) decreases when compared with the disengaging force denoted by the point 54 of the curve 52. The broken-line curve 56 in the diagram of FIG. 11 denotes that condition of the friction clutch 1 when the friction linings 7 have undergone a certain amount of wear but prior to any compensation for such wear in the region of the seat 5. It will be noted that the change of orientation (conicity) of the diaphragm spring 4 due to wear upon the friction linings 7 results in an increase of the magnitude of forces which are being applied to the cover 2, to the ring 11 and/or to the sensor 13. This causes the point 54 to migrate in a direction toward 54' which, in turn, entails that in the course of the next-following disengaging operation the axial force which is being applied by the diaphragm spring 4 to the sensor 13 at the ring 11 exceeds the oppositely directed force of the sensor 13; this causes an adjustment in the aforedescribed manner as a result of axial relaxation of the sensor 13. Such adjustment entails that the point 54' migrates toward the point 54 which, in turn, reestablishes the desired state of equilibrium at the seat 5, namely between the diaphragm spring 4 and the sensor 13.

In actual practice (i.e., when the friction clutch 1 is in use), adjustments by the unit 16 are effected continuously or nearly continuously (i.e., by minute steps). The distances between the various points on the curves of FIGS. 8 to 11 are greatly exaggerated for the sake of clarity.

It is very likely that certain changes of various functional parameters and/or operating points will take place during the useful life of the friction clutch 1. For example, improper actuation of the friction clutch 1 can result in overheating of the resilient segments 10 in the clutch disc 8 which can cause a reduction of the resiliency of these segments, i.e., a reduction of the extent of axial movability of the parts 10. Nevertheless, it is possible to ensure reliable operation of the friction clutch 1 by appropriate selection of the characteristic curve 40 of the diaphragm spring 4 and a corresponding conformance of the curve 47 denoting the displacement-to-force relationship of the sensor 13. A reduction of axial movability of the segments 10 would merely entail that the conicity of the diaphragm spring 4 in the friction clutch 1 of FIGS. 1 and 2 would change in a sense to reduce the magnitude of the force which the spring 4 exerts upon the portion or portions 3a of the pressure plate 3. This can be seen in the diagram of FIG. 8. Furthermore, this would bring about a corresponding change of axial deformation of the sensor 13 and a corresponding axial displacement of the ring 11.

In accordance with a further feature of the invention, it is possible to construct the improved friction clutch in such a way that the resultant of forces acting upon the diaphragm spring 4 increases in response to increasing wear upon the friction linings 7. Such increase can be limited to a certain stage or portion of the maximum permissible displacement due to wear upon the friction linings 7. As mentioned above, the wear upon the friction linings is normally more pronounced than the wear upon the flywheel 6 and upon the pressure plate 3; therefore, the preceding and the next-following passages of this description refer primarily or exclusively to wear upon the friction linings. The increase of the magnitude of forces acting upon the diaphragm spring 4 can take place as a result of appropriate design of the sensor 13. FIG. 9 shows by broken lines, as at 47a, the characteristic curve denoting a thus modified sensor 13 within the range 48. If the magnitude of forces acting upon the diaphragm spring 4 increases in response to progressing wear upon the friction linings 7, one can at least partially compensate for a reduction of the force which the spring 4 applies to the pressure plate 3 due to a reduction of resiliency of the segments 10, e.g., as a result of penetration or embedding of these segments into the adjacent friction linings 7. It is particularly advantageous if the force for the diaphragm spring 4 increases proportionally with (i.e., at the same rate or nearly at the same rate as) the setting or reduction of bias of the segments 10, for example, due to the aforediscussed embedding into the adjacent friction linings 7. In other words, as the thickness of the clutch disc 8 in the region of the friction linings 7 decreases (i.e., as the distance between the two sets of friction linings decreases due to the reduced bias of the segments 10 as a result of penetration into the friction linings and/or due to wear upon the friction linings), the magnitude of forces acting upon the diaphragm spring 4 increases accordingly. It is of particular advantage if the magnitude of such forces increases in such a way that the increase is more pronounced during a first stage and less pronounced during a next-following second stage. These two stages are within the distance 48 as measured along the abscissa of the coordinate system which is shown in FIG. 9. The just outlined design is desirable and advantageous because the major part of penetration of segments 10 into the adjacent friction linings 7 takes place mainly during a relatively short period of the full useful life of the friction clutch; thereafter, the positions of the segments 10 relative to the adjacent friction linings 7 are more or less stabilized. Thus, once a certain penetration has taken place, this variable parameter or factor can be disregarded because it no longer affects the operation of the adjusting unit 16. The change of magnitude of the force acting upon the diaphragm spring 4 can also take place at least during a certain stage of wear upon the friction linings 7.

The preceding description of operation of the adjusting unit 16 to compensate for wear upon the friction linings 7 did not take into consideration the axially oriented forces which are or which can be generated by the leaf springs 9 serving to axially movably but non-rotatably couple the pressure plate 3 to the flywheel 6 and cover 2. If the leaf springs 9 are installed in stressed condition so that they tend to move the pressure plate 3 axially and away from the adjacent friction linings 7, i.e., in a sense to bias the portion or portions 3a of the pressure plate 3 against the diaphragm spring 4, the leaf springs 9 are in a condition to assist the disengagement of the friction clutch 1. Thus, the axially oriented force which is applied by the leaf springs 9 is superimposed upon the forces which are being applied by the sensor 13 and by the diaphragm spring 4 as well as upon the disengaging force which is being applied (e.g., by a suitable disengaging bearing) against the tips 4c of the prongs 4b. Such function of the leaf springs 9 is not considered in the diagrams of FIGS. 8 to 11. The overall force which is being applied to the diaphragm spring 4 in disengaged condition of the friction clutch 1 to cause the spring 4 to bear upon the ring 12 of the seat 5 is the sum of forces which are generated primarily by the leaf springs 9, sensor 13 and the applied disengaging force acting upon the tips 4c of prongs 4b forming part of the spring 4.

The leaf springs 9 can be installed between the cover 2 and the pressure plate 3 in such a way that their axially oriented force acting upon the diaphragm spring 4 increases in response to progressing wear upon the friction linings 7. For example, the magnitude of axial force exerted by the leaf springs 9 upon the diaphragm spring 4 in response to increasing wear upon the friction linings 7 can increase in accordance with a curve 47b which is shown in the diagram of FIG. 9 and denotes the variations of such force upon the spring 4 within the distance 48. FIG. 9 further shows that, as the deformation of the sensor 13 increases, the restoring force of the leaf springs 9 upon the pressure plate 3 (this force is also applied to the diaphragm spring 4) also increases. By totalizing the forces denoted by the curve 47b and the characteristic curve of the diaphragm spring, one arrives at a resultant force which acts upon the spring 4 in the axial direction in a sense to bias this spring against the ring 12 of the seat 5. In order to obtain a variation of forces as denoted by the curve 47b of FIG. 9, it is desirable to design the sensor 13 in such a way that its characteristic curve corresponds to that shown at 47c in FIG. 9. By summarizing the forces denoted by the curves 47b and 47c in the diagram of FIG. 9, one arrives at a sum of forces denoted by the curve 47a. Thus, the magnitude of the force to be applied by the sensor 13 can be reduced by the simple expedient of stressing the leaf springs 9. Furthermore, by properly designing and mounting the leaf springs 9, it is possible to reduce (at least in part) the bias of the resilient segments 10 and/or (at least in part) the extent of penetration of segments 10 into the adjacent friction linings 7. Thus, one can ensure that the diaphragm spring 4 maintains a substantially unchanged operating point or the same operating range, i.e., the bias of the spring 4 upon the pressure plate 3 remains at least substantially unchanged during the entire useful life of the friction clutch 1. It is further necessary or desirable to take into consideration (during designing of the improved friction clutch and particularly in connection with the design of the sensor 13 and leaf springs 9) the resultant axial forces which are generated by the torsion springs 26, 26a and act upon the member 17 of the adjusting unit 16 in a sense to oppose the bias of the sensor 13 and/or the bias of the leaf springs 9.

If the friction clutch of the present invention is designed to employ prestressed leaf springs 9, it is further necessary or advisable to take into consideration that the prestressing of the springs 9 influences the axial force which the pressure plate 3 applies to the adjacent friction linings 7. Thus, if the leaf springs 9 are prestressed in a sense to urge the pressure plate 3 toward the diaphragm spring 4, the force which is applied by the diaphragm spring 4 is reduced by the extent of prestressing of the leaf springs 9. Consequently, the friction clutch then operates in such a way that the resultant axial force acting upon the pressure plate 3 and hence upon the adjacent friction linings 7 includes the force of the spring 4 and the force resulting from prestressing of the leaf springs 9. If one assumes that the curve 40 in the diagram of FIG. 8 denotes the resultant of the forces due to bias of the spring 4 plus the force attributable to prestressing of the leaf springs 9 in unused condition of the friction clutch, a reduction of the distance of the pressure plate 3 from the flywheel 6 due to wear upon the friction linings 7 would result in a shifting of the resulting forces in a sense toward a reduction of forces. FIG. 8 shows a broken-line curve 40a which corresponds, for example, to a wear in the range of 1.5 mm. Such wear can develop during the useful life of the friction clutch 1, and a shifting from the curve 40 toward the curve 40a results in a reduction of axial force which is being applied by the diaphragm spring 4 to the sensor 13 during disengagement of the friction clutch; such reduction of the axial force is attributable to the fact that, as the wear upon the friction linings 7 progresses, the moment which is being applied by the leaf springs 9 to the spring 4 and acts in the opposite direction also increases. Such moment develops due to the existence of a radial clearance between the seat 5 and the diameter of the annulus defined by the portion or portions 3a of the pressure plate 3, i.e., at the locus of engagement between the pressure plate and the spring 4. In designing the friction clutch 1, it is of particular importance to ensure that the increasing bias of the leaf springs 9 (as a result of wear upon the friction linings 7) is less than the increase of disengaging force which is also attributable to wear upon the friction linings and causes a tilting of the sensor 13 which is necessary to cause the unit 16 to carry out the necessary adjustment. Otherwise, the biasing force of the pressure plate 3 upon the friction linings 7 would decrease in engaged condition of the friction clutch and this would prevent any adjustments of the seat 5.

An important advantage of the torque varying resilient segments 10 is that the torque which is being transmitted by the hub 8a of the clutch disc 8 to the input element of a transmission decreases gradually, at least during a portion of movement of the prongs 4b of the diaphragm spring 4 in the direction to disengage the friction clutch 1. Furthermore, the resilient segments 10 ensure a gradual (progressive) increase of torque which is being transmitted by the clutch disc 8, at least during a portion of movement of the prongs 4b in a direction to engage the friction clutch 1, particularly during the initial stage of clamping of the two sets of friction linings 7 at opposite sides of the resilient segments 10 between the friction surfaces of the pressure plate 3 and flywheel or counterpressure plate 6.

Another important advantage of the improved friction clutch 1 is that the stressing of the diaphragm spring 4 in engaged condition of the friction clutch 1 remains at least substantially unchanged during each and every stage of useful life of the friction clutch. Otherwise stated, the bias of the diaphragm spring 4 upon the adjacent portion or portions 3a of the pressure plate 3 remains at least substantially unchanged irrespective of the extent of wear upon the friction linings 7.

A further important advantage of the friction clutch 1 is that, due to gradual reduction of torque which can be transmitted by the clutch disc 8 during disengagement of the friction clutch, it is now possible to greatly reduce (minimize) the magnitude of the force which must be applied to disengage the clutch, i.e., it is possible to optimize the progress of variation of disengaging force when the pressure plate 3 is being moved away from the flywheel 6. This is due to the fact that the resilient segments 10 assist the actuation of the friction clutch, particularly the disengagement of the clutch when the tips 4c of the prongs 4b forming part of the diaphragm spring 4 move in a direction to permit the resilient segments 10 to dissipate energy while the pressure plate 3 is in the process of moving axially and away from the flywheel 6. Though FIGS. 1 and 2 show a friction clutch wherein the resilient segments 10 are disposed between the two sets of friction linings 7, it is equally possible to employ resilient means which are or is analogous to the segments 10 but are or is designed and mounted to apply a reaction force to the prongs 4b of the diaphragm spring 4 (i.e., to the actuating means of the means for engaging and disengaging the friction clutch 1) and/or to another part of the diaphragm spring 4 and/or to the pressure plate 3 and/or to the flywheel 6. Such reaction force acts counter to the action of the diaphragm spring 4 in a direction to urge the pressure plate 3 against the adjacent set of friction linings 7. Furthermore, the resilient segments 10 and/or their equivalent(s) is or are disposed in series with the diaphragm spring 4.

A particularly desirable and advantageous feature of the resilient segments 10 and/or of their equivalent(s) is that they can ensure a gradual reduction of torque which is being transmitted by the clutch disc 8 during a portion of movement of the prongs 4b in a direction to effect a disengagement of the friction clutch 1, i.e., that such reduction of transmittable torque takes place during a certain stage of movement of the pressure plate 3 away from the flywheel 6.

An equivalent of the resilient segments 10 can be installed in the power train between the seat 5 for the diaphragm spring 4 and the fasteners 6a which secure the cover 2 to the flywheel 6, or between the diaphragm spring 4 and the fasteners 6a. Alternatively, or in addition to the provision of torque varying means between the two sets of friction linings 7 and/or between the seat 5 and the fasteners 6a, it is also possible (and often desirable and advantageous) to install torque varying means between the seat 5 or the diaphragm spring 4 on the one hand, and the friction surface of the pressure plate 3 on the other hand. Reference may be had, for example, to published German patent application Serial No. 37 42 354 and/or to published German patent application Serial No. 1 450 201.

Still further, it is possible to install an equivalent of the resilient segments 10 in another portion of the friction clutch in addition to the segments 10 between the two sets of friction linings 7. As concerns the installation of resilient segments between two sets of friction linings, reference may be had, for example, to published German patent application Serial No. 36 31 863.

Still further, it is within the purview of the invention to gradually increase and/or reduce the magnitude of transmitted torque during engagement or disengagement of the friction clutch by installing an equivalent of resilient segments 10 in a manner as disclosed in published German patent application Serial No. 21 64 297. Thus, it is possible to employ a composite (twin-mass) flywheel including a first mass which is connected to and receives torque from the output element of an internal combustion engine, and a second mass which constitutes or includes a counterpressure plate and is axially movably coupled with the first mass by resilient means so that the resilient means opposes a movement of the second mass at least toward or at least away from the first mass.

The operation of the improved friction clutch is particularly satisfactory if the resilient torque varying means is installed to permit movements of certain parts of the friction clutch toward and away from each other against the opposition of a spring bias. The arrangement is preferably such that the magnitude of the force opposing axial movements of certain parts relative to each other is smallest when the friction clutch is disengaged but that the magnitude of the force opposing axial movements of certain parts relative to each other gradually rises to a maximum value during clamping of the friction linings 7, i.e., during engagement of the friction clutch. Such rise of the opposing force need not take place during the entire engagement stage. It has been found that the improved friction clutch operates highly satisfactorily if the magnitude of the aforediscussed force which opposes axial movements of certain parts of the friction clutch relative to each other gradually increases during between 40 and 70 percent of movement of the prongs 4b in a direction to engage the friction clutch and gradually decreases during between about 40 and 70 percent of movement of the prongs 4b in a direction to disengage the friction clutch. The remaining portions of movement of the prongs 4b during engagement and disengagement of the friction clutch are needed to ensure reliable interruption of power flow, to establish full transmission of torque and/or to compensate for possible deformation of certain parts of the friction clutch (especially the clutch disc, the pressure plate and/or the counterpressure plate).

The feature that the diaphragm spring 4 has a degressive force-to-displacement ratio is desirable and advantageous because this renders it possible to minimize the forces which are required to engage or disengage the friction clutch, especially to minimize the forces which are required to disengage the clutch. Such degressive character need not be effective during the entire stage of disengagement of the friction clutch. Otherwise stated, it is desirable to ensure that the magnitude of the force which is being applied by the diaphragm spring 4 will decrease at least during a certain stage of its compression or deforming movement while the friction clutch is being disengaged so that, during such stage, the stressing and/or deformation of the diaphragm spring 4 is assisted by the resilient torque varying segments 10 and/or their equivalents.

At the same time, and due to the degressive force-to-distance ratio of the spring 4 during a certain stage of disengagement of the friction clutch, the magnitude of the force which the spring 4 exerts upon the friction linings 7 through the pressure plate 3 is on the decrease. In the absence of any other superimposed spring-generated forces, the effective force which is required to disengage the improved friction clutch equals the difference between the force which is being applied by the torque varying means 10 (and/or their equivalent or equivalents) and the force of the diaphragm spring 4. When the pressure plate 3 is being lifted off the adjacent friction linings 7, i.e., when the pressure plate releases the clutch disc 8, the remainder of movement of the prongs 4b in a direction to complete the disengagement of the friction clutch 1 will be effected primarily by the diaphragm spring 4. The force-to-displacement ratios of the diaphragm spring 4 and torque varying means 10 can be related to each other in such a way that, when the clutch disc 8 is released by the pressure plate 3, a relatively small force is needed to actuate the diaphragm spring. In other words, by properly relating the aforediscussed ratios or characteristics of the spring 4 and torque varying means 10 (e.g., by causing these characteristics to be identical or to only negligibly deviate from each other), it is possible to ensure that only a very small force (and in an extreme case zero force) is necessary to move the diaphragm spring 4 up to the instant of disengagement of the clutch disc 8 by the pressure plate 3.

Though it is possible to bias the pressure plate 3 by a resilient device other than a diaphragm spring 4, it is presently preferred to employ a diaphragm spring and to mount the diaphragm spring in the seat 5 so that it is tiltable relative to the cover 2 and can bear against one or more selected portions 3a of the pressure plate 3. This also simplifies the means for engaging and disengaging the friction clutch 1 because the radially inwardly extending prongs 4b of such diaphragm spring can constitute the actuating means of such clutch engaging/disengaging means. However, it is equally possible to employ modified engaging/disengaging means, e.g., including levers which are pivotably mounted on the cover 2 or on another part of the friction clutch.

The diaphragm spring 4 can be replaced, for example, with coil springs which are then installed in the friction clutch in such a way that their force acting axially upon the pressure plate 3 reaches a maximum value when the clutch is engaged but decreases during disengagement of the clutch. These characteristics can be achieved, for example, by mounting the coil springs in such a way that they are inclined with reference to the rotational axis X—X of the clutch.

The utilization of a diaphragm spring 4 which is tiltable relative to a seat 5 on the housing 2 of the improved friction clutch is desirable and advantageous on the additional ground that this renders it possible to design the clutch as a so-called push-type or depression-type clutch. In such friction clutches, the means for disengaging the clutch is normally moved in a direction toward the pressure plate, i.e., in a direction to the left as seen in FIG. 2. However, the present invention can be embodied with equal advantage in so-called pull-type friction clutches wherein (again referring to FIG. 2) the prongs 4b or the equivalents of such actuating means must be moved in a direction to the right in order to disengage the friction clutch.

As already described with reference to FIG. 8, it is often preferred to employ a diaphragm spring 4 having a substantially sinusoidal characteristic curve and being installed in the housing 2 in such a way that, when the friction clutch is engaged, the operating point of the diaphragm spring is located within a degressive portion of the curve following the first maximum of such curve. The so-called force ratio of the diaphragm spring 4 whose characteristic curve coincides with or is similar to the sinusoidal curve in the diaphragm of FIG. 8 can be within a range of approximately 1:0.4 and 1:0.7 between the first maximum and the next-following lowest point or minimum of the curve.

If the improved friction clutch is installed in a motor vehicle, the means for engaging and disengaging can further comprise a pedal which resembles or is analogous to a standard gas pedal and is installed in the vehicle to serve as a means for moving the tips 4c of the prongs 4b along their predetermined path in a direction to disengage and/or engage the friction clutch. The utilization of a pedal which is similar or analogous to a gas pedal is of particular advantage in view of the aforediscussed characteristics of the improved friction clutch. Thus, and since the force which is required to disengage the friction clutch is relatively small or extremely small, such relatively small force can be selected (metered) with a high degree of accuracy and reproducibility if the means for moving the prongs 4b along their path is a pedal, i.e., a device whose manipulation is familiar to all drivers.

A further important advantage of the improved friction clutch is that, due to the aforediscussed possibility of greatly reducing the maximum forces which must be applied during the entire useful life of the clutch (i.e., that the forces to be applied need not be increased as the wear upon the friction linings 7 progresses), it is now possible to reduce the dimensions of various component parts of the friction clutch and to greatly reduce the strength or stability of such parts. This, in turn, contributes to a significant reduction of the cost of the friction clutch. Furthermore, the aforediscussed reduction of disengaging force renders it possible to greatly reduce losses due to friction and/or losses due to decreasing resiliency of many parts of the friction clutch, particularly in the disengaging means. This greatly enhances the efficiency of the friction clutch disengaging system. Moreover, this renders it possible to achieve an optimal design of the friction clutch and to render the manipulation of the friction clutch more comfortable to the operator.

The aforediscussed improvements which were described in connection with and are shown in the embodiment of FIGS. 1 to 11 can be utilized in a number of presently known friction clutches. Examples of friction clutches whose operation and/or other characteristics can be improved by incorporating therein the features of the present invention are those described and shown, for example, in German Pats. Nos. 29 16 755 and 29 20 932, in published German patent applications Serial Nos. 35 18 781 and 40 92 382, in published French patent applications Serial Nos. 2 605 692, 2 606 477, 2 599 444 and 2 599 446, in British Pat. No. 1 567 019, in U.S. Pat. Nos. 4,924,991, 4,191,285 and 4,057,131, in published Japanese patent application Serial No. 51-126452, and in Japanese Utility Models Nos. 3-25026, 3-123, 2-124326, 1-163218, 3-19131 and 3-53628.

Reference may also be had to commonly owned copending German patent applications Serial Nos. P 42 07 528.9 and P 42 06 904.1.

The provision of the adjusting unit 16, which compensates for wear upon at least one component (particularly the friction linings 7) of the improved friction clutch 1, brings about the additional advantage that it is now possible to optimize the design and the operation of the friction clutch, especially of the diaphragm spring 4 which is called upon to bias the pressure plate 3 against the adjacent set of friction linings 7 in engaged condition of the clutch. The diaphragm spring 4 can be designed in such a way that it is merely called upon to furnish only that force which is required for transmission of the desired torque, i.e., to clamp the pressure plate 3 against the clutch disc 8 only with a force which ensures that the clutch disc 8 can transmit requisite torque to the input element of a variable-speed transmission or the like. As mentioned above, it is not absolutely necessary to employ a resilient device in the form of a diaphragm spring, such as the diaphragm spring 4; it is also possible to employ two or more resilient devices such as a set of coil springs which can be distributed and oriented in a manner as already described hereinbefore.

Figure 12:
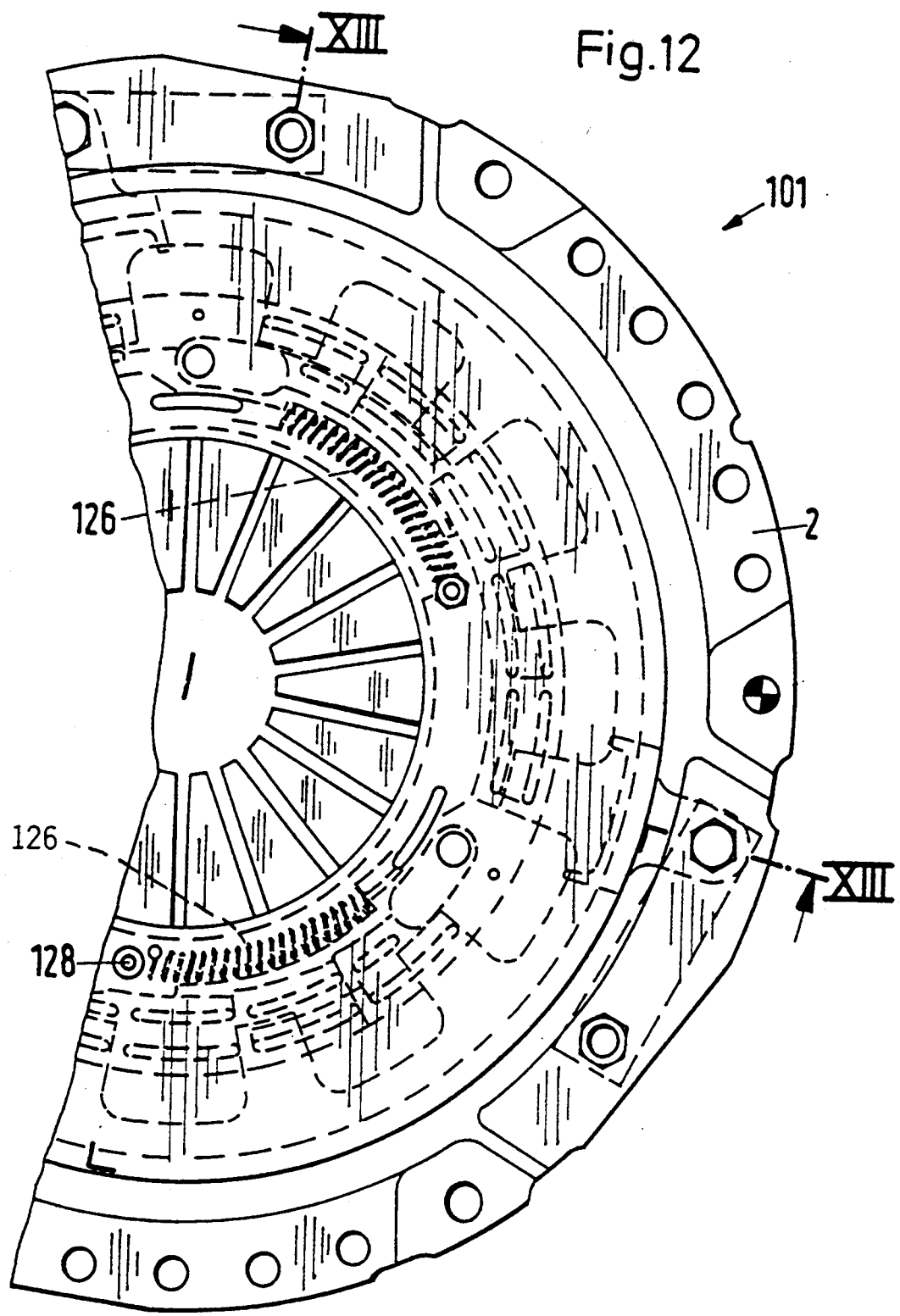
FIG. 12 is a fragmentary elevational view as seen from the right-hand side of FIG. 13 and shows a second friction clutch.
Figure 13:
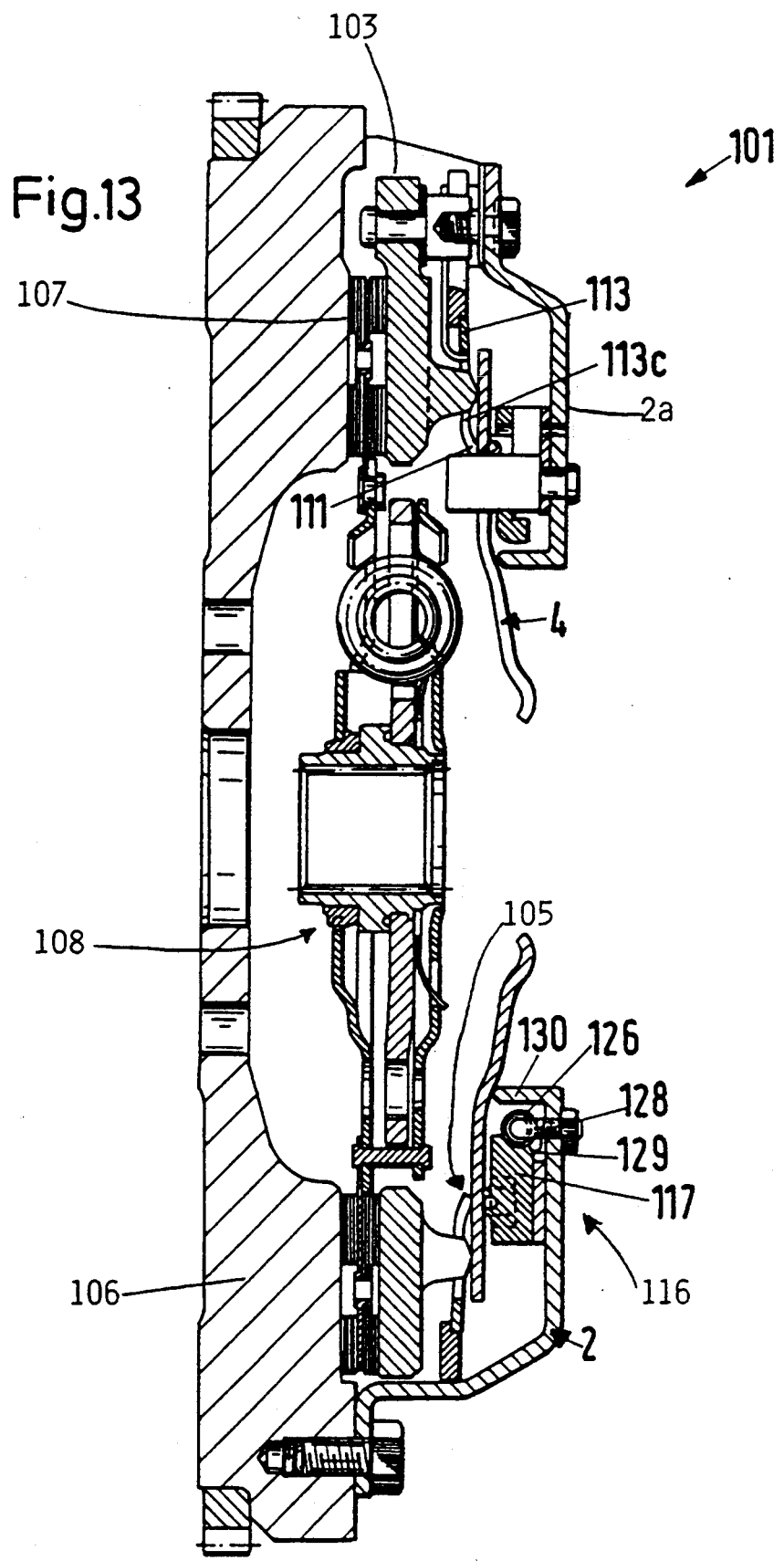
FIG. 13 is a sectional view substantially as seen in the direction of arrows from the line XIII—XIII in FIG. 12.

FIGS. 12 and 13 illustrate certain details of a modified torque transmitting friction clutch 101. One of the differences between the friction clutches 1 and 101 is that the latter employs three coil springs 126 (two shown in FIG. 12) which replace the torsion springs 26, 26a in the friction clutch 1 and serve to bias the annular member 117 of the adjusting unit 116 for the bias of the diaphragm spring 4. As concerns its function, the member 117 is an equivalent of the member 17, i.e., it can cooperate with an annulus corresponding to the annulus 25 of FIGS. 5 and 6 to move the portion 111 of the seat 105 in a direction to the right (as viewed in FIG. 13) to an extent which is necessary to compensate for wear upon the friction linings 107 of the clutch plate or disc 108.

Figure 14:
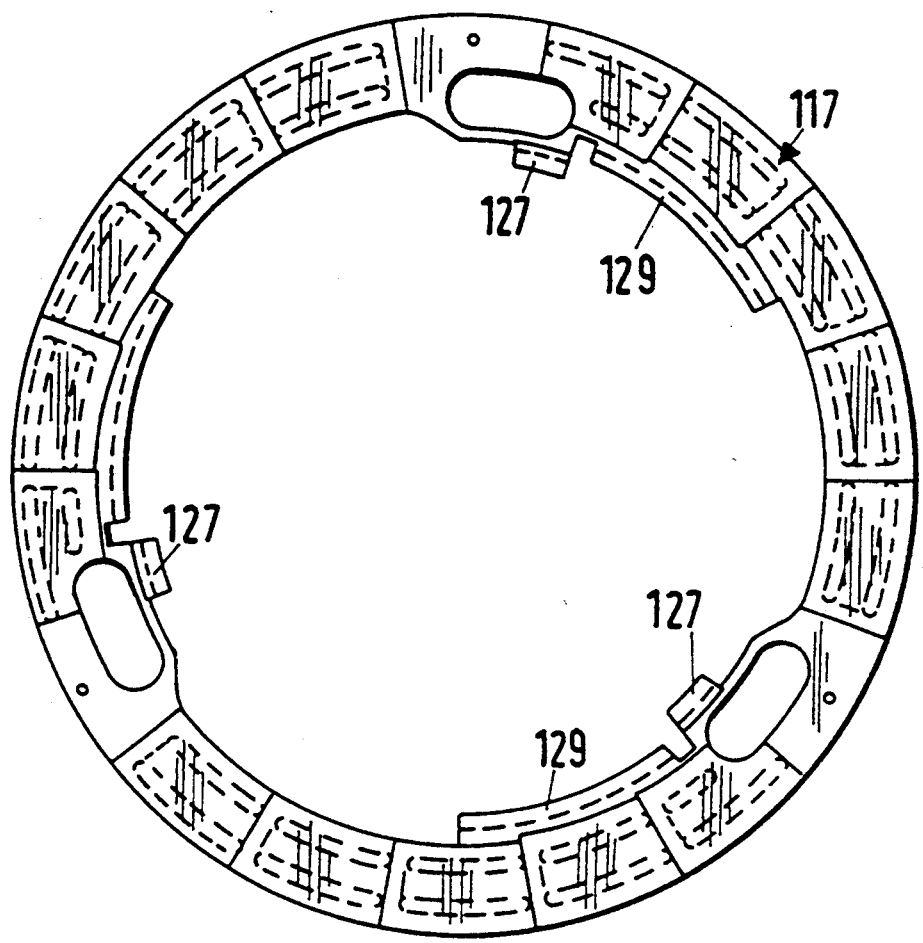
FIG. 14 is a plan view of an annular adjusting or wear compensating member which is utilized in an adjusting unit forming part of the second friction clutch.

The friction clutch 101 employs three coil springs 126 which are equidistant from each other in the circumferential direction of the housing or cover 2 and are installed in stressed condition to bias the member 117 relative to the bottom wall 2a of the cover. As can be seen in FIG. 14, the inner marginal portion of the member 117 is provided with axially, radially and circumferentially extending projections 127 which serve as stops for the adjacent ends of the respective coil springs 126. The stops 127 are acted upon by the respective springs 126 in a sense to tend to turn the member 117 about the axis of the cover 2 in a direction to move the portion 111 of the seat 105 for the diaphragm spring 4 toward the pressure plate 103. The springs 126 have an arcuate shape because they are adjacent the convex outer sides of arcuate guides 129 forming part of or affixed to the member 117. The other end of each coil spring 126 is in engagement with a discrete post 128 which is anchored in the bottom wall 2a of the cover 2. The illustrated posts 128 have external threads which mate with the threads of tapped bores provided therefor in the bottom wall 2a. However, it is equally possible to replace the externally threaded posts 128 with integral projections in the form of lugs or the like which are obtained by displacing selected portions of the bottom wall 2a in a direction toward the pressure plate 103. Such making of posts or like parts which are of one piece with the bottom wall 2a is particularly advantageous and simple if the cover 2 is made of a metallic sheet material.

The length of the arcuate guides 129 is preferably selected in such a way that they can adequately guide the respective coil springs 126 during each stage of angular displacement of the member 117 relative to the bottom wall 2a, i.e., during each stage of compensation for wear upon the friction linings 107, pressure plate 103 and/or counterpressure plate 106. The configuration of the guides 129 is such that they can properly prop the respective coil springs 126 from within (i.e., at the concave sides of the arcuate springs) as well as in the axial direction of the bottom wall 2a. Each of the guides 129 can define an arcuate groove or channel which receives a portion of the respective coil spring 126 between the respective post 128 and the respective projection 127. This ensures highly predictable positioning of the coil springs 126 relative to the member 117 and guarantees that these coil springs can turn the member 117 in the proper direction (to move the seat portion 111 toward the pressure plate 103) whenever necessary in order to compensate for wear upon the linings 107, pressure plate 103 and/or counterpressure plate 106. The configuration of the surfaces bounding the channels of the guides 129 on the member 117 can conform to the configuration of the adjacent portions of the respective coil springs 126. Such configuration of the surfaces bounding the channels or grooves in the guides 129 ensures that the coil springs 126 are adequately guided when the cover 2 is idle as well as when the cover is rotated by the counterpressure plate 106 (this counterpressure plate can constitute or form part of a flywheel which receives torque from the output shaft of a combustion engine in a motor vehicle).

In order to even more reliably ensure optimal retention of coil springs 126 in requisite positions relative to the bottom wall 2a and the member 117, the radially inner portion of the bottom wall 2a can be provided with axially extending arms 130 which are disposed radially inwardly of the coil springs (see FIG. 13). The individual arms 130 can be replaced with a circumferentially complete cylindrical collar of the bottom wall 2a. The arms 130 or the aforementioned circumferentially complete collar of the bottom wall 2a can perform the additional function of serving as an abutment for the adjacent portions of the diaphragm spring 4, i.e., such collar or the arms 130 can limit the extent of dissipation of energy by the diaphragm spring 4.

The provision of means for guiding the coil springs 126 exhibits the advantage that, when the friction clutch 101 is rotated by a combustion engine or the like, the convolutions of the springs 126 cannot leave the illustrated positions under the action of centrifugal force, i.e., they cannot move into frictional engagement with the adjacent portions (such as ramps) of the member 117; this would result in the development of undesirable friction which would prevent the springs 126 from changing the angular position of the member 117 in a manner to accurately compensate for wear upon the friction linings 107, pressure plate 103 and/or counterpressure plate 106. When the friction clutch 101 is driven, the coil springs 126 preferably behave not unlike solid bodies, i.e., they are in frictional engagement with the adjacent guides 129 and such frictional engagement suffices to prevent any angular displacement of the member 117. The arrangement can be such that, when the rotational speed of the friction clutch 101 exceeds the idling speed of the engine, frictional engagement between the coil springs 126 and the guides 129 under the action of centrifugal force suffices to prevent any angular displacement of the member 117 relative to the bottom wall 2a of the cover 2, i.e., the springs 126 cannot change the angular position of the member 117. Thus, the angular position of the member 117 with reference to the cover 2 (in order to move the seat portion 111 toward the pressure plate 103) can take place only when the rotational speed of the friction clutch 101 does not exceed the idling speed of the engine. In other words, it is necessary to operate the friction clutch 101 in such a way that its rotational speed is relatively low in order to enable the springs 126 to change the angular position of the member 117 relative to the bottom wall 2a (if necessary).

It is equally possible to block any turning of the member 117 relative to the bottom wall 2a in any one of a number of other ways, i.e., not necessarily as a result of pronounced frictional engagement with the surfaces bounding the grooves or channels of the respective guides 129. For example, the arrangement may be such that the coil springs 126 can change the angular position of the member 117 relative to the bottom wall 2a only when the friction clutch 101 is not driven.

The just discussed feature of the friction clutch 101 can be incorporated with equal advantage in the friction clutch 1 of FIGS. 1 and 2. The arrangement may be such that the angular position of the member 17 relative to the annulus 25 can be changed only when the clutch 1 is not driven at all or when the clutch 1 rotates within a relatively low range of speeds. For example, the housing or cover 2 of the friction clutch 1 of FIGS. 1 and 2 can be provided with means which prevent the torsion spring 26 and/or 26a from changing the angular position of the member 17 relative to the annulus 25 when the member 17 is acted upon by centrifugal force, i.e., when the friction clutch 1 is driven by the engine in a motor vehicle or the like. For example, the bottom wall 2a of the cover 2 in the friction clutch 1 can carry one or more flyweights which move radially outwardly under the action of centrifugal force to thereby interfere with any changes in the angular position of the member 17 relative to the annulus 25, either by directly engaging the member 17 and/or by preventing the spring 26 and/or 26a from changing the angular position of the member 17 in the cover 2. The flyweight or flyweights can be designed and mounted to bear against the radially innermost portion of the member 17 when the friction clutch 1 of FIGS. 1 and 2 is driven. The flyweight or flyweights must be capable of engaging and holding the member 17 with a force which exceeds the bias of the springs 26, 26a, at least when the rotational speed of the friction clutch 1 reaches a certain value.

Referring again to FIGS. 12–14, the friction clutch 101 can be modified by providing radial supports for portions of or for the entire coil springs 126. Such radial supports can be installed on or they can form part of the bottom wall 2a of the cover 2 in the friction clutch 101; for example, the radial supports can be made of one piece with the posts 128. Thus, each post 128 can be replaced with a substantially L-shaped element which includes a portion extending in the circumferential direction of the cover 2 and into the adjacent end convolutions of the respective coil spring 126. Such portions of the L-shaped elements act not unlike retainers and hold the surrounding end convolutions of the respective coil springs 126 against radial movement relative to the bottom wall 2a.

FIG. 13 illustrates that the wire ring 11 of the seat 5 which is shown in FIG. 2 can be omitted. More specifically, the wire ring 11 is replaced by a radially inner portion 111 of the sensor 113. The portion 111 can be assembled of several sections each forming part of one of the tongues 113c of the sensor 113. Those sides of the tongues 113c which engage the diaphragm spring 4 in lieu of a wire ring 11 or the like can have a convex or substantially convex shape. Thus, the sensor 113 of FIG. 13 can perform the combined functions of the sensor 13 and wire ring 11 in the friction clutch 1 of FIGS. 1 and 2.

Figure 15:
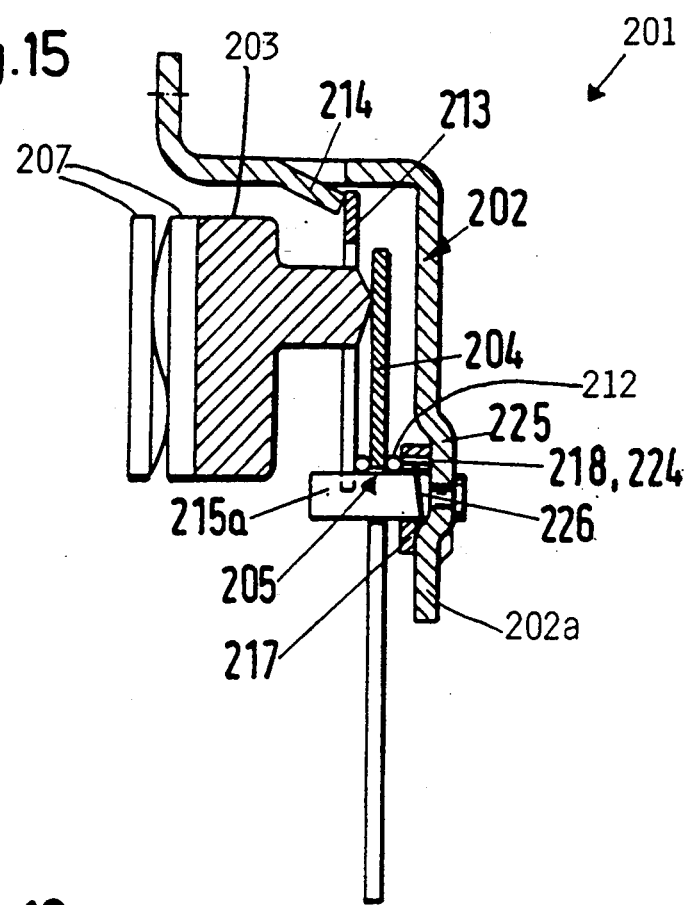
FIG. 15 is a fragmentary axial sectional view of a third friction clutch.
Figure 16:
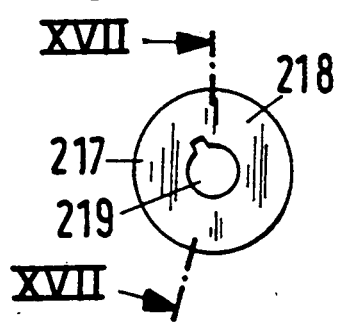
FIG. 16 is a plan view of an annular adjusting or wear compensating member which is utilized in the third friction clutch.
Figure 17:
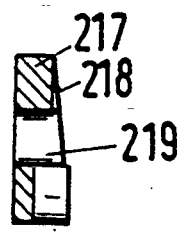
FIG. 17 is a sectional view substantially as seen in the direction of arrows from the line XVII—XVII in FIG. 16.

FIGS. 15 to 17 illustrate certain details of a further torque transmitting friction clutch 201 wherein the circumferentially complete annular adjusting member 17 or 117 is replaced with a set of discrete button- or washer-like adjusting and wear compensating members 217. The discrete members 217 are equidistant from each other in the circumferential direction of the cover or housing 202 and each of these members has a ramp 218 which extends at one of its sides in the circumferential direction to cooperate with an adjacent ramp 224 of the annulus 225 forming part of the bottom wall 202a of the cover 202. Each of the illustrated members 217 has a central opening 219 (e.g., a circular bore or hole) which receives a portion of an axially parallel pin-shaped extension 215a of a rivet in such a way that each member 217 can turn about the axis of the respective extension 215a. The annulus 225 is an integral part of the bottom wall 202a and is provided with the aforementioned ramps 224 cooperating with the ramps 218 of the neighboring members 217 to automatically shift (when necessary) the ring 212 of the seat 205 toward the pressure plate 203 in order to compensate for wear upon the friction linings 207, the pressure plate 203 and/or the counterpressure plate (not shown in FIG. 15). The members 217 are turnable about the axes of the respective extensions 215a by springs 226 in a sense to move the ramps 218 along the neighboring ramps 224 and to thus shift the ring 212 toward the pressure plate 203. Each spring 226 resembles a helix which surrounds the respective extension 215a, which reacts against the bottom wall 202a and which bears against the corresponding member 217. The end portions of the helical springs 226 are suitably bent so that they can more reliably engage the bottom wall 202a and the respective members 217, respectively. For example, the end portions of the springs 226 can be provided with lugs, legs or like projections. When the diaphragm spring 204 is moved axially of the friction clutch 201 of FIG. 15 due to wear upon the friction linings 207, pressure plate 203 and/or the non-illustrated counterpressure plate, the springs 226 are free to change the angular positions of the respective members 217 relative to the corresponding extensions 215a and to thus move the ring 212 toward the pressure plate 203; this compensates for the aforediscussed wear, primarily upon the friction linings 207.

The sensor 213 of the friction clutch 201 of FIG. 15 bears against lugs 214 which are shown in the form of integral portions of the axially extending part of the cover 202. The lugs 214 preferably constitute inwardly bent parts of the cover which are deformed to the extent necessary to engage the radially outer portion of the sensor 213.

An advantage of the discrete annular members 217 is that they are less likely to change their positions under the action of centrifugal force, i.e., they are not likely to turn about the respective extensions 215a as a result of rotation of the cover 202 about its own axis. In other words, the adjusting action of such discrete members 217 is not affected by the magnitude of the centrifugal force.

The discrete annular adjusting members 217 in the friction clutch which is shown in FIG. 15 can be replaced with discrete wedge-like or analogous adjusting members which are mounted for movement in the radial and/or circumferential direction of the cover 202 in order to cooperate with complementary parts on the bottom wall 202a in a sense to displace the ring 212 toward the pressure plate 203 when the need arises, i.e., in order to compensate for wear upon the counterpressure plate, the pressure plate 203 and/or the friction linings 207. Each wedge-like adjusting member can be provided with a longitudinally extending recess to receive a portion of an extension 215a or a like part of or on the bottom wall 202a. This ensures that each wedge-like member can carry out a movement only in a direction which is necessary to adjust the axial position of the ring 212. The arrangement may be such that the wedge-like members which are to be used in lieu of the discrete washer-like members 217 of FIG. 15 are acted upon by centrifugal force in order to move radially and/or circumferentially of the wall 202a in order to compensate for wear, particularly for wear upon the friction linings 207. However, it is equally possible to employ springs which cooperate with wedge-like adjusting members to shift such adjusting members along suitable configurations (such as ramps 224) of the bottom wall 202a in order to move the ring 212 axially toward the pressure plate 203. The extensions 215a can be replaced with other suitable guide means for the wedge-like adjusting members which can be used in lieu of the washer-like members 217; for example, the bottom wall 202a can be grooved to establish predetermined paths for movement of the wedge-like members relative to the cover 202.

The ramps 224 can be provided on the bottom wall 202a to project toward the adjacent annular members 217 from a plane which is normal to the axis of the cover 202. Alternatively, such ramps can be provided on the adjacent portions of the diaphragm spring 204. This also applies for the embodiments of FIGS. 1–2 and 12–13. It is also possible to provide the annular members 17, 117 and/or 217 with two sets of ramps 218, one at each side, and to provide complementary ramps 24, 124 or 224 on the bottom wall 2a, 102a or 202a and on the corresponding diaphragm spring 4, 104 or 204. If the adjusting members are wedges or if they resemble wedges, it is advisable to make them from a lightweight material in order to minimize the influence of centrifugal force.

The selection of materials for the cooperating ramps (such as 18 and 24) also plays an important role in connection with the reliability of adjustment of the diaphragm spring toward the clutch disc of the improved friction clutch. An important prerequisite is to select the material of the member 17 or 117 or of the members 217 and the material of the adjacent annulus 25, 125 or 225 in such a way that the ramps of such parts will not exhibit a tendency to adhere to each other irrespective of the momentary stage of the useful life of the respective friction clutch. For example, adherence of one set of ramps to the neighboring ramps can be prevented or avoided by coating at least one of these sets of ramps with a suitable friction-reducing material. If the one and/or the other set of ramps consists of a metallic material, the coating substance will or can be selected with a view to prevent corrosion.

Another mode of preventing the ramps of one set from adhering to the ramps of the other set or sets (and from thus preventing, or interfering with accuracy of, adjustment of the diaphragm spring toward the pressure plate in order to compensate for wear) is to make the materials of the two or more sets of ramps (such as the materials of the annular member 17 and the annulus 25 in the embodiment of FIGS. 1 and 2) of materials having different thermal expansion coefficients. As a rule, the temperature of the friction clutch 1 will fluctuate in actual use as well as prior to and between actual use(s) or during and subsequent to actual use. This will entail certain minimal movements of the neighboring ramps 18, 24 relative to each other whenever the temperature of the member 17 and annulus 25 changes. The aforementioned mode of selecting the materials of the member 17 and annulus 25 (so that they have different thermal expansion coefficients) ensures that the ramps 18 cannot adhere to the ramps 24, i.e., that the adjusting unit 16 is always in condition to carry out all necessary adjustments in exact dependency on the extent of wear upon the friction linings 7 and/or pressure plate 3 and/or counterpressure plate or flywheel 6.

Still another mode of preventing adherence of neighboring sets of ramps to each other is to select the configuration and/or the deformability (stability) of the corresponding parts (such as the member 17 and the annulus 25 in the friction clutch 1 of FIGS. 1 and 2) with a view to ensure that the action of centrifugal force upon the parts 17 and 25 is not the same, i.e., that such parts will perform certain movements relative to each other in response to rotation of the friction clutch 1 with the result that the extent of movement of the ramps 18 will depart from that of the ramps 24 and the two sets of ramps will be incapable of adhering to one another.

A further mode of preventing the ramps of one set from adhering to the ramps of the neighboring set or sets is to ensure that the ramps of at least one set (e.g., the ramps 18 in the friction clutch 1 of FIGS. 1-2) are caused to perform at least some axial movements relative to the neighboring ramps (such as 24) during each disengagement of the friction clutch (i.e., during movement of the tips 4c of prongs 4b of the diaphragm spring 4 along a predetermined path extending toward the pressure plate 3 in order to deform the diaphragm spring 4 and to permit the leaf springs 9 to shift the pressure plate 3 axially and away from the flywheel 6). The adjusting member 17 of the unit 16 in the embodiment of FIGS. 1-2 can be coupled with a suitable part or it can be provided with suitable parts which move axially in response to development of wear at 7, 3 and/or 6. Such part or parts can be installed adjacent the seat 5, e.g., on the diaphragm spring 4 and/or on the sensor 13.

The diagram of FIG. 18 shows the characteristic curve 340 of a diaphragm spring corresponding to the diaphragm spring 4 of FIGS. 1 and 2. The curve 340 has a minimum or lowest point 345 denoting a relatively small force which is generated by the diaphragm spring and is in the range of approximately 450 nm (as measured along the ordinate). The highest point or maximum of the curve 340 is located in the range of 7680 nm. The transmission of force as a result of deformation of the diaphragm spring, and as indicated by the curve 340 of FIG. 18, takes place while the diaphragm spring bears against one and reacts against another of two stops which are spaced apart from each other in the radial direction of the respective friction clutch. The situation is analogous to that described with reference to the characteristic curve 40 of the diaphragm spring 4 in the diagram of FIG. 8.

The characteristic curve 340 of the diaphragm spring (such as 4) can be combined with the characteristic curve 342 of a resilient element corresponding to the segments 10 in the clutch disc 8 of the friction clutch 1. As can be seen in FIG. 18, the distance-to-force progress of the curve 342 is similar to that of the curve 340, i.e., these curves are rather close to each other which denotes that a friction clutch embodying the corresponding diaphragm spring and resilient segments 10 can be actuated in response to exertion of a very small force. Within the operating range of the resilient segments 10, the theoretical disengaging force corresponds to the difference between two vertically aligned points, one on the curve 340 and the other on the curve 342. One such difference is shown in FIG. 18, as at 360. The actually required disengaging force is further reduced by the corresponding lever arms of the actuating means, such as the prongs 4b of the diaphragm spring 4 in the friction clutch 1 of FIGS. 1 and 2. All this is analogous to the construction and mode of operation of the friction clutch 1 as already described with reference to FIGS. 1-2 and 8-11.

The diagram of FIG. 18 further contains a curve 440 which is indicated by broken lines and has a minimum or lowest point 445 denoting a negative force which is generated by a diaphragm spring. In other words, a certain part of the force which is denoted by the curve 440 does not assist in engagement of the friction clutch but rather tends to disengage the friction clutch. Thus, if the deformation of diaphragm spring which is denoted by the curve 440 progresses beyond the point 461, the friction clutch does not exhibit a tendency to become engaged but automatically remains disengaged. The broken-line curve 442 denotes in FIG. 18 the characteristic curve of resilient segments (such as 10 in the friction clutch of FIGS. 1-2) which can be used in conjunction with the diaphragm spring having a characteristic curve corresponding to that shown at 440.

The curve 349 in the diagram of FIG. 19 denotes the progress of a disengaging force which is to be applied to the tips of the prongs of a diaphragm spring (i.e., to the actuating means of the means for engaging and disengaging the friction clutch) when the friction clutch employs a diaphragm spring and resilient segments of the character denoted by the curves 340 and 342 of FIG. 18. As can be seen in FIG. 19, the curve 349 remains in the positive force range (above the abscissa of the coordinate system of FIG. 19) which means that a certain force in a direction to disengage the friction clutch must be applied as long as the friction clutch is to remain in disengaged condition (the pressure plate 3 of FIGS. 1-2 is then disengaged from the adjacent set of friction linings 7).

The broken-line curve 449 in the diagram of FIG. 19 denotes the progress of a clutch disengaging force which develops when the diaphragm spring and the resilient segments of the friction clutch exhibit characteristic curves of the type shown at 440 and 442 in the diagram of FIG. 18. The curve 449 includes a portion (at 449a) which denotes an initial decrease of the disengaging force toward the abscissa and thereupon transits from the positive side to the negative side of the abscissa. This denotes that a friction clutch employing a diaphragm spring represented by the curve 440 and resilient segments represented by the curve 442 can remain in disengaged condition without the need for the application of any disengaging force to the tips of the prongs (actuating means) of the diaphragm spring.

FIGS. 20, 20a, 21 and 22 illustrate a portion of a torque transmitting friction clutch 501, wherein the diaphragm spring 513 which performs the function of a sensor is coupled to the housing or cover 502 by a bayonet mount 514 so that the sensor 513 is maintained in a predetermined axial position relative to the bottom wall 502a of the cover 502. The main portion 513b of the sensor 513 is provided with radially outwardly extending coupling portions or arms 513d which are offset relative to the general plane of the main portion 513b in a direction toward the bottom wall 502a and into female coupling portions 502a' provided in the substantially axially extending marginal portion 502b of the cover 502; the marginal portion 502b surrounds the bottom wall 502a and extends toward the pressure plate 503 of the friction clutch 501. The female coupling portions 502a' which are shown in the drawing constitute lugs of one piece with the cover 502 and obtained as a result of appropriate deformation of corresponding parts of the marginal portion 502b. Each female coupling portion 502a' (these coupling portions form part of the bayonet mount 514 and are of one piece with the cover 502) is preferably flanked by at least one slit or slot (such as the slits 502c, 502d) in the adjacent portion of the cover 502. By actually separating certain parts of the coupling portions 502a' from the adjacent portions of the cover 502, the portions 502a' can be more readily shaped to assume an optimum configuration for cooperation with the male coupling portions 513d of the bayonet mount 514.

Figure 21:
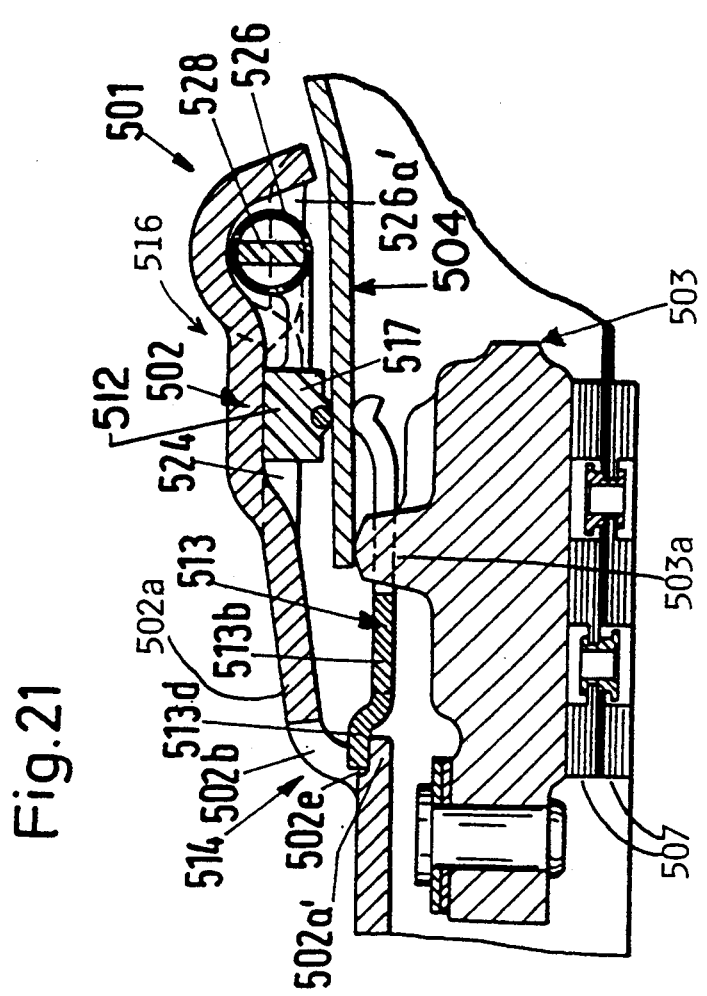
FIG. 21 is a sectional view substantially as seen in the direction of arrows from the line XXI—XXI in FIG. 20.

As can be readily seen in FIG. 21, the positions and shapes of the coupling portions 502a' and 513d (which together constitute the bayonet mount 514) are selected in such a way that they can further perform the function of means for centering the sensor 513 relative to the cover 502. To this end, the female coupling portions 502a' are provided with rather shallow centering recesses 502e for parts of the respective male coupling portions 513d.

Figure 20A:
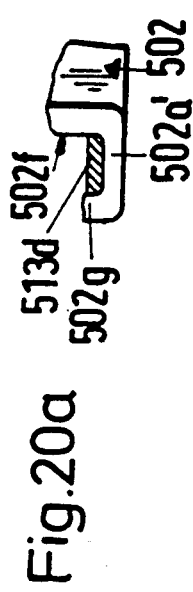
FIG. 20a illustrates, in a partial sectional view, a detail as seen in the direction of arrow XXA in FIG. 20.

In order to ensure predictable and optimal positioning of the sensor 513 relative to the cover 502 during establishment of engagement between the coupling portions 502a' and 513d of the bayonet mount 514, the substantially axially extending marginal portion 502b of the cover 502 is preferably provided with at least three equidistant female coupling portions 502a'. The arrangement is such that the portions 502a' and 513d of the bayonet mount 514 permit a predetermined angular displacement of the cover 502 and the sensor 513 relative to each other before the bayonet mount is effective to maintain the sensor in an optimum position at a certain distance from the outer side of the bottom wall 502a as well as in properly centered position relative to the cover 502. At such time, the male coupling portions 513d abut stops 502f which form part of the cover 502 and serve to prevent further rotation of the cover 502 and sensor 513 relative to each other in order to activate the bayonet mount 514. As can be seen in FIG. 20a, each stop 502f can constitute an axially extending projection of the cover 502. FIG. 20a further shows that at least one of the female coupling portions 502a' (but preferably at least two or all three coupling portions 502a') is provided with an additional stop 502g which also prevents rotation of the sensor 5013 relative to the cover 502. Each stop 502g is engaged by the adjacent male coupling portion 513d of the sensor 513 when the bayonet mount 514 is fully assembled.

Figure 22:
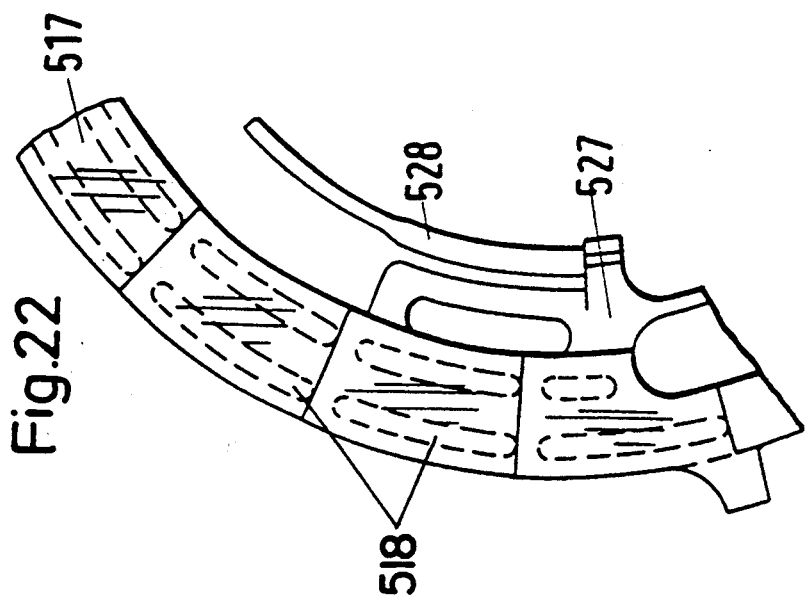
FIG. 22 is a fragmentary plan view of an annular adjusting or wear compensating member which can be utilized in the adjusting unit of the fourth friction clutch.

In the embodiment which is shown in FIGS. 20 to 22, each of the female coupling portions 502a' is provided with a first stop 502f and with a second stop 502g for the respective male coupling portion 513d. One of the stops 502f, 502g holds the respective coupling portion 513d against rotation in one direction and the other of the stops 502f, 502g holds the respective coupling portion 513d against rotation in the opposite direction. The stops 502g serve to prevent accidental or unintentional separation of the bayonet mount 514, i.e., they prevent accidental separation of the sensor 513 from the cover 502. Once the bayonet mount 514 is active, the sensor 513 is held in a predetermined angular position relative to the bottom wall 502a of the cover 502.

In order to render the bayonet mount 514 effective, the sensor 513 is first subjected to an initial stress by deforming it axially toward the bottom wall 502a of the cover 502 so that the male coupling portions 513d can enter the adjacent slots or slits 502c and 502d of the cover 502 by moving in the circumferential direction of the friction clutch 501. In this manner, the male coupling portions 513d can be moved behind the adjacent female coupling portions 502a'. The next step of rendering the bayonet mount 514 operative involves turning of the cover 502 and the sensor 513 relative to each other until at least some of the coupling portions 513d reach and are arrested by the corresponding stops 502f. The sensor 513 then dissipates some energy so that at least some of the male coupling portions 513d move axially and away from the bottom wall 502a and enter the spaces between the respective stops 502f and 502g. This ensures that the sensor 513 can no longer become accidentally separated from the (female) coupling portions 502a' of the cover 502. Once the bayonet mount 514 is effective to reliably hold the sensor 513 in the interior of the cover 502, the assembly of the friction clutch 501 can proceed without risking accidental changes in the (centered) position of the sensor 513 relative to the cover 502 and/or unintentional separation of the sensor from the cover. At such time, each of the female coupling portions 502a' is overlapped by one of the male coupling portions 513d.

In the heretofore described embodiments of the improved friction clutch, that circumferentially complete portion of the sensor (such as the main portion 513b of the sensor 513) which actually generates the force (e.g., the force to urge the diaphragm spring 504 of FIG. 21 against the ring 512) extends radially outwardly beyond the points or lines of contact between the diaphragm spring and the pressure plate (such as the diaphragm spring 504 and the portion 503a of the pressure plate 503 shown in FIG. 21). However, it is often desirable and advantageous to position the main portion of the sensor radially inwardly of the locations of engagement between the diaphragm spring and the pressure plate, i.e., radially inwardly of the circle including the points or lines of contact between the diaphragm spring and the pressure plate. With reference to the friction clutch 1 of FIGS. 1 and 2, this would mean that the circumferentially complete portion 13b of the sensor 13 would be located radially inwardly of the points of contact between the diaphragm spring 4 and the projecting portions 3a of the pressure plate 3.

Referring again to the friction clutch 501 of FIGS. 20 to 22, the ramps 524 of the adjusting unit 516 are provided directly at the inner side of the bottom wall 502a of the cover 502. The latter is made of sheet metal and the ramps 524 are obtained by appropriate deformation of an annular portion of the bottom wall 502a. The means for biasing the annular member 517 of the adjusting unit 516 includes coil springs 526 which are guided by suitably curved guide elements or mandrels 528 forming part of the member 517 (see particularly FIG. 22). The coil springs 526 react against the cover 502 and bear against the respective projections 527 of the member 517 so that the latter tends to turn in a direction to move (under the action of the ramps 524) toward the pressure plate 503 and to thus compensate for wear upon the pressure plate 503, the counterpressure plate (not shown in FIGS. 20-22) and/or friction linings 507 between the counterpressure plate and the pressure plate 503. As can be seen in FIG. 21, each mandrel 528 can have an elongated rectangular cross-sectional outline to extend substantially diametrically across the entire space within the surrounding convolutions of the respective coil spring 526. The length of the arcuate mandrels 528 can approximate but can be less than the length of the respective coil springs 526. The utilization of relatively long mandrels 528 ensures predictable and satisfactory guidance of the respective coil springs 526 at least in the radial direction of the member 517. In addition, the mandrels 528 can be designed and dimensioned to effectively prevent any, or any appreciable, axial movements (buckling) of intermediate portions of the respective coil springs 526. Another important advantage of the mandrels 528 is that they simplify the assembly of the friction clutch 501.

FIG. 22 shows one of several radially inwardly extending projections 527 which are or can be of one piece with the major portion of the member 517 and carry the respective mandrels 528. If the member 517 is made of a plastic material (e.g., a material which can be shaped in an injection molding or extruding machine), the projections 527 can be made of one piece with the respective mandrels 528 as well as with the circumferentially complete main portion of the member 517, namely that portion which is provided with ramps 518 serving to cooperate with the ramps 524 on the bottom wall 502a of the cover 502. However, it is equally within the purview of the invention to mass produce the mandrels 528 (or the mandrels 528 and the corresponding projections 527) independently of the main portion of the member 517 and to thereupon assemble the parts 527 or the parts 527, 528 with the main portion of the member 517, e.g., by resorting to connections which operate with snap action. It is also possible to make the mandrels 528 from a one-piece ring which is severed at a required number of locations to permit entry of the thus obtained arcuate portions of the ring into the corresponding coil springs 526 and to affix each arcuate portion of the subdivided ring to one of the projections 527. The connections between the arcuate portions of the aforementioned ring (i.e., of a blank for the making of the mandrels 528 or their equivalents) and the projections 527 can be designed to operate by snap action. It is preferred to provide the member 517 with at least three preferably equidistant projections 527.

If desired or necessary, the friction clutch 501 can be constructed in such a way that it comprises one or more additional systems for preventing undesirable movements of the coil springs 526 relative to the cover 502 and/or member 517. For example, and as already explained with reference to the friction clutch 101 of FIGS. 12-13, the cover 502 and/or the member 517 can be provided with suitable means for preventing any undesirable movements of the coil springs 526 under the action of centrifugal force.

The means for coupling one end of each coil spring 526 to the cover 502 of the friction clutch 501 comprises retainers or stops 526a' (one shown in each of FIGS. 20 and 21) which can constitute suitably deformed portions of the cover 502 and extend in the axial direction of the friction clutch. The configuration of the retainers 526a' is preferably such that they not only abut the adjacent outermost convolutions of the respective coil springs 526 but that they are also capable of otherwise guiding or locating the respective coil springs (e.g., in the radial and/or axial direction of the friction clutch 501).

In the friction clutch 601 of FIG. 23, the sensor 613 is located at the outer side of the bottom wall 602a of the housing or cover 602, i.e., at that side of the bottom wall 602a which faces away from the pressure plate 603. An advantage of such mounting of the sensor 613 is that it is subjected to less pronounced thermal stresses; this reduces the likelihood of undesirable reduction or decrease of resiliency of the sensor 613 as a result of excessive thermal stressing. Moreover, the sensor 613 at the outer side of the bottom wall 602a is subjected to much more pronounced cooling action when the friction clutch 601 is in use.

The operative connection between the sensor 613 and the diaphragm spring 604 in the clutch 601 of FIG. 23 is established by way of distancing elements in the form of rivets 615 (only one shown). The shanks of these rivets extend through slots between the neighboring prongs of the diaphragm spring 604 and through openings in the bottom wall 602a of the cover 602. The axes of the rivets 615 are parallel to the axis of the friction clutch 601, and each of these rivets has a head which overlies the outer side of the sensor 613. The rivets 615 constitute but one form of means which can be used to operatively connect the sensor 613 with the diaphragm spring 604. For example, the sensor 613 can be provided with axially extending projections in the form of lugs or the like having suitable tips overlying the ring 611 of the seat 605 to maintain the ring 611 in uninterrupted contact with the main portion of the diaphragm spring 604. In fact, it is possible to design the sensor 613 in such a way that it is made of one piece with parts which replace the rivets 615 as well as the ring 611 of the seat 605.

Referring to FIG. 24, there is shown a portion of a friction clutch 701 with a sensor 713 which is located radially inwardly of the locations of contact between the diaphragm spring 704 and the portion or portions 703a of the pressure plate 703. Thus, the sensor 713 is located radially inwardly of the seat 705. The radially inner portions (tongues) of the sensor 713 react against the adjacent portions of the cover 702. To this end, the cover 702 is provided with arms 715 which extend through the slots between the prongs of the diaphragm spring 704 and are engaged by the adjacent portions of the sensor 713. It is equally possible to provide the radially inner portion of the sensor 713 with arms which extend through slots between the prongs of the diaphragm spring 704 and engage the cover 702. Instead of extending through the slots between the prongs of the diaphragm spring 704, the aforementioned arms of the sensor 713 can extend through specially provided openings in the diaphragm spring 704.

Figure 25:
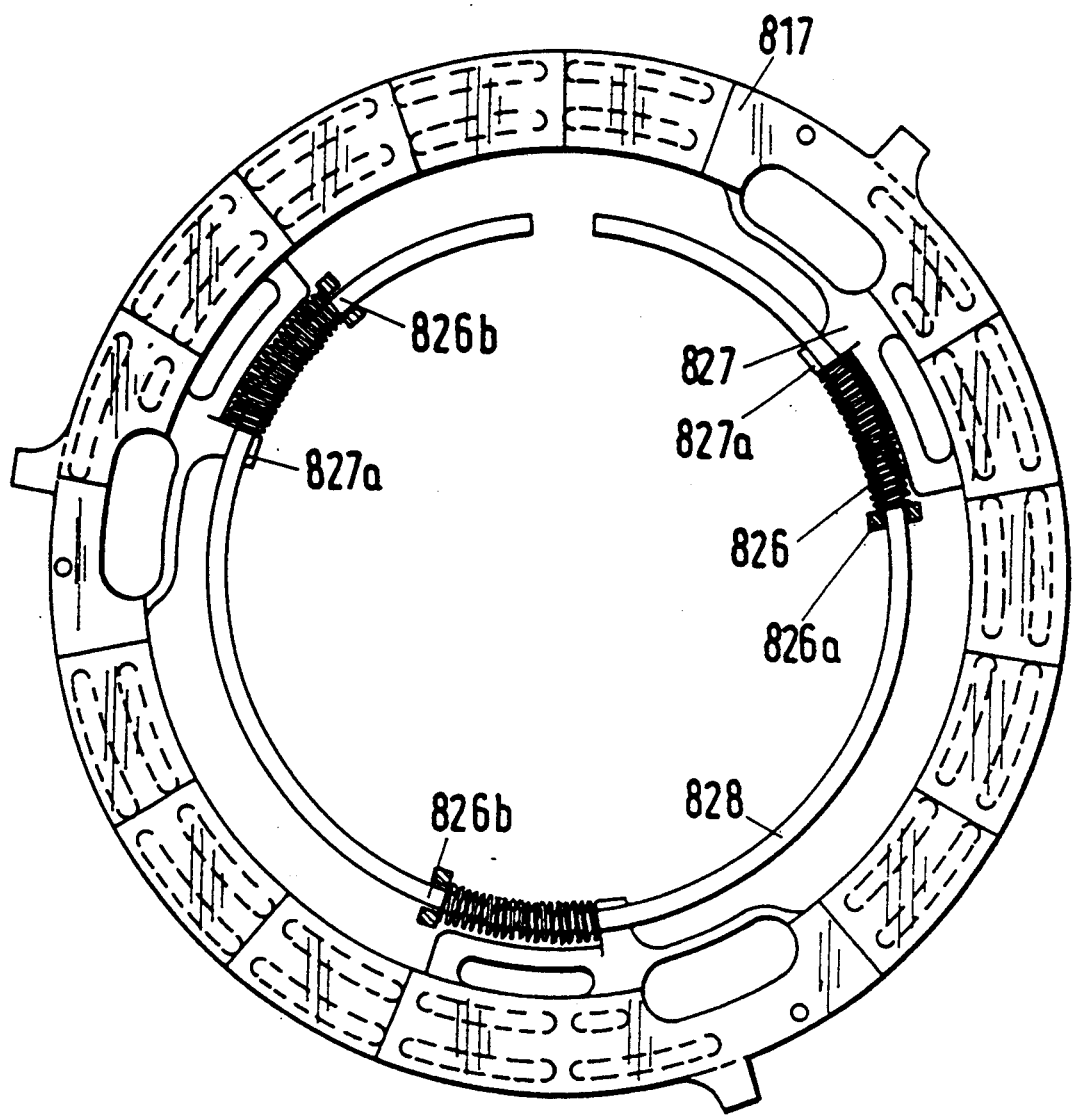
FIG. 25 is a plan view of an annular adjusting member which can be utilized in the adjusting unit of the second or fourth friction clutch.

The annular adjusting member 817 which is shown in FIG. 25 can be utilized with advantage in the friction clutch of FIGS. 20, 20a and 21 in lieu of the annular member 517 of FIG. 22. The radially inner portion of the member 817 is provided with projections 827 which extend radially inwardly and have radially inwardly projecting extensions 827a. The extensions 827a serve as abutments for the adjacent end convolutions of arcuate coil springs 826 extending in the circumferential direction of the member 817. The other end convolution of each coil spring 826 bears against a retainer 826a forming part of a housing or cover (not shown but corresponding to the cover 502 of FIGS. 20 and 21) and extending in parallelism with the axis of the friction clutch employing the member 817.

In order to facilitate assembly of the member 817 with the coil springs 826, there is provided a split ring 828 which is concentric or nearly concentric with the member 817 and extends through the extensions 827a, through the coil springs 826 and through the retainers 826a. The ring 828 is affixed to the extensions 827a; for example, the extensions 827a can be provided with grooves or sockets extending in the circumferential direction of the member 817 and being dimensioned and configurated to receive the respective portions of the split ring 828 by snap action. Each retainer 826a can be provided with a groove 826b which extends in substantial parallelism with the axis of the member 817 and is configurated and dimensioned to receive the adjacent portion of the split ring 828 with freedom of movement of the ring relative to the retainer 826a in the circumferential direction of the member 817. At the very least, the ring 828 can move circumferentially of the member 817 to the extent which is necessary to compensate for wear upon the friction linings, the pressure plate and/or the counterpressure plate in the friction clutch which employs the structure of FIG. 25.

It is presently preferred to configurate the projections 827 and the retainers 826a in such a way that the sockets of the extensions 827a (for reception of the adjacent portions of the split ring 828 by snap action) face in one axial direction and the grooves 826b (for reception of adjacent portions of the ring 828 with freedom of movement in the circumferential direction of the member 817) face in the opposite axial direction. In other words, the sockets of the extensions 827a can be open in a direction toward or away from the bottom wall of the housing or cover of the friction clutch employing the structure of FIG. 25, and the grooves 826b of the retainers 826a can be open in a direction away from the bottom wall of such housing or cover.

Figure 26:
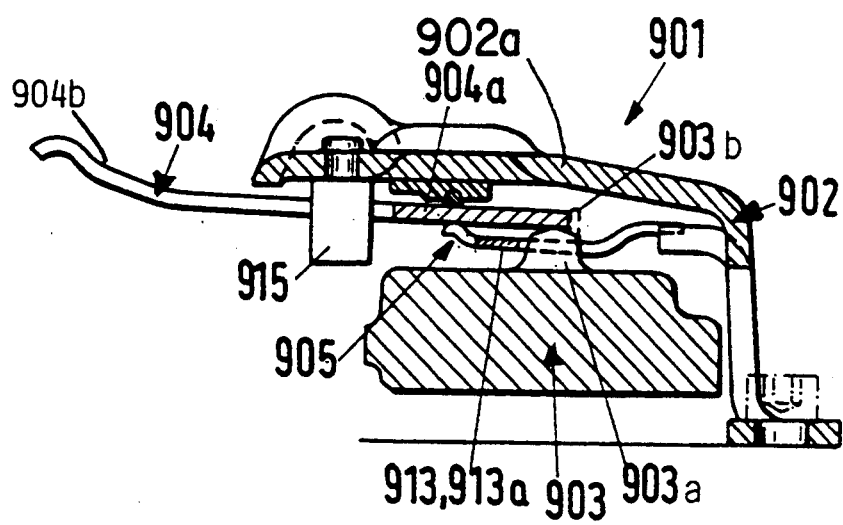
FIG. 26 is a fragmentary axial sectional view of a seventh friction clutch.

FIG. 26 illustrates a friction clutch 901 with a diaphragm spring 904 having a main portion 904a. The median part of the main portion 904a is in contact with the parts of the seat 905 and the radially outermost part of the main portion 904a is positioned to bear against the projecting portion or portions 903a of the pressure plate 903 when the friction clutch 901 is engaged. The prongs 904b of the diaphragm spring 904 (i.e., the actuating means of the means for engaging and disengaging the friction clutch 901) extend radially inwardly beyond the main portion 904a, i.e., radially inwardly beyond the seat 905. The distance of the seat 905 from the radially innermost part of main portion 904a of the diaphragm spring 904 is greater than in heretofore known friction clutches wherein the means for biasing the pressure plate toward the friction linings of the clutch disc includes a diaphragm spring reacting against the housing or cover of the friction clutch. In the embodiment of FIG. 26, the ratio of the width of that part of the main portion 904a which extends radially inwardly beyond the seat 905 to the width of that part of the main portion 904a which extends radially outwardly beyond the seat 905 is approximately 1:2. It is often desirable that such ratio be between 1:6 and 1:2. By selecting the position of the seat 905 relative to the main portion 904a of the diaphragm spring 904 in the just outlined manner, the maker of the friction clutch 901 reduces the likelihood of damage to and/or overstressing of the main portion 904a in the region of engagement with the seat 905. In other respects, the friction clutch 901 of FIG. 26 can be constructed and assembled in a manner as described with reference to the friction clutch 101 of FIGS. 12 and 13.

FIG. 26 further shows, by broken lines, an axially extending centering projection 903b on the illustrated axially projecting portion 903a of the pressure plate 903. The pressure plate 903 can be provided with a circumferentially complete projecting portion 903a or with a discontinuous projecting portion, e.g., with at least three equidistant discrete projecting portions 903a. The single projecting portion or each discrete projecting portion 903a of the pressure plate 903 can be provided with a centering projection 903b for the diaphragm spring 904. The centering projections 903b render it possible to dispense with all other means for centering the diaphragm spring 904 relative to the bottom wall 902a of the housing or cover 902. Though FIG. 26 shows a rivet 915 which is to center the diaphragm spring 904, such rivet is optional if the projecting portion or portions 903a of the pressure plate 903 are provided with centering projections 903b.

It is further possible to replace the rivets 915 and/or the centering projection or projections 903b of the pressure plate 903 in the friction clutch 901 of FIG. 26 with a set of centering projections which are of one piece with or are affixed (e.g., welded) to the bottom wall 902a of the cover 902. For example, the centering projections of the cover 902 can constitute lugs which are bent out of the bottom wall 902a and extend in parallelism with the axis of the friction clutch 901 toward the pressure plate 903. Alternatively, the centering projections of the cover 902 can constitute inwardly bulging portions (rather than lugs) of the bottom wall 902a.

Figure 27:
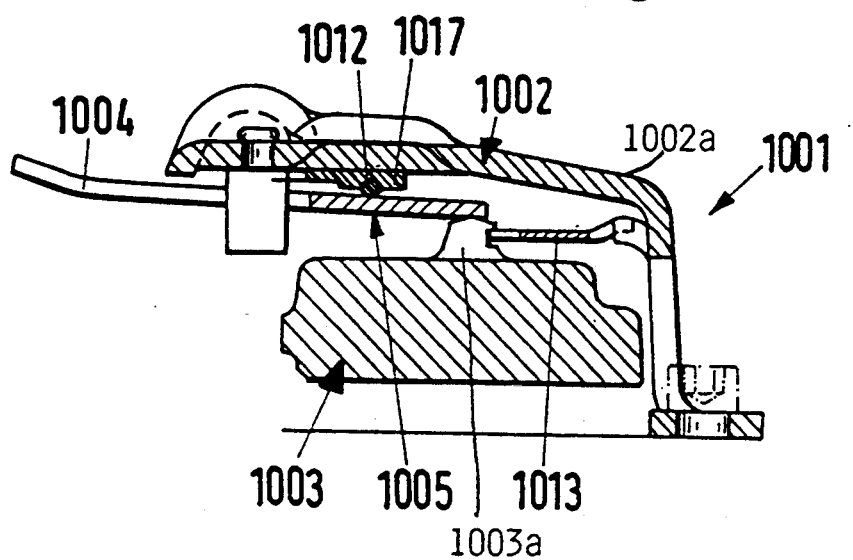
FIG. 27 is a fragmentary axial sectional view of an eighth friction clutch.

The diaphragm spring which constitutes the sensor 913 in the friction clutch 901 of FIG. 27 is designed in such a way that its circumferentially complete main or basic portion 913a is disposed radially inwardly of the projecting portion or portions 903a of the pressure plate 903. In order to prop the diaphragm spring 904 on the one hand, and to be adequately propped against the cover 902 on the other hand, the sensor 913 is further provided with radial arms in the form of tongues including a set extending from the main portion 913a radially inwardly to form part of the seat 905 (such as a substitute for the wire ring 11 in the seat 5 of FIGS. 1-2) and a set extending from the main portion 913a radially outwardly to react against lugs forming part of the substantially axially extending portion of the cover 902.

Referring to FIG. 27, there is shown a friction clutch 1001 including a diaphragm spring 1013 constituting a sensor and serving to transmit a force which opposes the force to be applied in order to disengage the friction clutch and which also opposes the force of the diaphragm spring (resilient device) 1004. The sensor 1013 reacts against the housing or cover 1002 and bears against the projecting portion or portions 1003a of the pressure plate 1003. In other words, the sensor 1013 is installed in axially stressed condition between the cover 1002 and the pressure plate 1003. In this embodiment of the present invention, the seat 1005 does not provide for the diaphragm spring 1004 a bearing for tilting of the diaphragm spring in a direction to disengage the friction clutch 1001. The diaphragm spring 1004 engages a wire ring 1012 which forms part of the seat 1005 and contacts that side of the main portion of the diaphragm spring 1004 that faces toward the annular adjusting member 1017 and the bottom wall 1002a of the cover 1002. The sensor 1013 constitutes the means for biasing the main portion of the diaphragm spring 1004 against the wire ring 1012 of the seat 1005. The sensor 1013 is dimensioned, configurated and installed in such a way that, during disengagement of the friction clutch 1001, the axial force generated by the sensor 1013 and acting upon the diaphragm spring 1004 is or becomes larger than the force which is to be applied to disengage the friction clutch 1001. The arrangement should be such as to ensure that, when the wear upon the friction linings (not shown in FIG. 27) is nil or minimal, the diaphragm spring 1004 continuously engages the wire ring 1012 of the seat 1005. To this end, and as already described in connection with the previously discussed embodiments of the improved friction clutch, it is necessary to properly relate the superimposed forces acting in the axial direction of the friction clutch 1001. Such forces are generated by the sensor 1013, by the resilient segments (not shown) of the clutch disc in the friction clutch 1001, by leaf springs (if any) which connect the pressure plate 1003 with the cover 1002 in such a way that the parts 1002, 1003 have a certain freedom of axial movement but cannot turn relative to each other, by the diaphragm spring 1004, by the means for disengaging the friction clutch 1001, and by resilient means (e.g., coil springs or torsion springs) acting upon the member 1017 of the adjusting unit in order to compensate for wear upon the pressure plate 1003, the counterpressure plate (not shown) and/or the friction linings of the clutch disc between the pressure plate 1003 and the counterpressure plate.

FIGS. 28 to 32 illustrate a further torque transmitting friction clutch 1101 having a housing or cover 1102 and a pressure plate 1103. The latter is connected with the cover 1102 in the aforedescribed manner, i.e., with some freedom of axial movement but without any freedom of angular movement. A diaphragm spring 1104 is installed in the cover 1002 between the bottom wall 1002a and the pressure plate 1103 to bias the pressure plate 1103 against the adjacent set of friction linings 1107 forming part of a clutch plate or clutch disc 1108. When the diaphragm spring 1104 is free to bias the pressure plate 1103 in a direction away from the bottom wall 1102a of the cover 1102, the other set of friction linings 1107 of the clutch disc 1108 is caused to bear against the friction surface of a counterpressure plate 1106, e.g., a flywheel or a portion of a flywheel which receives torque from a suitable prime mover, particularly from the output element (e.g., a crankshaft) of an internal combustion engine in a motor vehicle. The clutch disc 1108 then transmits torque to the input element of a variable-speed transmission in the power train between the flywheel 1106 and the wheels of the motor vehicle.

Figure 28:
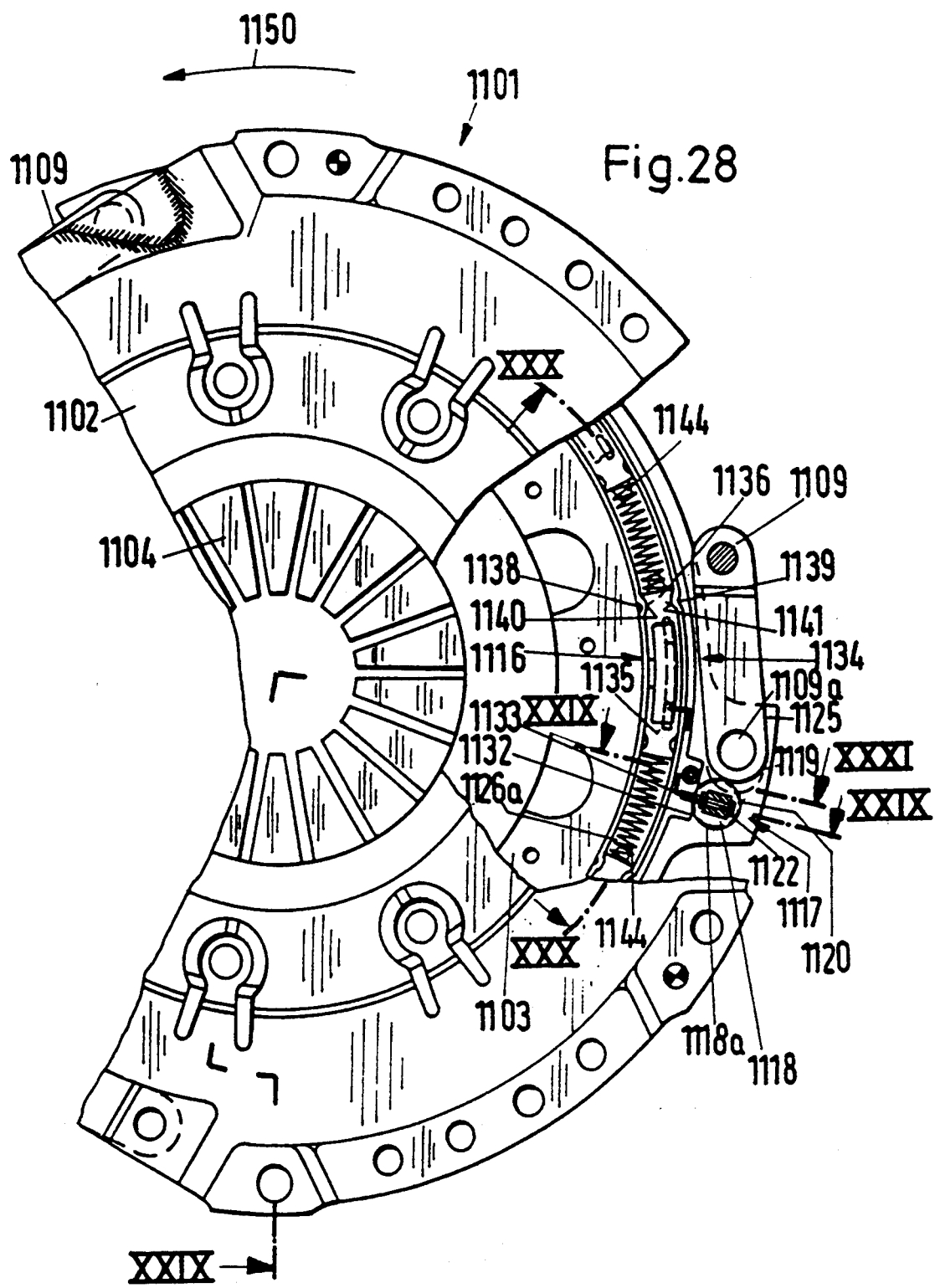
FIG. 28 is a fragmentary elevational view of a ninth friction clutch as seen from the right-hand side of FIG. 29, with certain parts broken away.

The means for non-rotatably but axially movably connecting the pressure plate 1103 to the cover 1102 comprises a set of substantially tangentially extending leaf springs 1109 (FIG. 28).

The clutch disc 1108 comprises resilient segments 1110 which are designed and mounted to establish a progressive buildup of torque during engagement of the friction clutch 1101. This is achieved in that the segments 1110 permit the two sets of friction linings 1107 (namely the set engageable by the friction surface of the pressure plate 1103 and the set engageable by the friction surface of the flywheel 1106) to perform limited axial movements toward each other and to thus permit a progressive buildup of forces acting upon the friction linings 1107 in the axial direction of the clutch 1101. However, it is equally within the purview of the invention to employ a modified clutch disc wherein the two sets of friction linings are installed at a fixed axial distance from each other, e.g., by being bonded or otherwise affixed to opposite sides of at least one rigid washer-like carrier extending radially outwardly from the hub 1108a of the clutch disc. In the thus modified friction clutch 1101, a functional equivalent of the resilient segments 1110 can be installed at another point, e.g., between the diaphragm spring 1104 and the pressure plate 1103 and/or between the cover 1102 on the one hand and the pressure plate 1103 or the flywheel 1106 on the other hand.

In the embodiment of FIGS. 28 to 32, the diaphragm spring 1104 comprises a circumferentially complete main portion 1104a and prongs 1104b (actuating means of the means for engaging and disengaging the friction clutch 1101) which are of one piece with and extend radially inwardly from the main portion 1104a. The radially outer part of the main portion 1104a biases the pressure plate 1103 against the adjacent friction linings 1107 when the friction clutch 1101 is engaged, and a radially inner part of the main portion 1104a cooperates with the seat 1105 in order to ensure that the diaphragm spring can be tilted relative to the bottom wall 1102a of the cover 1102. The seat 1105 includes two annular portions 1111 and 1112 which are disposed at opposite sides of the main portion 1104a of the diaphragm spring 1104 and each of which can constitute a wire ring. These wire rings provide a bearing which enables the corresponding part of the main portion 1104a of the diaphragm spring 1104 to be tilted in order to urge the pressure plate 1103 toward the flywheel 1106 or to permit the pressure plate to move away from the flywheel, e.g., under the bias of the leaf springs 1109.

The means for preventing rotation of the diaphragm spring 1104 relative to the bottom wall 1102a and for centering the diaphragm spring in the cover 1102 comprises a set of distancing elements in the form of rivets 1115 which are anchored in the bottom wall 1102a and extend in parallelism with the axis of the friction clutch 1101. The shanks 1115a of the rivets 1115 extend through slots between the neighboring prongs 1104b of the diaphragm spring 1104.

The friction clutch 1101 further comprises means for compensating for wear upon the pressure plate 1103, upon the flywheel 1106 and particularly upon the friction linings 1107 of the clutch disc 1108. Such compensating means comprises an adjusting unit 1116 which operates between the pressure plate 1103 and the diaphragm spring 1104, as well as a device 1117 which limits the extent of movability of the pressure plate 1103 in a direction away from the flywheel 1106, i.e., in a direction to release the clutch disc 1108 and to thus disengage the friction clutch 1101. The device 1117 can be said to constitute a means for monitoring the extent of axial movements of the pressure plate 1103 relative to the flywheel 1106 and/or the bottom wall 1102a of the cover 1102.

The monitoring device 1117 ascertains the extent of wear upon the pressure plate 1103, the flywheel 1106 and/or the friction linings 1107 and comprises a set of sleeves 1118 each of which is non-rotatably installed in a bore or hole 1120 of the pressure plate 1103. Each sleeve 1118 has an axially parallel slot or passage 1121 to permit entry of a pair of resilient elements 1122 in the form of leaf springs in the axial direction of the friction clutch 1101. The leaf springs 1122 of each pair bear against each other and at least one leaf spring 1122 of each pair can have an arcuate shape. It is presently preferred to utilize pairs of leaf springs 1122 wherein each leaf spring has an arcuate shape, and the leaf springs of each pair are bent in opposite directions, for example, in such a way that a convex side of one leaf spring 1122 of each pair bears against a convex side of the other leaf spring 1122 of the respective pair.

The leaf springs 1122 of each pair are installed in the respective sleeves 1118 with a predetermined amount of initial stress so that a certain predetermined frictional resistance must be overcome before the leaf springs of a pair of such springs can move relative to the respective sleeve 1118 in the axial direction of the friction clutch 1101. The length of the leaf springs 1122 in the axial direction of the friction clutch 1101 is selected in such a way that, when the friction clutch is engaged so that the friction linings 1107 are clamped between the neighboring friction surfaces of the pressure plate 1103 and flywheel 1106, a certain clearance or gap 1124 is maintained between the leaf springs and an axially fixed part of the friction clutch, e.g., the marginal portion 1123 of the cover 1102. The width of the clearance 1124 corresponds to the predetermined axial movability of the pressure plate 1103 relative to the cover 1102. When the friction clutch 1101 is engaged, those ends 1122a of the leaf springs 1122 which are remote from the cover 1102 come into abutment with the flywheel 1106; this ensures that the pressure plate 1103 is moved axially of the friction clutch 1101 with reference to the leaf springs 1122 to an extent which exactly corresponds to the extent of wear upon the pressure plate 1103, upon the flywheel 1106 but mainly or exclusively upon the friction linings 1107. The displacement of the pressure plate 1103 relative to the leaf springs 1122 takes place against the opposition of the friction existing between the leaf springs 1122 and the respective sleeves 1118. These sleeves can be made of a plastic material or from another material which preferably has a high coefficient of friction.

In the illustrated embodiment, the bores or holes 1120 receive the sleeves 1118 in such a way that each sleeve is a press fit therein and is held against movement in the axial as well as in the circumferential direction. The bores or holes 1120 are provided in lobes 1125 of the pressure plate 1103. Each lobe 1125 (only one shown in FIG. 28) extends radially outwardly and further serves to carry one end portion of one of the leaf springs 1109. The connections between the leaf springs 1109 and the respective lobes 1125 of the pressure plate 1103 include rivets 1109a. A shifting of sleeves 1118 in a direction toward the flywheel 1106 can also be avoided or prevented in that each sleeve 1118 is provided with a collar 1118a at that end which is adjacent the cover 1102. Such collar engages the pressure plate 1103. Any movement of a sleeve 1118 in the respective bore or hole 1120 in a direction toward the cover 1102 can be prevented by such configuration of the leaf springs 1109 (as shown in FIG. 28 by broken lines at 1119) that each leaf spring 1109 partially overlies the respective sleeve 1118 and, if necessary, fixedly secures the sleeve 1118 in its bore or hole 1120. Turning of a sleeve 1118 in its bore or hole 1120 can also be prevented by imparting to each sleeve a profile (e.g., by providing it with an extension) which receives the portion 1119 of the respective leaf spring 1109.

Figure 30:
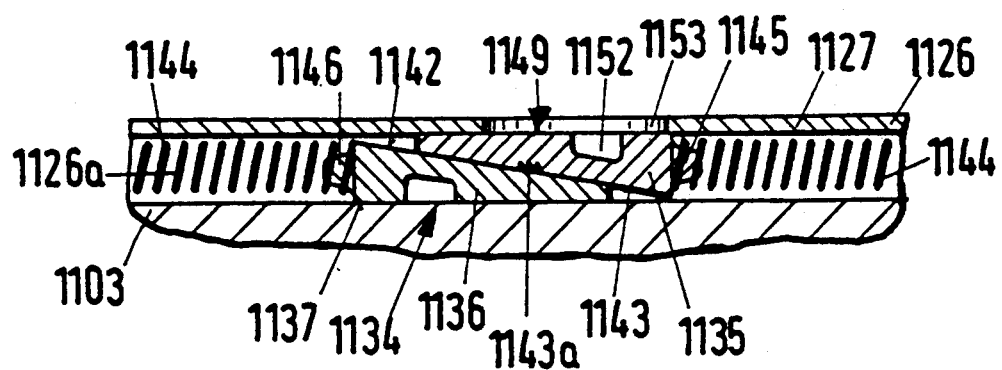
FIG. 30 is an enlarged fragmentary sectional view as seen in the direction of arrows from the line XXX—XXX in FIG. 28.
Figure 32:
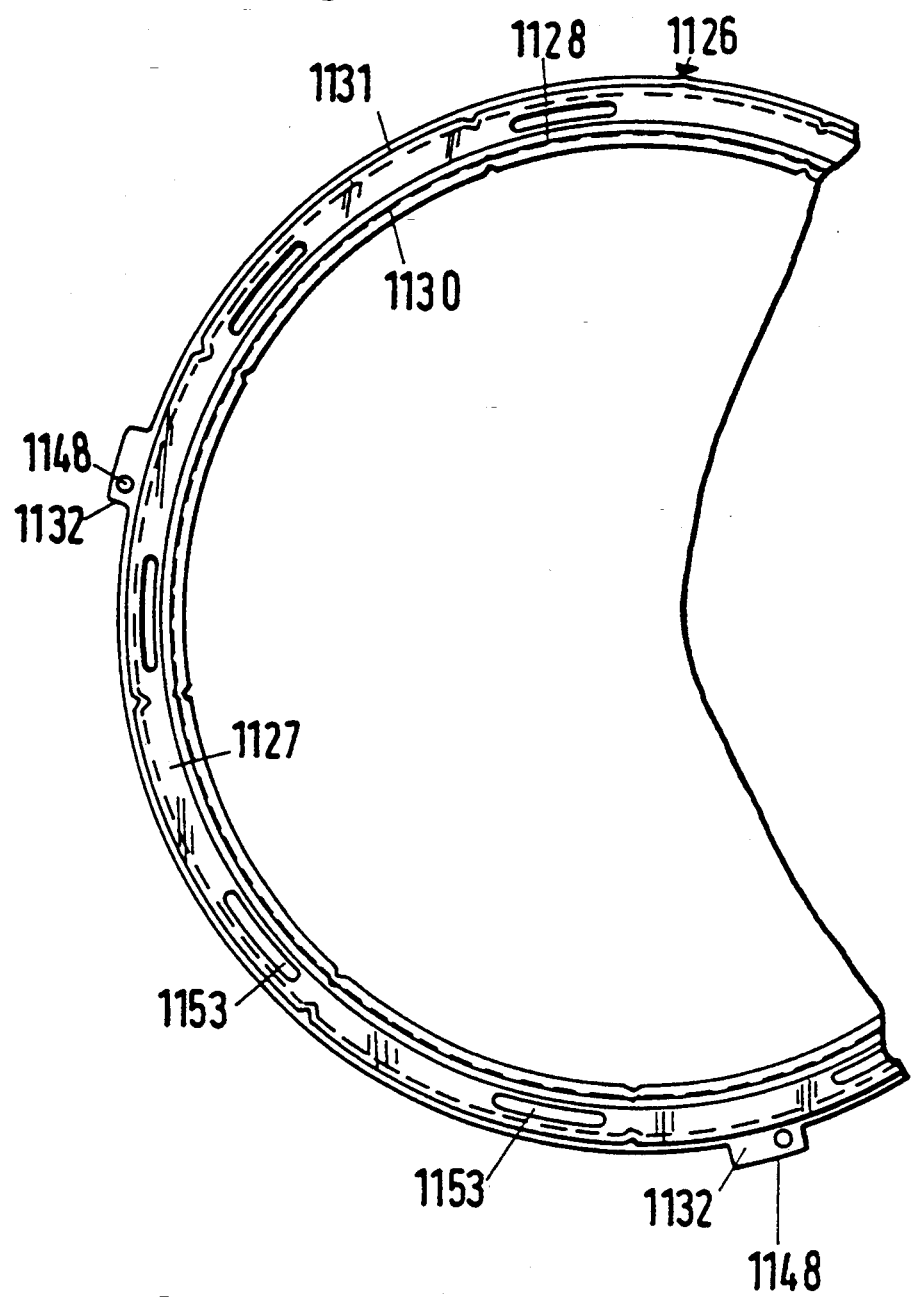
FIG. 32 is a fragmentary plan view of a ring-shaped adjusting member in the adjusting unit of the ninth friction clutch shown in FIGS. 28 and 29.

The adjusting unit 1116 comprises a compensating element in the form of a ring 1126 having a U-shaped cross-sectional outline and being acted upon by the diaphragm spring 1104. A substantial portion of the ring 1126 is shown in FIG. 32 and a portion of this ring (as seen from its open side) is also shown in FIG. 30. The ring 1126 comprises a circumferentially complete bottom wall or end wall 1127, a circumferentially complete radially inner cylindrical sidewall 1130 and a circumferentially complete radially outer cylindrical sidewall 1131. That side of the end wall or bottom wall 1127 which faces the diaphragm spring 1104 is provided with at least one ring-shaped axial projection 1128. If the wall 1127 carries several projections 1128, they are preferably equidistant from each other in the circumferential direction of the ring 1126. Furthermore, if the ring 1126 is made of a metallic sheet material, the projections 1128 can constitute deformed portions of the end wall 1127. If the projections 1128 are segment shaped, the neighboring projections 1128 define radial passages between the main portion 1104a of the diaphragm spring 1104 and the ring 1126; such passages permit circulation of air to achieve desirable cooling of the corresponding portion of the friction clutch 1101.

Figure 29:
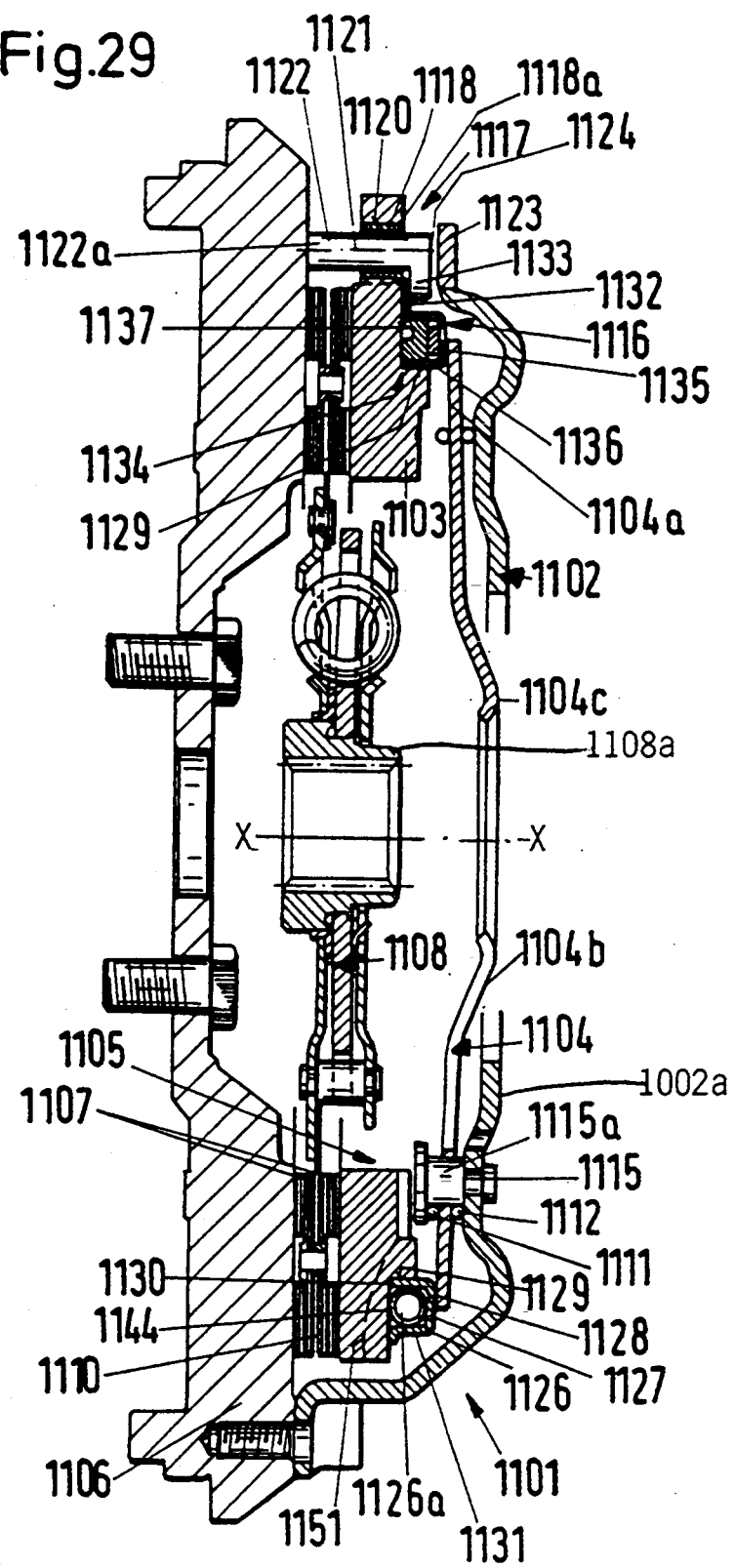
FIG. 29 is a sectional view as seen in the direction of arrows from the line XXIX—XXIX in FIG. 28.

Referring to FIG. 29, the ring 1126 is centered relative to the pressure plate 1103 by at least one shoulder 1129 which is provided on the pressure plate 1103 adjacent the inner sidewall 1130 of the ring 1126. The shoulder 1129 can constitute a circumferentially complete surface of the pressure plate 1103 or a composite surface consisting of a plurality of discrete arcuate sections adjacent the outer side of the sidewall 1130 of the ring 1126.

The walls 1127, 1130, 1131 of the ring 1126 define a ring-shaped space 1126a and the outer wall 1131 is provided with a set of equidistant projections or lobes 1132 which extend radially outwardly and cooperate with complementary projections 1133 of the axially movable leaf springs 1122 forming part of the monitoring device 1117. The complementary projections 1133 can constitute suitably shaped integral parts of the leaf springs 1122 and extend radially inwardly to overlie and to be thus located in the path of movement of projections 1132 on the radially outer sidewall 1131 of the ring 1126. This ensures that the ring 1126 cannot move away from the pressure plate 1103 in a direction toward the cover 1102.

A displacing device 1134 between the ring 1126 and the pressure plate 1103 serves to automatically reset the ring 1126 during disengagement of the friction clutch 1101 in order to compensate for wear upon the pressure plate 1103 and/or flywheel 1106 but mainly for wear upon the friction linings 1107. The displacing device 1134 performs a self-locking (blocking) action during engagement of the friction clutch 1101 to thus ensure that the ring 1126 will assume a predetermined axial position relative to the pressure plate 1103 while the friction clutch is in the process of being engaged. The position of the ring 1126 relative to the pressure plate 1103 can change only during disengagement of the friction clutch 1101 and only to the extent determined by the amount of wear upon the aforementioned parts 1103, 1106 and/or 1107.

The displacing device 1134 comprises a plurality of pairs of wedges 1135, 1136, and such pairs are preferably equidistant from each other in the circumferential direction of the ring 1126. The pairs of wedges 1135, 1136 are installed in the circular internal space 1126a of the ring 1126. The wedges 1136 contact a ring-shaped surface 1137 of the pressure plate 1103 and are non-rotatably secured to the ring 1126 but are axially movably installed in the internal space 1126a. To this end, the sidewalls 1130, 1131 of the ring 1126 are provided with guide means in the form of ribs 1138, 1139 constituting projections extending into the space 1126a and confining the wedges 1136 to movement in the axial direction of the friction clutch 1101. To this end, the wedges 1136 are provided with recesses or grooves 1140, 1141 to receive the ribs 1138, 1139, respectively. The grooves 1140, 1141, as well as the ribs 1138, 1139, extend in parallelism with the axis X—X of the friction clutch 1101.

As can be seen in FIG. 30, the wedges 1135 are installed axially in the space 1126a of the ring 1126, namely between the bottom wall or end wall 1127 and the adjacent wedges 1136. The wedges 1135, 1136 respectively include or define ramps 1143, 1142 which extend in the circumferential direction of the ring 1126 and slope axially of the friction clutch 1101 in a direction from the inner side of the end wall 1127 toward the open side of the ring 1126. The ramps 1143 of the wedges 1135 abut the ramps 1142 of the adjacent wedges 1136. Those sides of the wedges 1135 which face away from the respective ramps 1143 are adjacent the inner side of the end wall 1127, and each wedge 1135 can be shifted in the circumferential direction of the ring 1126 in order to compensate for wear upon the pressure plate 1103, flywheel 1106 and/or friction linings 1107. The ramps 1142 of the wedges 1136 bear against the ramps 1143 of the adjacent wedges 1135. Such engagement between the ramps 1142 and the adjacent ramps 1143 is achieved by the provision of coil springs 1144 which are received in the space 1126a of the ring 1126. Each spring 1144 reacts against one of the wedges 1136 (which are held against movement in the circumferential direction of the ring 1126) and bears against one of the wedges 1135 (i.e., against one of those wedges which are movable in the circumferential direction of the ring 1126). The wedges 1135, 1136 are respectively provided with projections 1145, 1146 which extend into the adjacent end convolutions of the respective springs 1144. These springs are further confined and guided by the internal surfaces of the walls 1127, 1130 and 1131 of the ring 1126.

Figure 31:
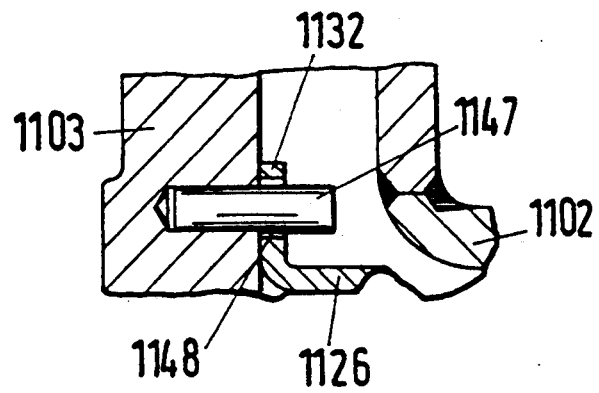
FIG. 31 is an enlarged sectional view substantially as seen in the direction of arrows from the line XXXI—XXXI in FIG. 28.

The friction clutch 1101 is constructed in such a way that the ring 1126 cannot rotate relative to the pressure plate 1103. As can be seen in FIG. 31, the pressure plate 1103 is provided with axially extending projections in the form of pins or studs 1147 extending through holes or bores 1148 provided in the aforementioned projections 1132 extending radially outwardly from the sidewall 1131 of the ring 1126. Such non-rotatable mounting of the ring 1126 relative to the pressure plate 1103 ensures that, when the friction clutch 1101 is in use, the projections 1132 are always overlapped by the projections 1133 of the leaf springs 1122.

The wedges 1135, 1136 in the space 1126a of the ring 1126 are assumed to be made of a heat-resistant plastic material, such as a thermoplastic or a pressure setting substance. The material of these wedges can be reinforced by filaments of glass fibers or the like. Such construction of the wedges 1135, 1136 is preferred at this time because it renders it possible to mass produce the wedges in an injection molding or other readily available plastic processing machine. However, it is also possible, and often preferred, to make at least one set of the wedges 1135, 1136 of a material having a high coefficient of friction, e.g., from the material of which the friction linings 1107 are made. Still further, it is possible to make the wedges 1135 and/or 1136 of metallic sheet material or from a suitable sintered metal.

The inclination and the length of the ramps 1142, 1143 are selected in such a way that one ensures reliable adjustment of the wedges 1135, 1136 relative to each other in order to compensate for wear upon the pressure plate 1103, flywheel 1106 and/or friction linings 1107 during the entire useful life of the friction clutch 1101. The inclination (angle 1149 in FIG. 30) of the ramps 1142, 1143 with reference to a plane which is normal to the axis X—X of the friction clutch 1101 is selected with a view to ensure that friction which develops when the ramps 1142, 1143 are biased against each other suffices to prevent any slippage of the wedges 1135 and the associated wedges 1136 relative to each other. The magnitude of the angles 1149 (slope of the ramps 1142, 1143) will depend upon the selection of materials of the wedges 1135, 1136 and is normally between approximately 5 and 20 degrees, preferably close to or exactly 10 degrees. The wedges 1135 which can move in the circumferential direction of the ring 1126 are oriented in such a way that their tips face in the direction (arrow 1150) of rotation of the friction clutch 1101. Furthermore, the magnitude of the angles 1149 and the bias of the springs 1144 are such that the resultant axial force acting upon the ring 1126 is smaller than the force which is required to move the leaf springs 1122 of the monitoring device 1117.

It is further important or desirable to select the characteristics of the diaphragm spring 1104 in such a way that the force to be applied by this spring against the pressure plate 1103 can be increased by a value corresponding to the force which is needed to displace the leaf springs 1122 plus the stressing of leaf springs 1109 between the cover 1102 and the pressure plate 1103. Furthermore, the component parts of the friction clutch 1101 should be designed in such a way that, in comparison with the wear upon the friction linings 1107, the wear at the locus or loci of engagement of the ring 1126 with the diaphragm spring 1104 as well as the wear between the leaf springs 1122 and the flywheel 1106 and between the leaf springs 1122 and the cover 1102 be small or negligible.

Referring again to FIG. 30, and in order to avoid unintentional shifting of the ramps 1142, 1143 of the wedges 1136, 1135 relative to each other, at least one of each pair of cooperating ramps 1142, 1143 can be provided with relatively small projections or protuberances which tend to be caught by the adjacent ramps. These protuberances can be designed and dimensioned with a view to permit necessary movements of the pairs of wedges 1135, 1136 relative to each other in order to compensate for wear upon the parts 1103, 1106 and/or 1107 but to prevent any undesirable slippage of the ramps 1142, 1143 relative to one another. It is normally preferred to provide the just discussed minute protuberances on each of the ramps 1142 as well as on each of the ramps 1143 and to orient the protuberances in such a way that those on the ramps 1142 mate or mesh or become interlaced with the protuberances of the ramps 1143. For example, the protuberances can constitute relatively small (e.g., minute) sawtooth-shaped profiles on the ramps 1142 and/or 1143. Such protuberances should be capable of preventing accidental or unintentional shifting of the pairs of wedges 1135, 1136 relative to each other but they should not interfere with those adjustments of the ramps 1142, 1143 relative to each other which are needed to compensate for the aforediscussed wear, mainly upon the friction linings 1107 but preferably also (if any) upon their friction surfaces of the pressure plate 1103 and flywheel 1106. FIG. 30 shows (enlarged for better illustration) protuberances 1143a in the form of sawteeth which are applied to one of the two abutting ramps 1142, 1143. If only one of the ramps 1142, 1143 is provided with protuberances 1143a and/or analogous protuberances, they can be designed in such a way that their hardness exceeds the hardness of the material of the adjacent (non-profiled or non-serrated) ramps; this ensures that the relatively hard protuberances will be capable of penetrating (to a small or minute extent) into the adjacent ramps 1142 or 1143 to thus further reduce the likelihood of accidental displacement of the wedges 1136 relative to the adjacent wedges 1135 in the circumferential direction of the ring 1126.

In the absence of any undertakings to the contrary, the temperature of the arcuate leaf springs 1122 would be likely to rise to a rather high value in response to engagement of the pressure plate 1103 with the adjacent set of friction linings 1107. This could result in a reduction of resiliency of the leaf springs 1122. Therefore, the sleeves 1118 for the leaf springs 1122 are preferably made of a material exhibiting a low heat conductivity and a high friction coefficient to prevent excessive transfer of heat from the pressure plate 1103 during engagement of the friction clutch 1101. The material of the wedges 1135, 1136 can be the same as that of the sleeves 1118.

In order to ensure satisfactory cooling of the friction clutch 1101, especially of the pressure plate 1103, the latter can be provided with substantially radially extending grooves, channels and/or other passages which are preferably equidistant from each other in the circumferential direction of the cover 1102 and one of which is shown in FIG. 29 by broken lines, as at 1151. The arrangement may be such that the passages 1151 alternate with pairs of wedges 1135, 1136 in the circumferential direction of the ring 1126. Each passage 1151 is provided in the pressure plate 1103 between the adjacent set of friction linings 1107 and the ring 1126. The cooling action can be enhanced still further by providing the ring 1126 with axially extending slots starting at the bottom wall or end wall 1127 adjacent the coil springs 1144. This establishes radially extending passages between the diaphragm spring 1104 and the ring 1126.

The resistance of various selected parts of the friction clutch 1101 to wear can be enhanced by providing such parts with coats consisting of suitable wear-resistant material. For example, certain parts can be provided with layers of hard chrome or molybdenum. Alternatively, selected parts of the friction clutch can be provided with inserts, shells or envelopes of highly wear-resistant material. For example, the leaf springs 1122 can be provided with shoes of plastic material, at least in the regions where these leaf springs contact or are likely to contact the flywheel 1106 and/or the cover 1102.

The leaf springs 1109 which transmit torque between the pressure plate 1103 and the cover 1102 are installed in stressed condition in such a way that they shift the pressure plate in a direction toward the bottom wall 1102a of the cover 1102 in response to disengagement of the friction clutch 1101. This ensures that the ring 1126 continues to abut the diaphragm spring 1104 during the entire stage of disengagement of the friction clutch 1101, i.e., until the monitoring device 1117 becomes effective.

The path of movement of the tips 1104c of prongs 1104b of the diaphragm spring 1104 (i.e., of the actuating means in the means for engaging and disengaging the friction clutch 1101) is preferably selected in such a way that the radially outermost portion of the diaphragm spring 1104 is slightly spaced apart from the ring 1126 when the movement of the tips 1104c in a direction to disengage the friction clutch is completed. Thus, when the friction clutch is being disengaged, the distance covered by the diaphragm spring 1104 in the region of the seat 1105 (where the diaphragm spring bears (directly or indirectly) against the pressure plate 1103) exceeds the extent of movement (clearance 1124) of the pressure plate 1103 away from the flywheel 1106 (as determined by the leaf springs 1122).

Those relative positions of various parts of the friction clutch 1101 which are shown in FIG. 29 are assumed by these parts when the extent of wear upon the pressure plate 1103, flywheel 1106 and friction linings 1107 is minimum or nil. Once the friction linings 1107 have undergone a certain amount of wear, the pressure plate 1103 changes its position in a direction toward the flywheel 1106 (when the friction clutch 1101 is engaged). This results in a change of conicity of the diaphragm spring 1104 as well as in a change of bias of the diaphragm spring upon the pressure plate 1103, preferably in a sense to increase the bias. This, in turn, causes the pressure plate 1103 to change its axial position relative to the leaf springs 1122 which abut the flywheel 1106 in the axial direction of the friction clutch. Since the ring 1126 is biased by the diaphragm spring 1104, this ring shares the axial movement of the pressure plate 1103 toward the flywheel 1106 to an extent which is determined by wear (primarily) upon the friction linings 1107. This, in turn, causes the projections 1132 of the ring 1126 to move axially and away from the corresponding projections 1133 of the leaf springs 1122 through a distance which also corresponds to or at least approximates the reduction in the thickness of friction linings 1107 due to wear as a result of repeated frictional engagement with and disengagement from the friction surfaces of the pressure plate 1103 and flywheel 1106. The axial position of the ring 1126 relative to the pressure plate 1103 remains unchanged during engagement of the friction clutch 1101 because the ring is acted upon by the diaphragm spring 1104 in a direction toward the pressure plate and the displacing device 1134 is self-locking in the course of the clutch engaging operation, i.e., the device 1134 acts as a means for "locking" the ring 1126 to the pressure plate 1103 during engagement of the friction clutch. When the clutch is being disengaged, i.e., when the tips 1104c of the prongs 1104b move along their path in the opposite direction, the pressure plate 1103 is biased by the leaf springs 1109 which urge the pressure plate toward the bottom wall 1102a of the cover 1102. The pressure plate 1103 ceases to move axially toward the bottom wall 1102a until the leaf springs 1122 engage the cover 1102 and more specifically the marginal portion 1123 of thus cover. The extent of movement of the prongs 1104b in a direction to disengage the friction clutch 1101 corresponds to the extent of movement of the pressure plate 1103 away from the flywheel 1106, and the axial position of the ring 1126 relative to the pressure plate remains unchanged. If the movement of the prongs 1104b in a direction to disengage the friction clutch 1101 continues, the pressure plate 1103 comes to a halt (i.e., its axial position remains unchanged) but the ring 1126 continues to share the axial movement of the adjacent portion of the diaphragm spring 1104 (namely of the portion which bears upon the end wall 1127 of the ring 1126). The ring 1126 is arrested and no longer moves toward the bottom wall 1102a of the cover 1102 when the projections 1132 at the end wall 1127 of the ring reengage the projections 1133 of the leaf springs 1122. Axial shifting of the ring 1126 is effected by the wedges 1135 which are biased by the coil springs 1144 to move relative to the adjacent wedges 1136 in the circumferential direction of the ring 1126 until the projections 1132 again engage and bear against the respective projections 1133 on the leaf springs 1122.

In the friction clutch 1101 of FIGS. 29 to 32, the pressure plate 1103 can be disengaged from the adjacent set of friction linings 1107 (i.e., moved axially and away from the flywheel 1106) by the stressed leaf springs 1109. Thus, the leaf springs 1109 always tend to disengage the pressure plate 1103 from the clutch disc 1108, i.e., to move the pressure plate toward the bottom wall 1102a of the cover 1102. If the diaphragm spring 1104 continues to perform a movement in a sense to disengage the friction clutch, the radially outer portion of the diaphragm spring moves axially and away from the ring 1126 because the ring 1126 is arrested and no longer moves toward the bottom wall 1102a when its projections 1132 reengage the projections 1133 of the leaf springs 1122. Such, even very slight, disengagement of the diaphragm spring 1104 from the ring 1126 during disengagement of the friction clutch 1101 is of particular advantage for the system including the devices 1117 and 1134.

The devices 1117 and 1134 ensure that adjustment of the ring 1126 as a result of shifting of the wedges 1135 and their ramps 1143 relative to the ramps 1142 of the wedges 1136 invariably compensates for wear upon the pressure plate 1103, flywheel 1106 and friction linings 1107. This is attributable to the fact that the ring 1126 is clamped between the adjusting elements (wedges) 1135, 1136 on the one hand, and the leaf springs 1122 on the other hand (as seen in the axial direction of the friction clutch 1101); this prevents the ring 1126 from performing an axial movement greater than that corresponding to wear (primarily) upon the friction linings 1107. In addition, the devices 1117 and 1134 ensure that, even if the prongs 1104b of the diaphragm spring 1104 cover a distance greater than necessary to disengage the friction clutch 1101, or if the pressure plate 1103 is caused to perform axial vibratory movements relative to the flywheel 1106, the wedges 1135, 1136 do not effect any adjustment of the type required to take place in order to compensate for wear upon the friction linings 1107. The reason is that the leaf springs 1122 do not move relative to the pressure plate 1103 and/or vice versa, even in the event of a pronounced impact of their stops or projections 1133 against the marginal portion 1123 of the cover 1102. The reason is that the displacing device 1134 is self-locking by way of the projections 1132. Thus, even if the friction clutch 1101 is disengaged, the leaf springs 1122 can be acted upon by forces acting in the axial direction of the friction clutch toward the flywheel 1106 and having a magnitude exceeding that between the leaf springs 1122 and the pressure plate 1103 without risking any axial displacement of the pressure plate and leaf springs 1122 relative to each other.

The improved adjusting unit 1116 ensures that, for all practical purposes, only a certain part of the characteristic curve of the diaphragm spring 1104 requires consideration during the entire useful life of the friction clutch (i.e., while the wear upon the friction linings 1107 progresses from zero to a maximum permissible value). Moreover, the bias of the pressure plate 1103 upon the friction linings 1107 in engaged condition of the friction clutch is the same irrespective of the extent of wear upon the friction linings because the bias of the diaphragm spring 1104 upon the pressure plate remains unchanged. This, in turn, renders it possible to employ a diaphragm spring 1104 having a degressive characteristic curve during actuation of the means for disengaging the friction clutch, preferably in combination with a clutch plate or clutch disc 1108 wherein the two sets of friction linings 1107 are biased apart by resilient segments 1110 or the like. This renders it possible to reduce the magnitude of the effective clutch disengaging force to a relatively low level and to maintain the disengaging force at such low level during the entire useful life of the friction clutch 1101, as long as the characteristic curve of the resilient segments 1110 remains at least substantially unchanged during the useful life of the friction clutch. When the friction clutch is being disengaged, the diaphragm spring 1104 is tilted at the seat 1105 whereby the stressing of the resilient segments 1110 decreases during a certain portion of axial movement of the prongs 1104b along their path, i.e., during a certain stage of axial movement of the pressure plate 1103 away from the flywheel 1106. The resilient segments 1110 dissipate energy during the just mentioned stage of movement of the pressure plate 1103 away from the flywheel 1106 to thus assist in disengagement of the friction clutch. This means that the maximum force which is required to disengage the friction clutch 1101 is smaller than the theoretical force generated by and attributable to the mode of installation of the diaphragm spring 1104 in engaged condition of the friction clutch. When the range of resiliency of the segments 1110 is exceeded, the friction linings 1107 are released (disengaged from the pressure plate 1103 and flywheel 1106) and, due to the degressive characteristic curve of the diaphragm spring 1104 during disengagement of the friction clutch, the remaining disengaging force which is to be applied is much less than that disengaging force which would correspond to the installation point or position of FIG. 29. As the disengagement of the friction clutch 1101 continues, the magnitude of the disengaging force continues to decrease at least until the lowest point of the preferably sinusoidal characteristic curve of the diaphragm spring 1104 is reached.

It is advantageous to design the devices 1117 and 1134 in the friction clutch 1101 of FIGS. 28 and 29 in such a way that, when the friction clutch is driven, the individual convolutions of the coil springs 1144 in the space 1126a of the ring 1126 about the radially outer sidewall 1131 of the ring 1126. Friction between the springs 1144 and the sidewall 1131 then opposes or completely neutralizes the forces which the springs 1144 tend to apply in the circumferential direction of the ring 1126, i.e., those forces which would tend to shift the wedges 1135 relative to the wedges 1136 and to thus compensate for wear upon the friction linings 1107 at a time when such compensation is not necessary. In other words, the springs 1144 act not unlike rigid bodies when the friction clutch 1101 is driven by the internal combustion engine of a motor vehicle or by any other prime mover, and such behavior of the springs 1144 is attributable to friction between their convolutions and the adjacent internal surface of the radially outer sidewall 1131 of the ring 1126. In addition, the wedges 1135 are also acted upon by centrifugal force which urges them against the internal surface of the radially outer sidewall 1131 of the ring 1126 so that the wedges 1135 are in frictional engagement with the sidewall 1131 and are not likely to move in the circumferential direction of the ring 1126 while the friction clutch 1101 rotates and the springs 1144 are acted upon by centrifugal force. The arrangement may be such that the magnitude of centrifugal force acting upon the springs 1144 and wedges 1135 suffices to prevent any undesirable shifting of these wedges in the circumferential direction of the ring 1126 unless the rotational speed of the friction clutch 1101 is within the idling RPM range of the internal combustion engine provided that the friction clutch is put to use between the engine and the variable-speed transmission of a motor vehicle. At such time, the springs 1144 are incapable of effecting any shifting of the wedges 1135 relative to the adjacent wedges 1136. Thus, the friction clutch 1101 can be designed in such a way that any compensation for wear upon the friction linings 1107 can take place only when the RPM of the engine is within or at least close to the idling RPM. Blocking of adjustment to compensate for wear upon the friction linings 1107 during certain stages of operation of the motor vehicle which employs the improved friction clutch 1101 can also be accomplished only when the internal combustion engine or any other prime mover which is used to rotate the friction clutch is idle or its RPM is negligible, i.e., when the flywheel 1106 does not rotate and does not transmit torque to the pressure plate 1103 and cover 1102 or the RPM of the flywheel 1106 is minimal. All that is necessary is to carry out corresponding adjustments in the design of the displacing device 1134.

The materials of the wedges 1135, 1136 and of the parts which cooperate with these wedges are preferably selected in such a way that the wedges of the pairs of wedges 1135, 1136 do not tend to adhere to each other during any stage of useful life of the friction clutch 1101, i.e., that adherence between the ramps 1142, 1143 of pairs of cooperating wedges 1135, 1136 cannot rise to a value at which the device 1134 would be incapable of compensating for wear upon the friction linings 1107. Undesirable adherence of the ramps 1142 to the adjacent ramps 1143 can be prevented by coating at least one of the ramps of each pair of wedges 1135, 1136 with a suitable friction reducing or preventing (lubricating) material.

It is further possible to prevent adherence of the ramps 1142 and the neighboring ramps 1143 to each other by providing the friction clutch 1101 with one or more systems or devices which apply to the ramps 1135 an axially oriented force in a direction axially of the friction clutch and away from the neighboring wedges 1136 in order to break the bonds (if any) between the neighboring ramps 1142 and 1143 in response to each disengagement of the friction clutch. This ensures that the device 1134 is ready to accurately compensate for any and all wear upon the friction linings 1107 and, if necessary, also upon the friction surfaces of the flywheel 1106 and pressure plate 1103.

Referring to FIG. 30, the position of the mobile wedge 1135 which is illustrated therein relative to the adjacent wedge 1136 departs from the initial position, namely from that position which the wedge 1135 assumes (as seen in the circumferential direction of the ring 1126) when the wear upon the friction linings 1107 is negligible, minimal or nil, for example, prior to mounting of the pressure plate 1103 and the cover 1102 on the flywheel 1106. At such time, the ring 1126 assumes a position at a minimal axial distance from the pressure plate 1103. Expressed otherwise, the combined thickness of the pressure plate 1103 and ring 1126 then assumes a minimum value. In order to ensure that the wedges 1136 will remain in their fully retracted positions (nearest to the end wall 1127 of the ring 1126) while the cover 1102 and/or the pressure plate 1103 is being connected to the flywheel 1106, the wedges 1135 are preferably provided with portions (e.g., in the form of recesses or notches 1152 shown in FIG. 30) which can receive the working ends of suitable retaining or retracting tools. Such tools are put to use during assembly of the structure including the ring 1126, coil springs 1144 and wedges 1135, 1136 and/or during attachment of the cover 1102 and pressure plate 1103 to the flywheel 1106 in order to ensure that the mobile wedges 1135 will be fully retracted when the friction clutch 1101 is assembled and the wear upon its parts 1103, 1106, 1107 is still zero or negligible. It is clear that the just discussed tools are removed (disengaged from the wedges 1135 and/or 1136) when the assembly of the friction clutch 1101 is completed; this ensures that the device 1134 is then ready to ensure necessary adjustments to compensate for wear upon the parts 1103, 1106 and/or 1107. As can be seen in FIGS. 30 and 32, the ring 1126 is provided with elongated slots 1153 which enable the working ends of one or more retaining tools to enter the notches 1152 of the wedges 1135, 1136. For example, the means for retracting the wedges 1135 or for maintaining the wedges 1135 in retracted positions prior to completed assembly of the friction clutch 1101 can comprise one or more turning or rotating tools. The length of the slots 1153 (which extend in the circumferential direction of the ring 1126) should suffice to ensure that the wedges 1135 can be shifted relative to the associated wedges 1136 through a distance not less than the maximum range of adjustment of wedges 1135 relative to the wedges 1136 for the purpose to compensate for maximum wear upon the friction linings 1107. When the wedges 1135 are moved to their fully retracted starting positions (corresponding to those when the wear upon the linings 1107 is zero), the thus retracted wedges 1135 can be maintained in such positions by the leaf springs 1122 which secure the ring 1126 in the retracted angular position. The self-adjusting connections between the leaf springs 1122 and the pressure plate 1103 must be designed in such a way that the shifting or displacing force which is required to move the leaf springs 1122 relative to the pressure plate 1103 exceeds the resultant of forces acting upon the ring 1126 and furnished by the coil springs 1144, i.e., by the springs which tend to shift the wedges 1135 relative to the adjacent wedges 1136.

FIG. 30 shows that the wedges 1135 and their ramps 1143 are separately produced parts which are introduced into the space 1126a of and are secured to the ring 1126. It is possible to avoid the making of discrete wedges 1135 by the simple expedient of properly shaping (deforming, such as stamping) the end wall 1127 of the ring 1126, i.e., the wedges 1135 can constitute integral parts of (they can be of one piece with) the ring 1126. The springs 1144 are then designed to turn the ring 1126 (with its integral wedges 1135 and/or ramps 1143) relative to the pressure plate 1103. The other wedges 1136 (or at least the ramps 1142) can be of one piece with the pressure plate 1103. Alternatively, the wedges 1136 can be produced in a separate step to be thereupon affixed (e.g., welded, glued and/or otherwise bonded) to the pressure plate 1103. The thus modified friction clutch must employ a ring 1126 with projections corresponding to but being much longer than the projections 1132 (as seen in the circumferential direction of the ring 1126) in order to ensure that the length of the modified projections corresponding to the projections 1132 will at least match that angular displacement of the ring 1126 which is necessary to ensure a full range of automatic adjustments of the axial position of the pressure plate 1103 relative to the flywheel 1106 in order to compensate for wear upon the parts 1103, 1106 and/or 1107. This ensures that an axial limit or stop between the leaf springs 1122 and the ring 1126 is established and maintained during the entire useful life of the thus modified friction clutch. In the just described embodiment of the friction clutch (i.e., in that modification of the friction clutch wherein the wedges 1135 are of one piece with the ring 1126 and the wedges 1136 are of one piece with the pressure plate 1103), the angular position of the ring 1126 relative to the pressure plate 1103 can be changed from without upon completed assembly of the friction clutch. For example, it is possible to change the angular position of the ring 1126 in response to engagement of its projections 1132 which are made accessible through windows or other suitable radially extending openings in the radially outer portion of the cover 1102. Such openings or windows can further serve to receive the torque transmitting lobes 1125 of the pressure plate 1103 and/or the leaf springs 1109.

Figure 33:
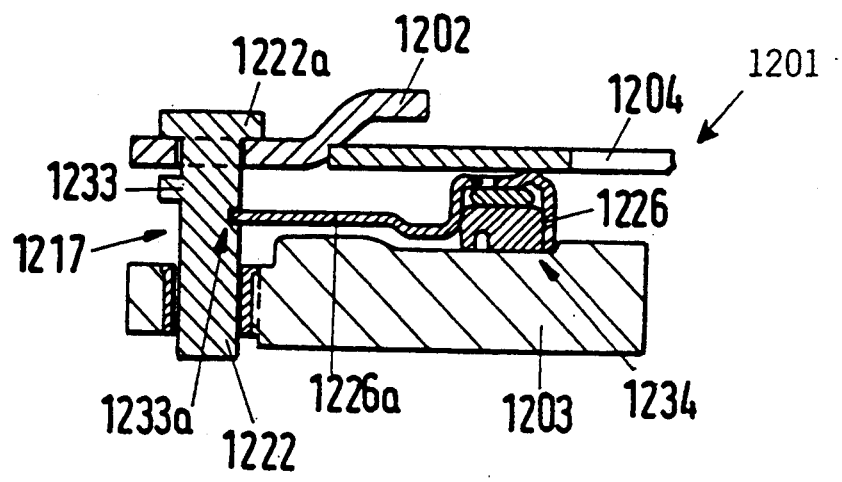
FIG. 33 is a fragmentary axial sectional view of a tenth friction clutch.

The adjusting unit 1116 which is shown in FIGS. 28–32 and its aforedescribed modifications exhibit the advantage that the novel features thereof can be embodied with equal advantage in so-called pull-type friction clutches wherein the diaphragm spring has a radially outer portion tiltably mounted on the cover or housing and radially inner portions bearing upon the pressure plate. A portion of such pull type friction clutch 1201 is shown in FIG. 33. A unit 1234 which compensates for wear at least upon the friction linings (not shown in FIG. 33) is installed between the diaphragm spring 1204 and the pressure plate 1203 and can be constructed and assembled in a manner as described with reference to the embodiment of FIGS. 28–32. The ring 1226 of the compensating unit 1234 cooperates with wear detecting or sensing means 1222 by way of sensor elements 1217. The positions of the wear detecting means 1222 relative to the pressure plate 1203 are adjusted in that their end portions 1222a engage the housing or cover 1202. The wear detecting means 1222 are provided with projections or abutments 1233 which limit the extent of axial movability of the pressure plate 1203 during disengagement of the friction clutch 1201. In order to ensure satisfactory functioning of the unit 1234, the ring 1226 is mounted in such a way that it has freedom of at least some axial movability relative to the detecting means 1222. This can be achieved by establishing a connection 1233a between the detecting means 1222a and radially extending portions or arms 1226a of the ring 1226, whereby the tips of the arms 1226a have a certain minimal freedom of movability relative to the respective detecting means 1222 and/or vice versa. The arms 1226a can be received in the notches of the adjacent detecting means 1222 without any clearance if such arms are sufficiently resilient to permit the required axial movements of the ring 1226 and the detecting means 1222 relative to each other.

Figure 34:
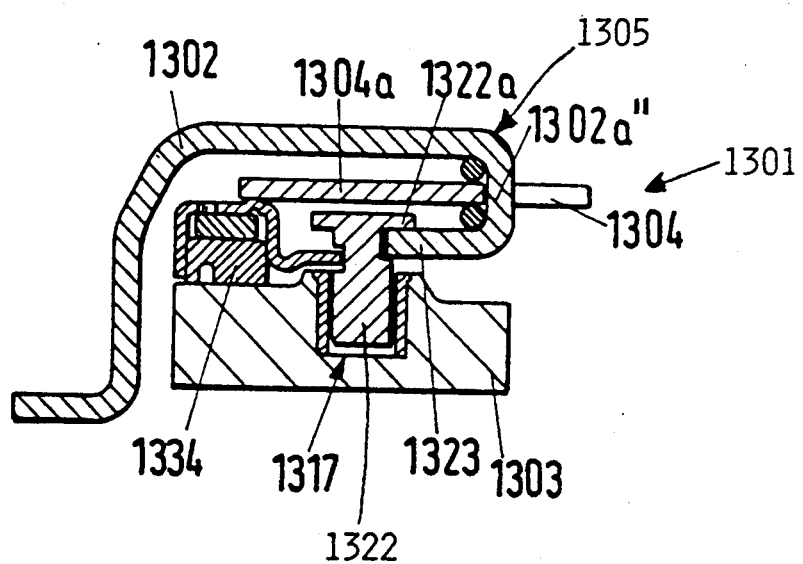
FIG. 34 is a fragmentary axial sectional view of an eleventh friction clutch.

FIG. 34 shows a portion of a friction clutch 1301 wherein the sensor elements 1317 extend directly into the main portion of the pressure plate 1303. The wear detecting means 1322 are provided with stops or heads 1322a which cooperate with complementary stops 1323 forming part of the housing or cover 1302. The stops 1323 are of one piece with securing means 1302a" forming part of a seat 1305 for the diaphragm spring 1304. The illustrated securing means 1302a" include prongs or lugs which are of one piece with the cover 1302 and extend axially of the friction clutch 1301 through the diaphragm spring 1304. The wear compensating device 1334 is disposed radially outwardly of the sensor elements 1317 which, in turn, are adjacent the circumferentially complete main portion 1304a of the diaphragm spring 1304.

An advantage of the improved friction clutch is that its useful life can be prolonged by the simple expedient of employing thicker friction linings, i.e., by establishing a longer path for adjustment of the pressure plate relative to the counterpressure plate in order to compensate for wear upon the friction linings. In addition, the improved friction clutch renders it possible to reduce the magnitude of the disengaging force by employing an energy storing resilient device (e.g., the diaphragm spring 4 or 1104) with a degressive force-to-displacement ratio or characteristic in combination with at least one resilient element (such as the segments 10 or 1110) which opposes the bias of the resilient device that acts upon the pressure plate. The at least one resilient device ensures a gradual increase or decrease of the torque which can be transmitted by the friction clutch and its clutch disc during a portion at least of engagement or disengagement of the friction clutch, i.e., during at least a portion of movement of the actuating means (such as the prongs 4b and their tips 4c) of the clutch engaging and disengaging means along its predetermined path. The resilient element is preferably installed in series with the diaphragm spring. The design of the improved friction clutch is such that the magnitude of the disengaging force can be reduced to a surprisingly large extent; moreover, such reduction of the required disengaging force exists and remains at least substantially unchanged during the entire useful life of the improved friction clutch. In other words, if it fluctuates at all, the disengaging force fluctuates within a very narrow range.

A further important advantage of the improved friction clutch is that it can employ a diaphragm spring whose distance-to-force ratio is relatively steep within the entire operating range. The utilization of such diaphragm springs in heretofore known friction clutches would result in highly pronounced rise of the disengaging force in response to wear upon the friction linings.

In a friction clutch which is not provided with the improved wear compensating or adjusting unit, the point 41 (FIG. 8) on the curve 40 migrates along the sinusoidal path in a direction toward the maximum 41a. As already discussed hereinabove, the point 41 denotes an axial force which is generated by the diaphragm spring 4 in the friction clutch 1 of FIGS. 1-2 when the friction clutch is engaged. During disengagement of the friction clutch, the magnitude of the disengaging force decreases in a direction toward and up to the point 41b. In general, the level of progress of the disengaging force increases in comparison to the level of the progress of disengaging force when the friction linings are devoid of wear. Thus, the distance 43 shown in FIG. 8 is shifted in a direction to the left toward the position 43a until the point 41 coincides with the maximum 41a. The point 44 is then transferred accordingly along the path which is denoted by the curve 40. As the wear upon the friction linings progresses, the installation point of the curve denoting the magnitude of the force of the diaphragm spring in engaged condition of the friction clutch migrates from the maximum 41a gradually toward the point 41b, i.e., the bias of the diaphragm spring upon the pressure plate in a conventional friction clutch decreases at a gradual rate. That force of the diaphragm spring which is applied to the pressure plate at the point 41b in the diagram of FIG. 8 corresponds to the force which is applied when the wear upon the friction linings is nil (note the point 41). As soon as the maximum 41a is exceeded, disengagement of the friction clutch first entails an increase of the disengaging force, at least during a portion of movement of the actuating means (such as the prongs and the tips of prongs forming part of the diaphragm spring). When the maximum permissible wear upon the friction linings is reached (note the point 41b in the diagram of FIG. 8), the magnitude of the disengaging force must increase during each and every stage of disengagement of a conventional friction clutch which is not equipped with the novel adjusting unit. Such rise of the magnitude of disengaging force is observable even if the friction linings of the conventional friction clutch cooperate with the resilient segments 10 or with a substitute for such resilient segments (as indicated in FIG. 8 by the broken line 42a).

In designing the improved friction clutch, and particularly its adjusting unit, it is necessary to take into consideration that, if the friction clutch is utilized in a power train receiving torque from the output element (such as a crankshaft) of an internal combustion engine in a motor vehicle, the output shaft is likely to transmit to the flywheel (such as the flywheel) 6 in the friction clutch 1 of FIGS. 1 and 2, at least some axial and/or other (such as wobbling) vibratory or stray movements. The flywheel transmits such undesirable stray movements to other component parts of the friction clutch. This could induce the adjusting unit 16 in the friction clutch 1 of FIGS. 1 and 2 (or the adjusting unit of any other of the various heretofore described friction clutches) to carry out certain adjustments for non-existent wear upon the flywheel, the pressure plate and/or the friction linings of the friction clutch. In other words, it is necessary to undertake certain steps in order to prevent undesirable axial, wobbling and/or other stray movements of the flywheel from influencing the adjusting unit. In the friction clutches which are shown in FIGS. 1 to 27, i.e., in those which are equipped with a sensor corresponding to the sensor 13 in the friction clutch 1 of FIGS. 1 and 2, the adjusting force of this sensor must exceed the forces of inertia which can influence the sensor. Such inertial forces are the sums of forces due to inertia of the main diaphragm spring (the spring 4 in the friction clutch 1), of the adjusting member (such as 17) and/or the adjusting elements (such as 18 and 24), a certain portion of the mass of the sensor (such as 13) and, at least in certain instances, the masses of some additional components multiplied by the maximum possible axial acceleration of these parts and/or components, all due to axial and/or other vibratory or other stray movements of the flywheel in response to stray movements of the output element of the prime mover.

By way of example, and referring to the friction clutch 1001 of FIG. 27 wherein the sensor 1013 engages the pressure plate 1003, it is also necessary to take into consideration the inertia of the pressure plate 1003. Thus, it is necessary to ensure that the force which is generated by the sensor will exceed the sum of forces which act upon the sensor and are obtained by multiplying the maximum axial acceleration with the combined mass of all parts which act upon the sensor due to their inertia. Such inertial forces can exert an undesirable influence, particularly during actuation of the friction clutch and also in disengaged condition of the friction clutch.

In the embodiments of the improved friction clutch which are shown in FIGS. 28 to 34, the wear detecting means and the wear compensating means must also be designed with a view to take into consideration those forces which develop as a result of inertia of all parts which are set in motion in response to axial and/or other vibratory movements which are transmitted from the output element of the prime mover to the flywheel of the friction clutch.

All in all, the designer of a friction clutch with built-in wear compensating or adjusting means must take into consideration the masses of those elements which can be acted upon and can be set in motion in response to transmission of axial, rotary, wobbling and/or other stray movements from the output element of the prime mover to the flywheel of the friction clutch. In the embodiments of FIGS. 28-34, it is particularly important to take into consideration the inertia of all such parts which influence the operation of the ramps, such as the ramps 1142, 1143 in the ring 1126 of the friction clutch 1101 shown in FIGS. 28 and 29.

Figure 35:
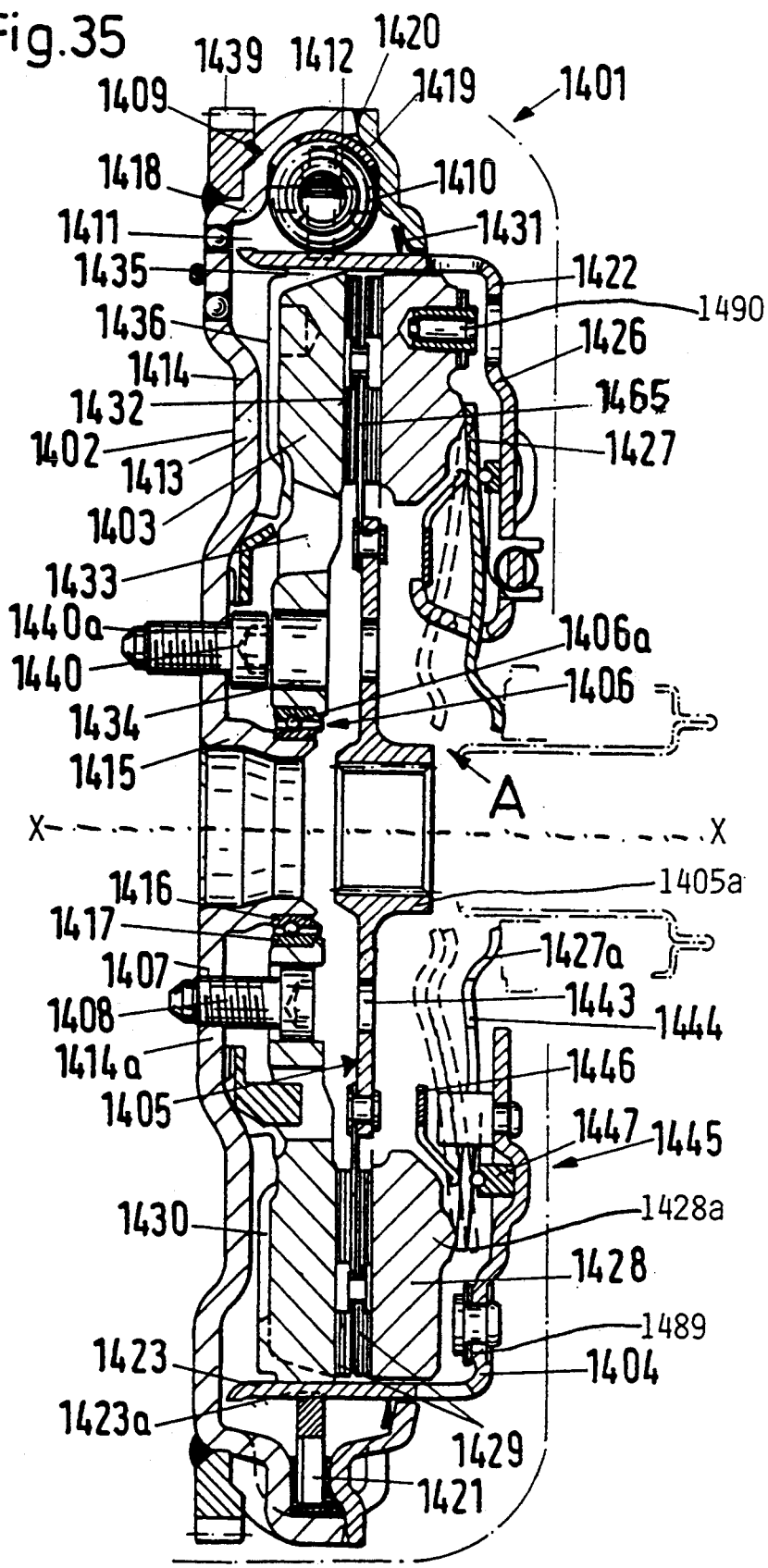
FIG. 35 is an axial sectional view of an aggregate embodying a friction clutch of the class shown in FIGS. 1 to 27 and a twin-mass flywheel which transmits torque from the output element of an engine in a motor vehicle to the housing of the friction clutch.

FIG. 35 shows a friction clutch which embodies or is mounted on one (secondary) mass or flywheel 1403 of a composite (twin) flywheel 1401 further including a flywheel or primary mass 1402 and a damper 1409 between the masses 1402, 1403. The primary mass 1402 of the composite flywheel 1401 can be connected to the output element (e.g., a crankshaft, not shown) of an internal combustion engine and transmits torque to the secondary mass or flywheel 1403 corresponding, for example, to the flywheel 6 in the friction clutch 1 of FIGS. 1 and 2. The friction clutch which embodies or is combined with the secondary flywheel 1403 is denoted by the reference character 1404. The friction clutch 1404 further comprises a pressure plate 1428 and a torque transmitting clutch disc or clutch plate 1405 between the pressure plate 1428 and the secondary mass 1403. The hub 1405a of the clutch disc 1405 can transmit torque to the input element of a variable-speed transmission in the power train of a motor vehicle. The shaft of the input element of the transmission is indicated at X—X.

An antifriction bearing 1406 is installed between the masses 1402 and 1403 of the composite flywheel 1401; this bearing is disposed radially inwardly of bolts 1408 or other suitable fasteners which are used to secure the primary mass 1402 to the output element of the engine. The primary mass 1402 has bores or holes 1407 for the shanks 1440a of the fasteners 1408. The damper 1409 between the masses 1402, 1403 of the flywheel 1401 includes energy storing elements in the form of coil springs 1410 acting in the circumferential direction of the flywheel 1401 and being confined in an annular compartment 1412 constituting the radially outer part of a chamber 1411 between the masses 1402 and 1403. The chamber 1411 is at least partially filled with a viscous fluid, such as oil, grease or another lubricant.

At least the major part of the primary mass 1402 is constituted by a member 1413 which is made of a metallic sheet material and includes a substantially radially extending flange-like portion 1414 having an axial protuberance 1415 which is of one piece therewith and is located radially inwardly of the holes or bores 1407 for the fasteners 1408. The antifriction bearing 1406 which is shown in FIG. 35 comprises a single row of spherical rolling elements 1406a and an inner race 1416 surrounding the free end of the axially extending protuberance 1415 of the flange 1414. The outer race 1417 of the bearing 1406 is received in a central opening provided in the radially innermost portion of the secondary mass 1403; the latter resembles a substantially flat disc or washer.

The radially outermost part of the flange 1414 forming part of the primary mass 1402 is of one piece with a first wall 1418 which surrounds at least one-half of the compartment 1412 and is welded or otherwise sealingly secured to a second wall 1419 surrounding another part of the compartment 1412. The wall 1418 and/or 1419 can directly or indirectly guide the radially outermost portions of convolutions forming part of the energy storing elements 1410 in the compartment 1412. The reference character 1420 denotes a welded seam which connects the walls 1418, 1419 to each other radially outwardly of the compartment 1412 and ensures that the confined viscous fluid cannot escape from the chamber 1411 under the action of centrifugal force when the composite flywheel 1401 receives torque from the output element of the engine.

The compartment 1412 is divided into a series of arcuate sections, one for each energy storing element 1410, and such sections are separated by partitions which constitute abutments for the adjacent end convolutions of the respective energy storing elements 1410. The partitions can be made of one piece with the wall 1418 and/or 1419 of the primary mass 1402; they may constitute inwardly bent pockets of the walls 1418 and 1419. Such mode of making partitions between the energy storing elements 1410 is particularly desirable when the parts of the primary mass 1402 are made of a ductile metallic sheet material.

The energy storing elements 1410 are further acted upon by radially outwardly extending arms 1421 adjacent the secondary mass 1403. The arms 1421 also alternate with the energy storing elements 1410, as seen in the circumferential direction of the composite flywheel 1401, and cooperate with the aforediscussed pockets of the primary mass 1402 to ensure that the elements 1410 store energy (or additional energy) whenever the mass 1402 turns relative to the mass 1403 and/or vice versa. These arms are provided on or can constitute integral parts of the housing or cover 1422 of the friction clutch 1404. As shown, the arms 1421 are of one piece with the axially extending portion 1423 of the cover 1422. Each arm 1421 extends radially outwardly into the compartment 1412 between the ends of the two neighboring energy storing elements 1410. The axially extending portion 1423 of the cover 1422 has a portion 1423a which extends beyond the arms 1421 in a direction toward the mass 1402 and surrounds the mass 1403. The means for connecting the cover 1422 to the mass 1403 can comprise inwardly extending portions (not specifically shown) of the portion 1423 and complementary sockets in the periphery of the mass 1403. Other connecting means (e.g., in the form of radially extending pins or the like) can be used with similar advantage.

The cover 1422 includes a bottom wall 1426 which extends substantially at right angles to the axis X—X constituting the common axis of the clutch 1404 and the input element of the transmission and is remote from the arms 1421. This bottom wall is outwardly adjacent a diaphragm spring 1427 which acts not unlike a two-armed lever and serves to urge the pressure plate 1428 axially toward the friction linings 1429 of the clutch disc 1405. The projecting portion or portions 1428a of the pressure plate 1428 are engaged by the circumferentially complete radially outer main portion of the diaphragm spring 1427, and the latter includes radially inwardly extending prongs 1427a forming part of actuating means for the friction clutch 1404, i.e., of means for engaging and disengaging the clutch.

FIG. 35 further shows resilient segments 1465 which are disposed between the two groups or sets of friction linings 1429 and perform the same function as the segments 10 in the friction clutch 1 of FIGS. 1 and 2.

The chamber 1411 and its compartment 1412 are disposed, at least to a large extent, radially outwardly of the secondary mass 1403 of the composite flywheel 1401. This renders it possible to position the member 1413 of the primary mass 1402 (i.e., of that mass which is to be directly connected with the output element of an engine) into immediate or close proximity to the secondary mass 1403 in a region radially inwardly of the chamber 1411. FIG. 35 shows a relatively narrow clearance 1430 which is established between the member 1413 of the primary mass 1402 and the secondary mass 1403. Such design contributes significantly to compactness of the friction clutch 1404, as seen in the direction of the axis X—X, and more particularly of the aggregate including the friction clutch 1404 proper, the composite flywheel 1401 and the clutch disc 1405.

The chamber 1411 is sealed by an annular sealing element 1431 which is installed between the radially inner portion of the wall 1419 (i.e., of the primary mass 1402) and the axially extending portion 1423 of the cover 1422.

The aforementioned clearance 1430 between the member 1413 of the primary mass 1402 and the secondary mass 1403 can be utilized to ensure desirable cooling of the composite flywheel 1401. This is achieved by inducing one or more currents of cool atmospheric air to flow through the clearance when the aforementioned aggregate or assembly is in actual use, i.e., when the output element of the engine drives the primary mass 1402 and the latter drives the secondary mass 1403 through the damper 1409 including the energy storing elements 1410 in the compartment 1412 of the chamber 1411. The means for cooling the flywheel 1401 further comprises passages or channels 1433 which extend through the secondary mass 1403 radially inwardly of a friction surface 1432 which is engageable by the adjacent set of friction linings 1429 when the friction clutch 1404 is engaged. The channels 1433 communicate with the clearance 1430. The cooling action is further enhanced by the provision of additional channels 1435 which extend axially through the secondary mass 1403 and are disposed radially outwardly of the friction surface 1432. The channels 1435 communicate with the clearance 1430, the same as the channels 1433. The channels 1433 supply cool atmospheric air into the radially inner portion of the clearance 1430, and such air then flows radially outwardly to cool the composite flywheel 1401 and to leave the clearance 1430 through the channels 1435. These channels can admit the atmospheric air into the cover 1422 which is provided with outlets to permit escape of heated air into the surrounding atmosphere.

The secondary mass 1403 is provided with holes or bores 1434 which are disposed radially inwardly of the channels 1433 and are aligned with the holes or bores 1407 to permit introduction of the fasteners 1408 which serve to affix the primary mass 1402 to the output element (e.g., a crankshaft) of an engine. In addition, the holes or bores 1434 can also promote circulation of air in the clearance 1430, i.e., they can contribute to more satisfactory cooling of the composite flywheel 1401.

A further sealing element 1436 is disposed in the clearance 1430 to seal the latter from the radially innermost portion of the annular chamber 1411 for the supply of viscous fluid and for the energy storing elements 1410 of the damper 1409. The sealing element 1436 can include or constitute a membrane or a diaphragm spring.

The wall 1418 of the primary mass 1402 is provided with a starter gear 1439 which is preferably welded thereto.

The composite flywheel 1401 including the masses 1402, 1403 and the group including the friction clutch 1404 and the clutch disc 1405 together constitute a preassembled module A which is or can be assembled at the manufacturing plant and can be put to storage or shipped to a maker of motor vehicles to be affixed to the output element of an engine by the fasteners 1408 or in any other suitable way. The assembly of the module A at the plant contributes significantly to lower cost of the improved aggregate, to lower cost of its storage and shipment, and to lower cost of its attachment to the output element of an engine. In order to assemble the module A, the friction clutch 1404 is assembled with the secondary mass 1403 and with the clutch disc 1405 in a first step. The thus obtained subassembly including the components 1403, 1404 and 1405 is thereupon assembled with the primary mass 1402 by placing the member 1413 of the primary mass next to the secondary mass 1403 so that the masses 1402, 1403 are coaxial with one another. This takes place before the wall 1419 is affixed (welded) to the wall 1418 of the primary mass 1402. The wall 1419 surrounds the axially extending portion 1423 of the cover 1422 and is welded (at 1420) to the wall 1418 in a next following step. Of course, the energy storing elements 1410 are inserted into the compartment 1412 of the chamber 1411 prior to welding of the walls 1418, 1419 to each other.

The antifriction bearing 1406 is installed between the masses 1402, 1403 in automatic response to proper positioning of the member 1413 of the mass 1402 relative to the mass 1403; such bearing is installed first on the axially extending protuberance 1415 of flange 1414 of the member 1413. The fasteners 1408 are inserted into the holes 1407 of the portion 1414a of the flange 1414 before the masses 1402, 1403 are angularly movably coupled to each other by the damper 1409. Each fastener 1408 can constitute a hexagon socket screw, i.e., a screw with a polygonal socket 1440 in its head. The initial positions of the fasteners correspond to that of the fastener 1408 shown in the lower half of FIG. 35. It is preferred to provide means for yieldably holding the shanks 1440a of the fasteners 1408 in the axial positions corresponding to that of the shank forming part of the fastener 1408 shown in the lower half of FIG. 35. The holding means prevent accidental displacement or loss of the fasteners 1408 and ensure that the shanks 1440a of these fasteners are maintained in optimum positions for introduction into complementary tapped bores or holes of the output element of the engine.

The clutch disc 1405 is centered between the pressure plate 1428 of the friction clutch 1404 and the friction surface 1432 of the secondary mass 1403 of the composite flywheel 1401 and is maintained in such position while the module A is in storage or in transport to the automobile assembly plant. The angular position of the clutch disc 1405 in the module A is such that its holes or bores 1443 are aligned with the holes or bores 1434 in the secondary mass 1403; this renders it possible to introduce the working end of a tool (e.g., a device analogous to a screwdriver) into the sockets 1440 in the heads of fasteners 1408 in order to drive the shanks 1440a of such fasteners into the complementary tapped bores or holes in the output element of the engine. The tool can further extend through aligned holes or bores 1444 which are provided in the prongs 1427a of the diaphragm spring 1427 and communicate with the slots between neighboring prongs. The diameters of the holes or bores 1443 are smaller than the diameters of the heads of the fasteners 1408 so that, once installed in a manner as shown in the lower part of FIG. 35, the fasteners 1408 of a module A cannot become lost or misplaced because they are confined in optimum positions for attachment to the output element of an engine in a motor vehicle. The openings 1444 in the prongs 1427a of the diaphragm spring 1427 can constitute simple recesses or notches; such recesses or notches communicate with the slots between the respective prongs 1427a to provide room for introduction of the aforediscussed tool which must also pass through the holes 1443 and into the holes 1434 in order to enter the sockets 1440 in the heads of the respective fasteners 1408.

It is often preferred to distribute the tapped holes or bores in the output element of the engine and the holes or bores 1407 in the member 1414 of the primary mass 1402 in such a way that the mass 1402 can be affixed to the output element in a single angular position, i.e., the holes 1407 need not be equidistant from each other. The dimensions of the openings 1434, 1443 and 1444 are selected in such a way that they permit the working end of a tool to engage the heads of the fasteners 1408, one after the other, even if the holes 1434 are uniformly distributed in the secondary mass 1403, the holes 1443 are uniformly distributed in the clutch disc 1405, and the holes 1444 are uniformly distributed in the pronged portion of the diaphragm spring 1427. The working end of the tool has a shape such that it can be non-rotatably received in the preferably hexagonal socket 1440 in the head of a fastener 1408.

The assembly of a module A at the manufacturing plant contributes significantly to convenience, simplicity and lower cost of installation of the aggregate (including the composite flywheel 1401, the friction clutch 1404 and the clutch disc 1405) in a motor vehicle. This will be readily appreciated since the making of the module A renders it possible to dispense with a number of time-consuming operations which are necessary to install heretofore known friction clutches in automotive vehicles. For example, the clutch disc 1405 is properly centered in the module A so that no centering of the clutch disc is needed immediately prior to or during attachment of the composite flywheel 1401 to the output element of the engine. Furthermore, the clutch disc 1405 is already installed between the secondary mass 1403 and the pressure plate 1428 at the time the secondary mass 1403 is to be coupled to the primary mass 1402 by the bearing 1406 and the damper 1409, and the friction clutch 1404 is properly attached to the output element as soon as the latter is connected with the primary mass 1402 by fasteners 1408. Still further, it is no longer necessary to employ a centering mandrel, to center the clutch disc 1405 relative to the pressure plate 1428 at the motor vehicle assembly plant, to select and insert the fasteners 1408, to connect the friction clutch 1404 with the composite flywheel 1401 and/or to extract a centering mandrel during or subsequent to attachment of the friction clutch to the engine.

The friction clutch 1404 is provided with an adjusting unit 1445 which is or can be identical with or analogous to any one of the adjusting units shown in and described with reference to FIGS. 1 through 27. The adjusting unit 1445 includes a sensor 1446 (e.g., in the form of a diaphragm spring corresponding, for example, to the spring 13) and an annular member 1447 corresponding, for example, to the member 17 in the friction clutch 1 of FIGS. 1 and 2.

It is normally preferred, primarily for the purpose of reducing the cost, to establish a permanent connection between the cover 1422 and the secondary mass 1403. Such permanent connection can be established by bonding (such as welding) or by deformation of selected portions of the mass 1403 and/or cover 1422 so that the separation of these parts would involve at least partial destruction (such as extensive deformation) of the cover and/or of the secondary mass. The establishment of such permanent connection renders it possible to avoid the use of screws, bolts and/or other threaded or other fasteners. Since the aggregate including the twin-mass flywheel 1401, the clutch disc 1405 and the friction clutch 1404 is designed to remain fully assembled during its entire useful life, i.e., until the wear upon the friction linings 1429 becomes excessive, there is no urgent need to establish a readily separable connection between these parts or to establish a connection which would permit repeated assembly and dismantling of the aggregate. In spite of the absence of means for permitting repeated dismantling and assembly of the aggregate which is shown in FIG. 35, such aggregate functions satisfactorily during its entire useful life because the adjusting unit 1445 compensates for wear upon the friction linings 1429 but preferably also for wear upon one or more additional parts such as the secondary mass 1403 and/or the pressure plate 1428. The dimensions of the freshly installed friction linings 1429 can be selected with a view to ensure that they do not become useless due to excessive wear prior to expiration of the anticipated useful life of the aggregate. As a rule, the useful life of the aggregate will be selected to at least match the anticipated life span of the motor vehicle in which the aggregate is being put to use.

Twin-mass flywheels which can be used in the improved aggregate, e.g., in a manner as shown in FIG. 35, are disclosed, for example, in published German patent applications Serial Nos. 37 21 712, 37 21 711, 41 17 571, 41 17 582 and 41 17 579. The features which are disclosed in the just enumerated published patent applications can be combined with the features of the improved friction clutch and/or with the features of the improved aggregate in a number of different ways. By way of example only, the aforementioned published German patent application Serial No. 41 17 579 discloses several manners of establishing a connection between the housing or cover and a flywheel in such a way that the connection cannot be terminated without at least partial destruction of the flywheel and/or housing.

The utilization of an adjusting device 1445 in an aggregate which employs a composite flywheel for transmission of torque from a prime mover to the cover and/or pressure plate of a friction clutch is advisable and advantageous on the additional ground that the damper 1409 between the masses 1402, 1403 can prevent the transmission to the mass 1403 (i.e., to the counterpressure plate of the friction clutch 1404) of a number of stray movements which would be likely to adversely influence the operation of the adjusting unit 1445. The damper 1409 is preferably installed radially outwardly of the friction linings 1429 and radially outwardly of the friction surface 1432 on the secondary mass 1403 and/or pressure plate 1403. In a composite flywheel of the type shown in FIG. 35, the friction diameter of the clutch disc 1405 should be smaller than in conventional friction clutches which renders it necessary to increase the biasing force in dependency on the ratio of average friction radii in order to be in a position to transmit a predetermined engine torque. If a conventional friction clutch (without the adjusting unit 1445) were used, this would necessitate an increase of the disengaging force. By employing in the aggregate of FIG. 35 a friction clutch with an adjusting unit 1445

(e.g., an adjusting unit of the type described with reference to FIGS. 1 to 7a), it is now possible to reduce the disengaging force and to thus avoid an increase of disengaging force above that which is required in a conventional friction clutch. In fact, it is now possible to reduce the disengaging force below that which must be applied in a conventional friction clutch in spite of the fact that the adjusting unit 1445 renders it possible to compensate for wear during the entire useful life of the friction clutch and/or of the structure (such as a motor vehicle) in which the improved friction clutch is put to use.

Figure 36:
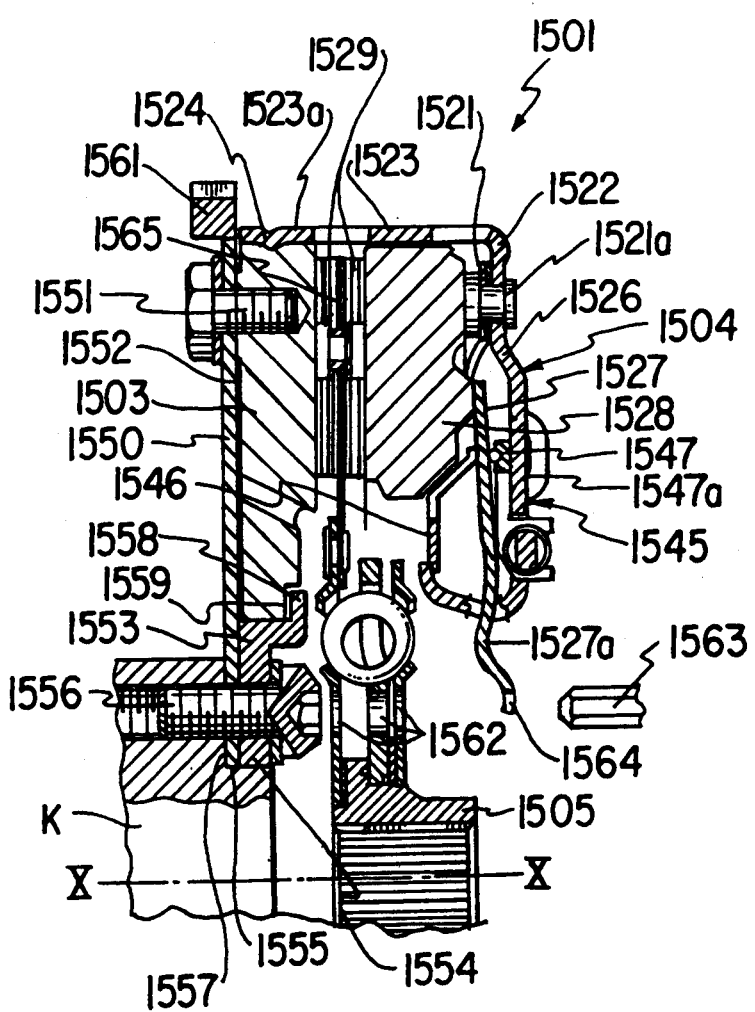
FIG. 36 is a fragmentary axial sectional view of a preassembled aggregate employing a friction clutch of the class shown in FIGS. 1 and 2 and the manner of insulating the friction clutch from stray movements of the output element of the engine in a motor vehicle.
Figure 37:
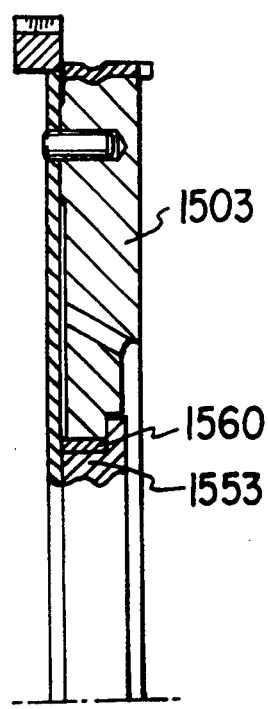
FIG. 37 is a fragmentary axial sectional view of a preassembled aggregate which constitutes a modification of the aggregate shown in FIG. 36.

Referring to FIGS. 36 and 37, there is shown a torque transmitting arrangement or assembly 1501 comprising a counterpressure plate 1503 which is non-rotatably connectable to the output element K (e.g., a crankshaft) of an internal combustion engine, and a friction clutch 1504 connected to the plate 1503 in such a way that a clutch plate or clutch disc 1505 is disposed between the plate 1503 and a pressure plate 1528 of the friction clutch 1504. The hub of the clutch disc 1505 transmits torque to the input element (e.g., an externally splined shaft) of a variable-speed transmission in the power train between the friction clutch 1504 and the wheels of a motor vehicle. The axis of the input element of the transmission is shown at X—X.

The friction clutch 1504 comprises a housing or cover 1522 having an axially extending marginal portion 1523 which surrounds the pressure plate 1528 and the friction linings 1529 of the clutch disc 1505. The free end 1523a of the marginal portion 1523 (the latter can be said to resemble a relatively short sleeve or tube) surrounds the counterpressure plate 1503 and is non-rotatably connected thereto. For example, the free end 1523a can be provided with radially inwardly extending protuberances, lugs or like parts 1524 which extend into complementary sockets or recesses of the counterpressure plate 1503 to ensure that this plate and the cover 1522 rotate as a unit. However, it is also possible to connect the cover 1522 with the counterpressure plate 1503 in any one of a number of other ways; for example, these parts can be welded to each other or the connections between these parts can include threaded fasteners, pins, studs, posts or like parts preferably extending in the radial direction of the counterpressure plate 1503 and of the marginal portion 1523 of the cover 1522. The just discussed connecting means preferably also serve to accurately center the counterpressure plate 1503 and the cover 1522 relative to each other.

The cover 1522 comprises an annular section or bottom wall 1526 which extends radially inwardly of the marginal portion 1523 and is outwardly adjacent a diaphragm spring 1527 which acts not unlike a two-armed lever and serves to bias the pressure plate 1528 toward the adjacent set of friction linings 1529 forming part of the clutch disc 1505. The radially outermost part of the circumferentially complete main portion of the diaphragm spring 1527 can bear against the projecting portion or portions of the pressure plate 1528, and a radially inner part of such main portion is tiltably mounted at the inner side of the bottom wall 1526 by a seat. The radially inwardly extending prongs 1527a of the diaphragm spring 1527 constitute the actuating means of the means for engaging and disengaging the friction clutch 1504. When the clutch 1504 is engaged, the radially outermost part of the main portion of diaphragm spring 1527 causes the pressure plate 1528 to bear against the adjacent set of friction linings 1529 and also causes the other set of friction linings 1529 to bear against the friction surface of the counterpressure plate 1503. The means for engaging and disengaging the friction clutch 1504 further comprises a conventional bearing or a pedal (similar or analogous to a gas pedal in a motor vehicle) which must be actuated by the driver in order to move the prongs 1527a along their predetermined path and to thus effect the engagement or disengagement of the friction clutch 1504.

The means for transmitting torque between the pressure pate 1528 and the cover 1522 of the friction clutch 1504 which is shown in FIG. 36 comprises leaf springs 1521 each having a first end portion affixed to the cover 1552 and a second end portion affixed to the pressure plate 1528. It is presently preferred to employ rivets 1521a or analogous fasteners as a means for connecting the leaf springs 1521 to the pressure plate 1528 and/or to the cover 1522. As can be seen in the upper part of FIG. 36, the rivets 1521a are preferably of the type known as blind rivets; in FIG. 35, one such blind rivet is denoted by the character 1490.

The friction clutch 1504, i.e., the torque transmitting arrangement or assembly 1501, comprises an adjusting unit 1545 which is analogous to the adjusting units of friction clutches shown in FIGS. 1 to 27 and includes a diaphragm spring or sensor 1546 and an annular adjusting member 1547. The adjusting unit 1545 serves to compensate for wear upon the pressure plate 1528 and upon the counterpressure plate 1503 but particularly or primarily for wear upon the friction linings 1529.

The adjusting unit 1545 includes ramps which are provided directly in the annular member 1547 and are designed in such a way that they establish air transmitting passages 1547a. The member 1547 is located at the inner side of the bottom wall 1526 of the cover 1522, and the passages 1547a extend in the direction of rotation of the friction clutch 1504. Such passages promote desirable cooling of the friction clutch 1504 when the counterpressure plate 1503 is rotated by the output element K of the engine because the passages induce the flow of currents of cool air. This reduces the thermal stresses upon the annular member 1547 which can be made of a suitable plastic material. The annular member 1447 of the adjusting unit 1445 of the friction clutch 1404 shown in FIG. 35 can be constructed and configurated in the same way as the annular member 1547.

The means for affixing the counterpressure plate 1503 to the output element K of the engine comprises an axially elastic coupling element 1550 which enables the plate 1503 to perform limited axial movements relative to the output element and/or vice versa. The illustrated coupling element 1550 is a disc having a stiffness or rigidity such that it can effectively damp axial, wobbling, angular and/or other stray movements which the output element K would transmit to the friction clutch 1504 and which could interfere with accuracy of adjustments carried out by the unit 1545. The coupling element 1550 need not damp any and all stray movements; however, its damping action should be sufficient to ensure that the unit 1545 can properly adjust the position of the pressure plate 1528 in dependency upon the extent of wear on certain parts of the friction clutch 1504 and the aggregate 1501, especially in dependency on the wear upon the friction linings 1529. Furthermore, the elastic coupling element 1550 ensures proper operation of the friction clutch 1504 by ensuring proper operation of the adjusting unit 1545. Otherwise stated, the coupling element 1550 should constitute a barrier which is capable of transmitting torque from the output element K of the engine to the counterpressure plate 1503 but is also capable of shielding the counterpressure plate 1503 and the friction clutch 1504 from any such axial, angular and/or other stray movements of the output element K which could adversely affect the operation of the friction clutch 1504 and particularly the operation of the adjusting unit 1545. In the absence of the coupling element 1550, or of a functional equivalent of this coupling element, the unit 1545 would be likely to carry out unnecessary axial adjustments of the position of the pressure plate 1528 relative to the counterpressure plate 1503 or not to carry out such adjustments when they are warranted in view of the extent of wear upon the friction linings 1529. Unnecessary adjustments by the unit 1545 would be attributable primarily to the mass of various parts of the aggregate 1501 and to acceleration of such mass due to vibration of the output element K and (in the absence of the elastic coupling element 1550) of various parts of the friction clutch 1504. Alternatively, the relatively simple adjusting unit 1545 would have to be replaced with a much more complex adjusting unit, namely a unit designed with a view to take into consideration a host of additional variables including the inertia-induced forces acting upon the component parts of the adjusting unit. Moreover, all such inertia-induced forces would have to be properly related to each other in order to ensure that the thus modified adjusting unit would respond only and alone to signals pertaining to the extent of wear upon the pressure plate 1528, the counterpressure plate 1503 and/or the friction linings 1529. As a rule, a thus modified adjusting unit (to be used in lieu of the unit 1545 in the absence of the coupling element 1550) would require a number of additional parts and its space requirements would greatly exceed those of the unit 1545.

The adjusting unit 1545 of FIG. 36 operates between the cover 1522 and the pressure plate 1528 of the friction clutch 1504. However, it is equally possible to equip the aggregate 1501 with a friction clutch of the type shown in FIGS. 28 to 34, i.e., with a friction clutch wherein the adjusting means serving to compensate for wear upon the friction linings is disposed between the diaphragm spring and the pressure plate which is biased by the diaphragm spring.

The radially outer portion of the counterpressure plate 1503 in the aggregate 1501 of FIG. 36 is fixedly connected to the elastic coupling element 1550 by bolts 1551 or analogous threaded fasteners. For example, the bolts 1551 can be replaced with blind rivets of the type shown in FIG. 35, as at 1490, to connect leaf springs with the pressure plate 1428 of the friction clutch 1404. A narrow radially extending gap 1552 is established between the neighboring surfaces of the counterpressure plate 1503 and the coupling element 1550 radially inwardly of the fasteners 1551; the width of this gap (as measured in the direction of the axis X—X) determines the maximum amplitude of axial stray movements which can be damped by the element 1550 when the aggregate 1501 of FIG. 36 is in use. More specifically, the width of the gap 1552 determines the maximum amplitude of those axial movements which are directed from the output element K toward the counterpressure plate 1503. The width of the gap 1552 further determines the extent of maximum movability of the friction clutch 1504 and counterpressure plate 1503 toward the output element K. As a rule, the central portion of the counterpressure plate 1503 does not contact the coupling element 1550 if the engine functions properly.

The counterpressure plate 1503 is a ring which surrounds an axial protuberance 1553 of a washer-like member 1554; the latter is fixedly secured to the central portion of the elastic coupling element 1550 and can serve as a means for centering the element 1550 on a coaxial stub-like tubular projection 1555 of the output element K. The radially inner portion of the element 1550 is clamped between a front end face 1557 of the output element K and the centering member 1554.

The axial protuberance 1553 of the centering member 1554 has radially outwardly extending portions 1558 which constitute stops in that they limit the extent of movability of the counterpressure plate 1503 axially and away from the central portion of the elastic coupling element 1550 and output element K. To this end, the projecting portions or stops 1558 extend behind the central portion of the plate 1503, i.e., such central portion of the plate 1503 is located between the central portion of the element 1550 and the stops 1558. A narrow slot or clearance 1559 is normally established between the stops 1558 and the central portion of the plate 1503, and the width of this clearance 1559 can equal or approximate the width of the gap 1552.

The surface surrounding the central opening of the counterpressure plate 1503 can be slipped onto the centering member 1554 without any or with a minimum of play, i.e., the plate 1503 can be mounted on the member 1554 without any or with a minimum of radial play but is movable axially thereon to the extent which is determined by the gap 1552 and the clearance 1559. In other words, the centering member 1554 can be said to constitute a guide which confines the counterpressure plate 1503 to movements in the direction of the axis X—X. However, it is equally within the purview of the invention, and often preferable, to mount the radially inner portion of the ring-shaped counterpressure plate 1503 on the portion 1553 of the centering member 1554 with at least some radial play to thus ensure that, in normal operation of the aggregate 1501 (and assuming that the operation of the engine including the output element K is satisfactory), the counterpressure plate 1503 need not be in any contact with the centering member 1554 and/or its portion 1553 and/or the projections 1558 and/or the central portion of the elastic coupling element 1550.

It is further within the purview of the invention to provide the aggregate 1501 with additional means for preventing the transfer of stray movements between the output element K and the counterpressure plate 1503 or to use such additional means in lieu of the element 1550. For example, the additional preventing means can be designed to damp any such stray movements which cannot be damped and/or otherwise counteracted by the coupling element 1550 to thus even further ensure reliable operation of the adjusting unit 1545. Such additional preventing means can be designed to destroy energy which is attributable to vibratory and/or other stray movements of the output element K, e.g., in a manner as shown in FIG. 37, namely by relying on friction.

FIG. 37 shows that the radially innermost portion of the counterpressure plate 1503 and the external surface of the annular portion 1553 of the centering member 1554 are separated from each other by a further damper 1560. For example, the damper 1560 can consist of or can utilize a ring which is undulated in the circumferential direction so that its undulations extend radially. The ring of the damper 1560 can be installed in radially stressed condition to establish friction between its external surface and the surface surrounding the central opening of the counterpressure plate 1503 whenever the output element K causes the member 1554 and its portion 1553 to perform stray movements in the direction of the axis X—X. In other words, the ring 1560 can prevent the transfer of stray movements from the output element K to the counterpressure plate 1503 or reduces the amplitude of such movements to an acceptable minimum. It is possible to utilize a friction generating ring 1560 in the form of a split ring.

The radially outermost portion of the elastic coupling element 1550 carries a starter gear 1561 which can be welded or otherwise affixed thereto.

The coupling element 1550, the counterpressure plate 1503, the clutch disc 1505 and the friction clutch 1504 can be assembled into a module (corresponding to the module A shown in FIG. 35) which can be assembled at the manufacturing plant for convenient storage, shipment to an automobile assembling plant, and mounted on the output element K of an engine with substantial savings in space, initial cost and assembly cost. The fasteners 1556 which are shown in FIG. 36 and serve to secure the centering member 1554 and the coupling element 1550 to the output element K can constitute hexagon socket screws or bolts. As already described with reference to FIG. 35, such fasteners can be installed in the aforediscussed module in such a way that they cannot be lost and are maintained in optimum positions for attachment to the output element K of the engine.

The clutch disc 1505 of the aggregate 1501 which is shown in FIG. 36 is installed between and is centered relative to the pressure plate 1528 of the friction clutch 1504 and the counterpressure plate 1503 of the aggregate 1501. Moreover, the openings or holes 1562 which are provided in the clutch disc 1505 are in at least partial alignment with openings 1564 in the pronged radially inner portion 1527a of the diaphragm spring 1527 in order to permit the penetration of the working end of a tool 1563 into the polygonal sockets in the heads of the fasteners 1556 when it becomes necessary to drive the shanks of such fasteners into complementary tapped bores or holes in the output element K. The illustrated clutch disc 1505 comprises an input portion including the friction linings 1529, an output portion including the aforementioned hub which can be non-rotatably slipped onto the input element of a transmission, and a suitable damper employing coil springs or otherwise configurated energy storing elements disposed between the input and output portions; the holes 1562 are disposed radially inwardly of the damper between the input and output portions of the clutch disc 1505 which is shown in FIG. 36. The holes 1564 in the pronged portion 1527a of the diaphragm spring 1527 are optional, i.e., such holes or bores are necessary only if the tool 1563 cannot pass through the slots between the neighboring prongs of the diaphragm spring 1527. The extent of alignment between the holes or bores 1564, the holes or bores 1562 and the heads of the fasteners 1556 should suffice to ensure that the working end of the tool 1563 will be capable of entering the sockets in the heads of the fasteners 1556 even if the holes which are provided in the central portion of the elastic coupling element 1550 to permit the shanks of the fasteners to pass therethrough are not exactly equidistant from each other. As already described with reference to FIG. 35, such unequal distribution of holes in the coupling element 1550 and in the output element K is often desirable in order to ensure that the counterpressure plate 1503 can be mounted on the output element K in a single predetermined angular position of these parts relative to each other.

As already described with reference to the previously discussed embodiments of the present invention, the adjusting unit 1545 enables the friction clutch 1504 to operate satisfactorily during its entire useful life. This is due to the fact that the unit 1545 can compensate at least for wear upon the friction linings 1529 of the clutch disc 1505. Moreover, the adjusting unit 1545 renders it possible to permit the utilization of a diaphragm spring 1527 which is best suited to ensure that the magnitude of the force acting upon the pressure plate 1528 to clamp the friction linings 1529 between the friction surfaces of the plates 1503, 1528 remains within an optimal range for a long interval of time, particularly until the wear upon the linings 1529 has progressed to an extent which warrants discarding of the aggregate 1501. The diaphragm spring 1527 is preferably designed and mounted in such a way that it must merely furnish a force which is necessary to ensure adequate biasing of the pressure plate 1528 for the purpose of transmitting the desired torque from the clutch disc 1505 to the input element of the variable-speed transmission in the power train of a motor vehicle. The adjusting unit 1545 ensures proper positioning of the diaphragm spring 1527 during the entire life span of the aggregate 1501, i.e., it ensures that the bias of the diaphragm spring 1527 upon the pressure plate 1528 is satisfactory and practically unchanged whenever the friction clutch 1504 is engaged during the entire life span of the friction clutch.

The clutch disc 1505 further comprises resilient segments 1565 which constitute a means for gradually reducing the torque which is transmitted by the clutch disc 1505 during a portion of movement of the prongs 1527a along their path to disengage the friction clutch 1504. Furthermore, the segments 1565 ensure a gradual increase of torque which can be transmitted from the clutch disc 1505 to the variable-speed transmission during engagement of the friction clutch 1504, i.e., while the prongs 1527a of the diaphragm spring 1527 are caused to move in the opposite direction. This, in turn, renders it possible to reduce the magnitude of the force which is necessary to disengage the friction clutch 1504 and to ensure a more satisfactory variation of such force in the course of the actual disengaging operation. Thus, a desired variation of clutch disengaging forces can be achieved by the simple expedient of properly relating the forces which are generated by the resilient segments 1565 (or equivalents of such segments) and the diaphragm spring 1527, i.e., by properly relating the force-to-displacement ratios of such resilient means. This renders it possible to optimally design the elastic coupling element 1550, i.e., to ensure that the element 1550 will damp any and all stray movements which would be likely to adversely influence the operation of the adjusting unit 1545. As mentioned above, such stray movements can include axial wobbling, bending, angular, tilting and/or other movements which are carried out by the output element K and should not be transmitted to the counterpressure plate 1503. The magnitude of disengaging forces acting upon the coupling element 1550 is minimal. Thus, the forces which are required to disengage the friction clutch 1504 can be taken up by the element 1550 without any appreciable axial displacement of the aggregate 1501.

The elastic coupling element 1550 can be designed and mounted to shield the counterpressure plate 1503 (and hence the adjusting unit 1545) from a number of stresses which could result in unintentional or unnecessary adjustment of the distance of the pressure plate 1528 from the counterpressure plate 1503. It is particularly important to ensure that the coupling element 1550 is capable of counteracting the transmission of axial and wobbling movements of the output element K to the friction clutch 1504. As concerns the construction and mounting of the elastic coupling element 1550, reference may also be had to published European patent applications Serial Nos. 0 385 752 and 0 464 997 as well as to SAE Technical Paper No. 9 003 91. Disclosures of the two European patent applications and of the Technical Paper are incorporated herein by reference.

The coupling element 1550 is particularly effective in preventing undesirable adjustments attributable to vibratory movements of the counterpressure plate 1503 and/or diaphragm spring 1527. Any unintentional adjustments of the diaphragm spring 1527, i.e., any adjustments which are not necessary to compensate for wear upon the friction linings 1529 but are attributable to axial, wobbling and/or other stray movements of the output element K, could result in an undesirable reduction of the bias of the diaphragm spring upon the pressure plate 1528 below an acceptable minimum and would prevent the friction clutch 1504 (and its clutch disc 1505) from transmitting torques of desired magnitude.

The aforediscussed design of the improved friction clutch renders it possible to maintain the disengaging force at a low value in spite of a reduction of the outer diameter of the friction linings and the resulting need to increase the bias of the diaphragm spring or its equivalent(s) upon the pressure plate. Since the disengaging force is reduced, the stressing of the bearing (such as the bearing 1406 in FIG. 35) is less pronounced. Thus, it is possible to employ a less expensive antifriction bearing and/or a bearing whose space requirements are low.

Still another advantage of the improved friction clutch and/or of an aggregate which employs such friction clutch and/or of a driving unit which employs the improved friction clutch and/or the improved aggregate is that compensation for wear entails a pronounced lengthening of the useful life of the friction clutch. This renders it possible to avoid frequent (or any) replacement of parts which are subject to wear, particularly the clutch disc 1405. This, in turn, brings about the aforediscussed advantage that it is now possible to establish a permanent connection between the counterpressure plate and the cover of the friction clutch, i.e., a connection whose termination necessitates at least partial destruction of at least one of the interconnected parts. Such connection can include that which is shown in FIG. 36 and/or a connection which employs rivets, welded seams or the like. The establishment of a permanent or practically permanent connection is particularly desirable and advantageous when the dimensions of the space which is available for the improved friction clutch and/or the improved aggregate and/or the improved driving unit are small or extremely small, e.g., in a compact motor vehicle. Thus, even relatively small reductions of space requirements (such as avoiding the use of screws or bolts whose heads would project radially outwardly beyond the cover 1422 and/or beyond the composite flywheel 1401) are important to ensure that the friction clutch can be used in a particular series of motor vehicles. The construction which is shown in FIG. 35, as well as the construction which is shown in FIG. 36, ensures that, with the exception of the starter gear 1561, the radially outermost part of the composite flywheel 1401 or the radially outermost part of the cover 1522 determines the maximum space requirements of the improved aggregate or driving unit because the means for connecting the cover to the counterpressure plate 1403 or 1503 does not extend radially beyond the flywheel 1401 or the housing 1522.

The improved friction clutch with automatic compensation for wear upon one or more parts (e.g., with the adjusting unit 1545 of FIG. 36) can be utilized with particular advantage in driving units which are used in motor vehicles, especially in vehicles employing at least partially automatic (including automatic and semiautomatic) transmissions. The friction clutch is then installed between a prime mover (such as the engine of a vehicle) and the transmission and is operated or controlled at least in dependency upon the operation of the at least partly automatic transmission. It is presently preferred to establish a fully automatic control for the friction clutch. Automated and fully automatic controls for a friction clutch are disclosed, for example, in published German patent application Serial No. 40 11 850.9 to which reference may be had, if necessary.

In heretofore known driving units which employ an automatic or semiautomatic transmission and a conventional friction clutch, actuation of the friction clutch and the design of actuating means (such as electric motors and/or cylinder and piston assemblies) present numerous problems. Actuation of a conventional friction clutch necessitates the application of a relatively large disengaging force which, in turn, necessitates the use of rather bulky and powerful actuating means therefor. This contributes to the weight, space requirements and cost of such driving units, i.e., of units which employ at least partly automated transmissions in conjunction with conventional friction clutches. Moreover, the inertia of relatively large, bulky and heavy actuators which are employed in conventional driving units prolongs their reaction time. If the actuators are cylinder and piston units, the application of relatively large forces to actuate the friction clutch necessitates the flow of large quantities of a hydraulic or pneumatic fluid which also contributes to longer reaction times of such actuators. Moreover, it is necessary to employ one or more relatively large pumps which are required to supply the cylinder and piston units with requisite quantities of a pressurized fluid.

Attempts to eliminate some drawbacks of the just discussed conventional driving units include the utilization of compensating springs which are intended to reduce the actuating force necessary to disengage the friction clutch and to thus permit the utilization of smaller (more compact) actuators. Reference may be had, for example, to published German patent application Serial No. 33 09 427. However, since the disengaging force varies during the useful life of a conventional friction clutch (the required force is relatively small when the friction clutch is new but increases with increasing wear upon the friction linings during the life span of the friction clutch), a compensating spring can reduce only a relatively small fraction of the normally required disengaging force. If one takes into consideration all tolerances, it is still necessary to provide actuators which must furnish a disengaging force exceeding that which is necessary for an unused conventional friction clutch, and this in spite of the utilization of compensating springs. On the other hand, a driving unit which employs the improved friction clutch with an adjusting unit capable of compensating for wear at least upon the friction linings, and with a prime mover as well as an automatic or semiautomatic transmission, renders it possible to greatly reduce the disengaging force well below that which is required for proper operation of conventional driving units. Such reduction can take place directly in the friction clutch, and the magnitude of the disengaging force remains practically unchanged during the entire useful life of the friction clutch. This renders it possible to simplify and thus reduce the cost, bulk and reaction time of the actuators with attendant savings in space requirements and weight of the entire driving unit. Thus, the driving unit can be designed to stand relatively small pressures and/or forces. Furthermore, this results in a substantial reduction or even complete elimination of losses due to friction and/or decreasing resiliency of parts in the disengaging means for the improved friction clutch.

The improved friction clutch and/or the aggregate or assembly employing the improved friction clutch is susceptible of numerous additional modifications without departing from the spirit of the present invention. For example, the features of various described and shown clutches and/or aggregates can be used interchangeably or in combination with each other. Furthermore, the improved friction clutch and/or the improved aggregate and/or a motor vehicle which embodies the improved friction clutch or aggregate can also embody numerous additional features which are known per se but could further enhance the useful life and/or other desirable characteristics of the improved friction clutch and/or aggregate. Still further, at least some individual features of the aforedescribed friction clutches and/or aggregates embody features which are or could be considered to be novel and patentable per se.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An engageable and disengageable torque transmitting friction clutch, comprising:
   a housing rotatable about a predetermined axis;
   a pressure plate;
   means for non-rotatably connecting said pressure plate to said housing with limited freedom of movement in the direction of said axis;
   a rotary counterpressure plate adjacent said pressure plate;
   a torque transmitting clutch disc between said plates; at least one resilient device reacting against said housing to bias said pressure plate toward said counterpressure plate to thereby clamp said clutch disc against said counterpressure plate and to rotate said clutch disc about said axis, said clutch disc having friction linings engageable by and disengageable from at least one of said plates and being subject to wear as a result of repeated engagement with and disengagement from said at least one plate;
   an adjusting unit including means for compensating for wear upon said friction linings to thereby maintain the bias of said device upon said pressure plate at a substantially constant value;
   means for engaging and disengaging the clutch including actuating means movable along a predetermined path to engage and disengage the clutch; and
   means for varying the torque transmitted by at least one of the friction clutch and the clutch disc including means for gradually reducing the transmitted torque at least during a portion of movement of said actuating means along said path in a direction to disengage the clutch and means for axially yieldably locating at least one of said plates and said friction linings relative to the others of said plates and said friction linings, said torque varying means being acted upon by a variable force which decreases to a minimal value in response to disengagement of the friction clutch and gradually increases to a maximum value at least during a portion of movement of said actuating means along said path to engage the clutch.

2. The friction clutch of claim 1, wherein said pressure plate includes a portion which is biased by said at least one resilient device and the disengagement of the clutch includes axial movement of said pressure plate away from said counterpressure plate against the bias of said at least one resilient device, said torque varying means further comprising means for gradually reducing the torque which is transmittable by the friction clutch at least during a portion of axial movement of said pressure plate.

3. The friction clutch of claim 1, further comprising means for securing said housing to said counterpressure plate to thus establish a power train between said actuating means and said securing means, said torque varying means being disposed in said power train.

4. The friction clutch of claim 1, wherein said pressure plate has a friction surface engageable with said friction linings to establish a power train between said actuating means and said clutch disc, said torque varying means being disposed in said power train.

5. The friction clutch of claim 1, wherein said friction linings include a first and a second set of friction linings and said torque varying means is disposed axially between said sets of friction linings.

6. The friction clutch of claim 1, wherein said at least one resilient device has a degressive force-to-displacement ratio at least during a portion of movement of said actuating means along said path in a direction to disengage the clutch.

7. The friction clutch of claim 1, wherein said at least one resilient device comprises a diaphragm spring which bears against said pressure plate, and further comprising a seat tiltably mounting said diaphragm spring in said housing.

8. The friction clutch of claim 7, wherein said diaphragm spring comprises an annular portion and said actuating means comprises prongs extending radially inwardly from said annular portion.

9. The friction clutch of claim 7, wherein said seat comprises two portions disposed at opposite sides of said diaphragm spring.

10. The friction clutch of claim 1 for use in a motor vehicle, wherein said means for engaging and disengaging the clutch further comprises means for moving said actuating means including a pedal.

11. A clutch aggregate for use with a combustion engine, comprising:
   a torque transmitting friction clutch including a pressure plate and having an expected useful life;
   a counterpressure plate rotatable about a predetermined axis;
   means for non-rotatably connecting said pressure plate to said counterpressure plate with limited freedom of axial movement;
   a torque transmitting clutch disc between said plates;
   at least one resilient device acting upon said pressure plate to bias said clutch disc against said counterpressure plate, said clutch disc having friction linings engageable with and disengageable from at least one of said plates and being subject to wear as a result of repeated engagement with and disengagement from said at least one plate;
   an adjusting unit including means for compensating at least for wear upon said linings to thereby maintain the bias of said at least one resilient device upon said pressure plate at a substantially constant value during the useful life of the friction clutch and resilient means in series with said at least one resilient device;
   means for engaging and disengaging the friction clutch including actuating means movable along a predetermined path to disengage the friction clutch;
   means for gradually reducing the torque which is transmittable by at least one of the friction clutch and the clutch disc during a portion of movement of said actuating means in a direction to disengage the friction clutch; and
   axially elastic means for coupling the friction clutch with an output shaft of the combustion engine, said coupling means having a stiffness selected in such a way that at least one form of vibrations including axial, wobbling and flexing vibrations induced by the output shaft and transmitted to the friction clutch by said coupling means is at least suppressed to a degree which ensures proper operation at least of said adjusting unit of the friction clutch.

12. The clutch aggregate of claim 11, wherein the stiffness of said coupling means is such that the force to be applied to said actuating means for disengagement of the friction clutch is taken up by said coupling means without appreciable axial shifting of the clutch aggregate.

13. The clutch aggregate of claim 11, further comprising means for damping at least rotational vibrations of said counterpressure plate, said damping means being connectable between said output shaft and said counterpressure plate.

14. A driving unit, comprising an at least partly automatic transmission; an engine; and a torque transmitting friction clutch disposed between said engine and said transmission and controlled at least in dependency on the operation of said transmission, said friction clutch comprising:
   a pressure plate,
   a counterpressure plate rotatable about a predetermined axis and connectable with an output shaft of the engine,
   means for non-rotatably connecting said pressure plate to said counterpressure plate with limited freedom of movement in the direction of said axis,
   a torque transmitting clutch disc between said plates,
   at least one resilient device acting upon said pressure plate to bias said clutch disc against said counterpressure plate, said clutch disc having friction linings engageable with and disengageable from at least one of said plates and being subject to wear as a result of repeated engagement with and disengagement from said at least one plate,
   an adjusting unit including means for compensating at least for wear upon said linings to thereby maintain the bias of said at least one resilient device upon said pressure plate at a substantially constant value,
   means for engaging and disengaging the friction clutch including actuating means movable along a predetermined path to engage and disengage the friction clutch, and
   torque varying means including means for gradually reducing the torque which is transmittable by at least one of the friction clutch and the clutch disc during approximately 40–70 percent of movement of said actuating means along said path in a direction to disengage the friction clutch and for gradually increasing the torque which is transmittable by said friction clutch during approximately 40–70 percent of movement of said actuating means along said path in a direction to engage the friction clutch.

15. The driving unit of claim 14, wherein said at least one resilient device has a degressive force-to-displacement ratio, at least during a portion of movement of said actuating means along said path in a direction to disengage the friction clutch.

16. An engageable and disengageable torque transmitting clutch, comprising:
   a housing rotatable about a predetermined axis;
   a pressure plate;
   means for non-rotatably connecting said pressure plate to said housing with limited freedom of movement in the direction of said axis;
   a rotary counterpressure plate adjacent said pressure plate;
   a torque transmitting clutch disc between said plates;
   at least one resilient device reacting against said housing to bias said pressure plate toward said counterpressure plate to thereby clamp said clutch disc against said counterpressure plate and to rotate said clutch disc about said axis, said clutch disc having friction linings engageable by and disengageable from at least one of said plates and being subject to wear as a result of repeated engagement with and disengagement from said at least one plate;
   an adjusting unit including means for compensating for wear upon said friction linings to thereby maintain the bias of said device upon said pressure plate at a substantially constant value;
   means for engaging and disengaging the clutch including actuating means movable along a predetermined path to engage and disengage the clutch; and
   means for varying the torque transmitted by at least one of the friction clutch and the clutch disc including means for gradually reducing the transmitted torque at least during approximately 40–70 percent of movement of said actuating means along said path in a direction to disengage the clutch and for gradually increasing the torque which is transmittable by the friction clutch during approximately 40–70 percent of movement of said actuating means along said path in a direction to engage the clutch.

17. An engageable and disengageable torque transmitting friction clutch, comprising:
a housing rotatable about a predetermined axis;
a pressure plate;
means for non-rotatably connecting said pressure plate to said housing with limited freedom of movement in the direction of said axis;
a rotary counterpressure plate adjacent said pressure plate; a torque transmitting clutch disc between said plates;
at least one resilient device reacting against said housing to bias said pressure plate toward said counterpressure plate to thereby clamp said clutch disc against said counterpressure plate and to rotate said clutch disc about said axis, said clutch disc having friction linings engageable by and disengageable from at least one of said plates and being subject to wear as a result of repeated engagement with and disengagement from said at least one plate, said at least one resilient device comprising a diaphragm spring which bears against said pressure plate and has a substantially sinusoidal force-to-displacement characteristic curve including a maximum, a minimum, a digressive portion between said minimum and said maximum, an operating point at said digressive portion in engaged condition of the friction clutch, and a force ratio of approximately 1:0.4 to 1:0.7 between said minimum and said maximum;
a seat tiltably mounting said diaphragm spring in said housing; an adjusting unit including means for compensating for wear upon said friction linings to thereby maintain the bias of said device upon said pressure plate at a substantially constant value;
means for engaging and disengaging the clutch including actuating means movable along a predetermined path to engage and disengage the clutch; and
means for varying the torque transmitted by at least one of the friction clutch and the clutch disc including means for gradually reducing the transmitted torque at least during a portion of movement of said actuating means along said path in a direction to disengage the clutch.

* * * * *

UNITED STATES PATENT AND TRADEMARK OFFICE
CERTIFICATE OF CORRECTION

PATENT NO.  : 5,450,934
DATED       : September 19, 1995
INVENTOR(S) : Paul MAUCHER It is certified that error appears in the above-indentified patent and that said Letters Patent is hereby corrected as shown below:

Claim 1, column 72, line 12, after "for" insert --(a)--;
    column 72, line 15, change "means" to --(b)--.
Claim 11, column 73, after line 19 insert new lines --means for engaging and disengaging the friction clutch including actuating means movable along a predetermined path to disengage the friction clutch;--;
    column 73, line 26 delete ";";
    column 73, delete lines 27-30; and
    column 73, line 31 delete "means".

Signed and Sealed this

Twelfth Day of December, 1995

BRUCE LEHMAN

*Commissioner of Patents and Trademarks*

UNITED STATES PATENT AND TRADEMARK OFFICE
CERTIFICATE OF CORRECTION

PATENT NO. : 5,450,934
DATED : September 19, 1995
INVENTOR(S) : Paul MAUCHER

It is certified that error appears in the above-indentified patent and that said Letters Patent is hereby corrected as shown below:

On the Title page, item [30], Foreign Application Priority Data,
change "Mar. 5, 1992 [JP]    Japan..........42 06 904" to
--Mar. 5, 1992 [DE]    Germany..........42 06 904--;

change "Mar. 10, 1992 [JP]    Japan..........42 07 528" to
--Mar. 10, 1992 [DE]    Germany..........42 07 528--; and change "Apr. 18, 1992 [JP]    Japan..........42 12 940" to
--Apr. 18, 1992 [DE]    Germany..........42 12 940--.

Signed and Sealed this

Sixteenth Day of January, 1996

*Attest:*

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,450,934
DATED : September 19, 1995
INVENTOR(S) : Paul Maucher

It is certified that error appears in the above-identified patent and that said Letters Patent is hereby corrected as shown below:

Col. 76, line 3, delete "digressive" and insert "degressive
Col. 76, line 4, delete "di-"
Col. 76, line 5, delete "gressive" and insert "degressive Signed and Sealed this Fourth Day of July, 2000

Attest:

Q. TODD DICKINSON

Attesting Officer

Director of Patents and Trademarks